(12) United States Patent
Smith et al.

(10) Patent No.: US 9,410,712 B2
(45) Date of Patent: Aug. 9, 2016

(54) DATA MANAGEMENT PROFILE FOR A FABRIC NETWORK

(71) Applicant: Google Inc., Mountain View, CA (US)

(72) Inventors: Zachary B. Smith, San Francisco, CA (US); Grant M. Erickson, Sunnyvale, CA (US); Jay D. Logue, San Jose, CA (US); Matthew G. Neeley, San Mateo, CA (US)

( * ) Notice: Subject to any disclaimer, the term of this patent is extended or adjusted under 35 U.S.C. 154(b) by 0 days.

(21) Appl. No.: 14/588,086

(22) Filed: Dec. 31, 2014

(65) Prior Publication Data

US 2016/0102878 A1    Apr. 14, 2016

Related U.S. Application Data

(60) Provisional application No. 62/061,593, filed on Oct. 8, 2014.

(51) Int. Cl.
| | | |
|---|---|---|
| *G05B 21/00* | (2006.01) | |
| *F24F 11/00* | (2006.01) | |
| *H04L 29/08* | (2006.01) | |
| *G05B 15/02* | (2006.01) | |

(52) U.S. Cl.
CPC .............. *F24F 11/006* (2013.01); *G05B 15/02* (2013.01); *H04L 67/12* (2013.01)

(58) Field of Classification Search
CPC ........ F24F 11/006; G05B 15/02; H04L 67/12
USPC ................................................ 700/276–276
See application file for complete search history.

(56) References Cited

U.S. PATENT DOCUMENTS

| | | | |
|---|---|---|---|
| 2001/0025349 A1* | 9/2001 | Sharood et al. | ............... 713/340 |
| 2002/0022991 A1* | 2/2002 | Sharood et al. | ................. 705/14 |
| 2004/0049590 A1 | 3/2004 | Collier et al. | |
| 2005/0260989 A1 | 11/2005 | Pourtier et al. | |
| 2006/0092890 A1 | 5/2006 | Gupta et al. | |
| 2007/0061018 A1 | 3/2007 | Callaghan et al. | |
| 2007/0218875 A1 | 9/2007 | Calhoun et al. | |
| 2007/0220907 A1* | 9/2007 | Ehlers | ............................. 62/126 |
| 2010/0211224 A1* | 8/2010 | Keeling et al. | ................ 700/277 |
| 2012/0246345 A1 | 9/2012 | Contreras et al. | |
| 2013/0136117 A1 | 5/2013 | Schrum, Jr. et al. | |
| 2013/0322281 A1 | 12/2013 | Ludlow et al. | |

(Continued)

OTHER PUBLICATIONS

Phillips et al., Internet Engineering Task Force. Tags for Identifying Languages. BCP 47. Sep. 2009. http://tools.ietf.org/html/bcp47.

(Continued)

*Primary Examiner* — Mohammad Ali
*Assistant Examiner* — Ziaul Karim

(57) ABSTRACT

Method and systems for controlling data remotely that includes connecting to a remote device within a fabric of smart devices. The remote device stores data locally. Controlling the data includes remotely controlling the data stored in the remote device from another device connected to the fabric by transmitting a message to the remote device. Moreover, the transmitted message includes a profile identifier that causes a data management entity of the remote device to perform an indicated data management action. Furthermore, the profile identifier identifies a data management profile, and the message includes a command tag that indicates the data management action to be performed.

18 Claims, 28 Drawing Sheets

(56) References Cited

U.S. PATENT DOCUMENTS

| | | | |
|---|---|---|---|
| 2014/0001977 A1* | 1/2014 | Zacharchuk et al. | 315/291 |
| 2014/0149270 A1* | 5/2014 | Lombard et al. | 705/34 |
| 2014/0169214 A1 | 6/2014 | Nakajima | |
| 2014/0280520 A1 | 9/2014 | Baier et al. | |
| 2014/0316585 A1* | 10/2014 | Boesveld et al. | 700/278 |
| 2014/0359101 A1 | 12/2014 | Dawes et al. | |
| 2015/0006633 A1 | 1/2015 | Vandwalle et al. | |
| 2015/0023336 A1 | 1/2015 | Ilsar et al. | |

OTHER PUBLICATIONS

J. Klensin, Internationalized Domain Names in Applications (IDNA): Protocol, Aug. 2010. http://tools.ietf.org/html/rfc5891.

USB Implementers' Forum. Universal Serial Bus (USB): Device Class Definition for Human Interface Devices (HID). Version 1.11. Jun. 27, 2001; http://www.usb.org/developers/hidpage/HID1_11.pdf.

Language Tags in HTML and XML, Sep. 10, 2009, http://www.w3.org/International/articles/language-tags/Overview.en.php.

Ping, Oracle Manual Pages Section 1M: System Administration Commands, pp. 1706-1710, 2013 http://www.w3.org/International/articles/language-tags/Overview.en.php.

Markus Mathes; "Time Constrained Web Services for Industrial Automation," Dissertation from Philipps Universitat—Vlarburg; pp. 1-201, Jul. 9, 2009.

International Search Report and Written Opinion for PCT Application No. PCT/US2015/054287 dated Jan. 22, 2016; 14 pgs.

* cited by examiner

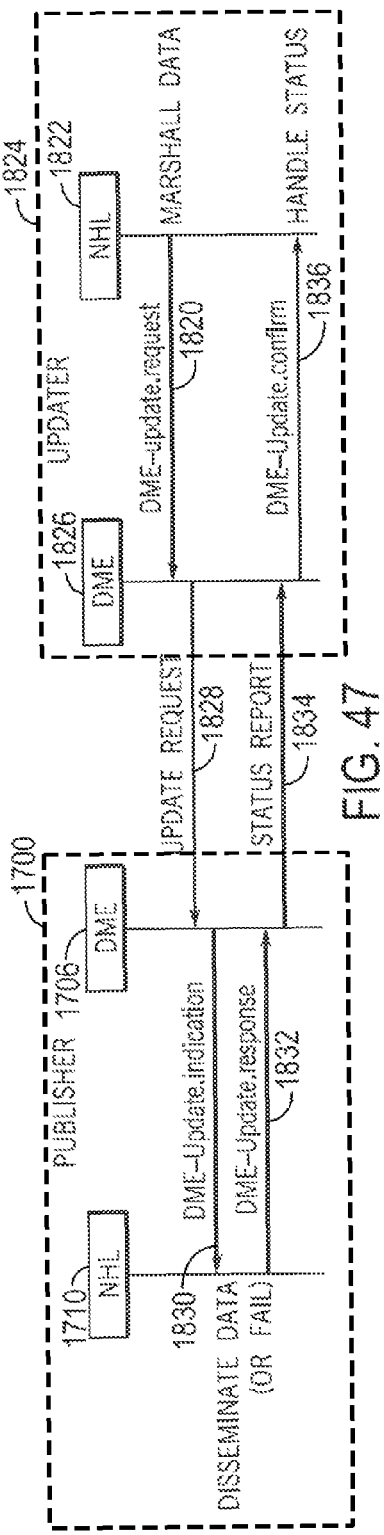
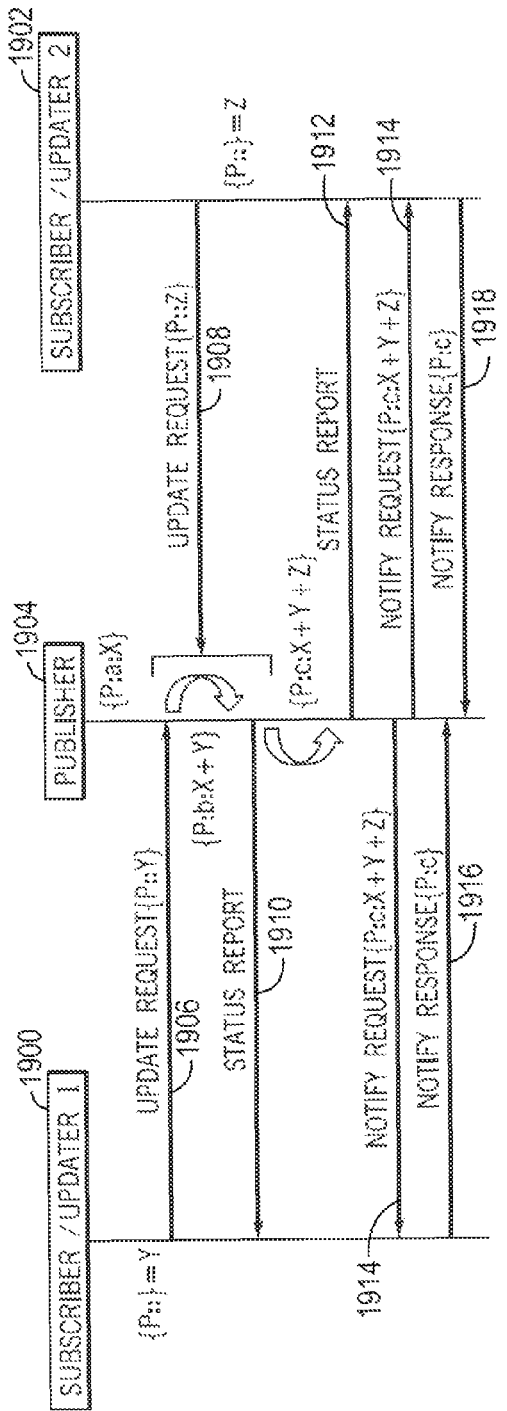
FIG. 47
FIG. 48

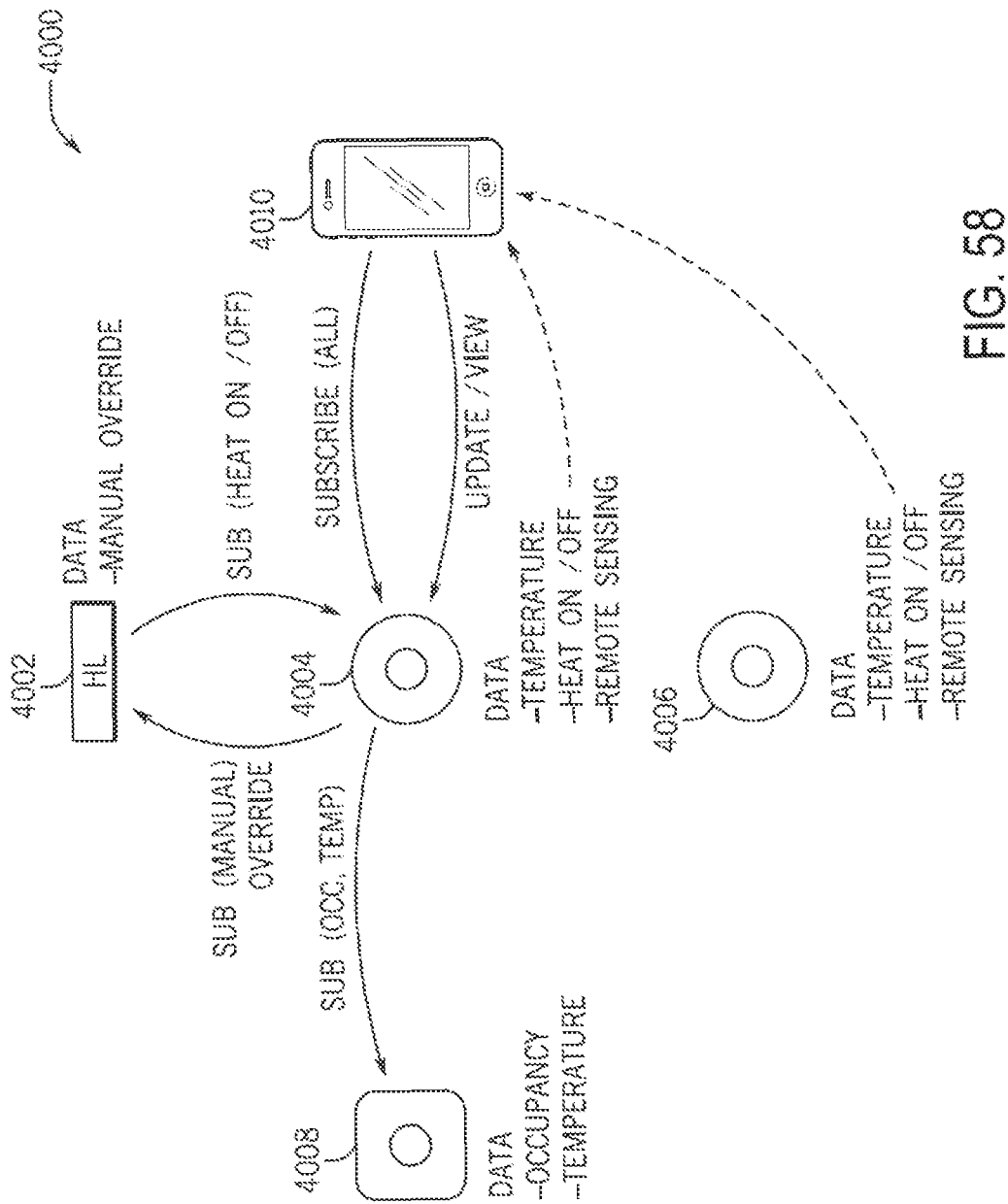

DATA MANAGEMENT PROFILE FOR A FABRIC NETWORK

BACKGROUND

This disclosure relates to data communication profiles for systems, devices, methods, and related computer program products for smart buildings, such as a smart home. This disclosure relates to a fabric network that couples electronic devices using one or more network types and a data management profile that enables devices to access and manage information stored on other devices.

Some homes today are equipped with smart home networks to provide automated control of devices, appliances and systems, such as heating, ventilation, and air conditioning ("HVAC") systems, lighting systems, alarm systems, and home theater and entertainment systems. Smart home networks may include various devices that store and manage their own settings, preferences, and scheduling information that the smart home network may use to provide automated control the various devices, appliances and systems in the home. However, in some scenarios, it may be advantageous for the various devices in the network to access, store, or otherwise manage data that is stored on another device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods a fabric network that includes one or more logical networks that enables devices connected to the fabric to communicate with each other using a list of protocols and/or profiles known to the devices. The communications between the devices may follow a typical message format that enables the devices to understand communications between the devices regardless of which logical networks the communicating devices are connected to in the fabric. Within the message format, a payload of data may be included for the receiving device to store and/or process. The format and the contents of the payload may vary according to a header (e.g., profile tag) within the payload that indicates a specific profile (including one or more protocols) and/or a type of message that is being sent according to the profile to cause a particular action in the receiving device.

According to some embodiments, two or more devices in a fabric may communicate using various profiles. For example, in certain embodiments, a data management profile, a network provisioning profile, or a core profile (including status reporting protocols) that are available to devices connected to the fabric. Using the profiles, devices may send or request information to or from other devices in the fabric in an understood message format.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 47 illustrates an update transaction protocol sequence that may be performed using the WDM profile, in accordance with an embodiment;

FIG. 48 illustrates an example of a conflict resolution that may be performed using the WDM profile, in accordance with an embodiment;

FIG. 58 illustrates a schematic view of an interconnection of various publishing and subscribing devices in a fabric, in accordance with an embodiment.

DETAILED DESCRIPTION

Figure 1:
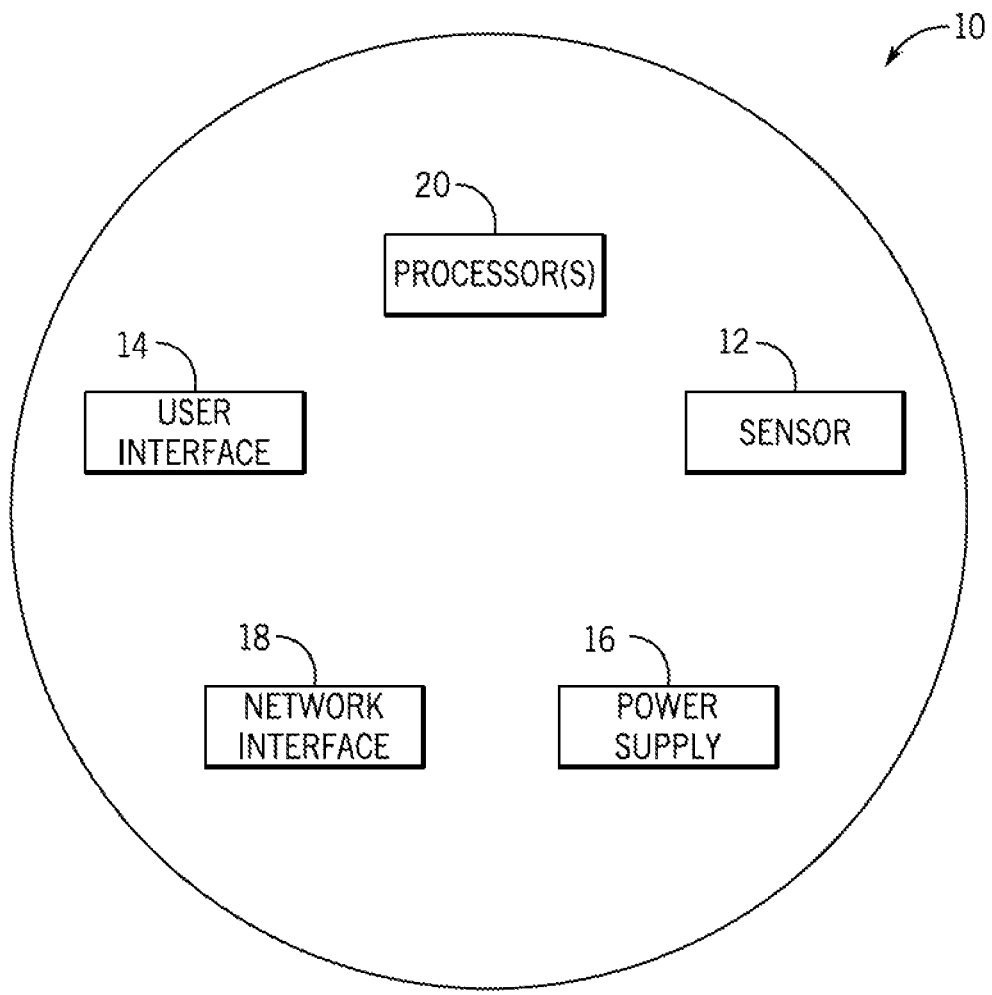
FIG. 1 is a block diagram of an electronic device having that may be interconnected with other devices using a fabric network, in accordance with an embodiment.

One or more specific embodiments of the present disclosure will be described below. These described embodiments are only examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to an efficient fabric network that may be used by devices and/or services communicating with each other in a home environment. Generally, consumers living in homes may find it useful to coordinate the operations of various devices within their home such that of their devices are operated efficiently. For example, a thermostat device may be used to detect a temperature of a home and coordinate the activity of other devices (e.g., lights) based on the detected temperature. In this example, the thermostat device may detect a temperature that may indicate that the temperature outside the home corresponds to daylight hours. The thermostat device may then convey to the light device that there may be daylight available to the home and that thus the light should turn off. The thermostat may also view, update, and/or subscribe to data in other devices such as hazard detectors, radiator control valves using a data management profile.

In addition to operating these devices efficiently, consumers generally prefer to use user-friendly devices that involve a minimum amount of set up or initialization. That is, consumers may generally prefer to purchase devices that are fully operational after performing a few number initialization steps that may be performed by almost any individual regardless of age or technical expertise.

With the foregoing in mind, to enable to effectively communicate data between each other within the home environment, the devices may use a fabric network that includes one or more logical networks to manage communication between the devices. That is, the efficient fabric network may enable numerous devices within a home to communicate with each other using one or more logical networks. The communication network may support Internet Protocol version 6 (IPv6) communication such that each connected device may have a unique local address (LA). Moreover, to enable each device to integrate with a home, it may be useful for each device to communicate within the network using low amounts of power. That is, by enabling devices to communicate using low power, the devices may be placed anywhere in a home without being coupled to a continuous power source (e.g., battery-powered).

I. Fabric Introduction

By way of introduction, FIG. 1 illustrates an example of a general device 10 that may that may communicate with other like devices within a home environment. In one embodiment, the device 10 may include one or more sensors 12, a user-interface component 14, a power supply 16 (e.g., including a power connection and/or battery), a network interface 18, a processor 20, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The user-interface component 14 may also include one or more user-input components that may receive information from the user. The received input may be used to determine a setting. In certain embodiments, the user-input components may include a mechanical or virtual component that responds to the user's motion. For example, the user can mechanically move a sliding component (e.g., along a vertical or horizontal track) or rotate a rotatable ring (e.g., along a circular track), the user's motion along a touchpad may be detected, or motions/gestures may be detected using a contactless gesture detection sensor (e.g., infrared sensor or camera). Such motions may correspond to a setting adjustment, which can be determined based on an absolute position of a user-interface component 104 or based on a displacement of a user-interface components 104 (e.g., adjusting a setpoint temperature by 1 degree F. for every 10° rotation of a rotatable-ring component). Physically and virtually movable user-input components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-input component may be associated with a magnitude of a setting adjustment, such that a user may dramatically alter a setting with a large movement or finely tune a setting with s small movement.

The user-interface components 14 may also include one or more buttons (e.g., up and down buttons), a keypad, a number pad, a switch, a microphone, and/or a camera (e.g., to detect gestures). In one embodiment, the user-input component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-input component 14 may include a camera that may detect gestures (e.g., to indicate that a power or alarm state of a device is to be changed). In some instances, the device 10 may have one primary input component, which may be used to set various types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available. In certain embodiments, the power supply component 16 may include intermittent or reduced power connections that may be less than that provided via an AC plug in the home. In certain embodiments, devices with batteries and/or intermittent or reduced power may be operated as "sleepy devices" that alternate between an online/awake state and an offline/sleep state to reduce power consumption.

The network interface 18 may include one or more components that enable the device 10 to communicate between devices using one or more logical networks within the fabric network. In one embodiment, the network interface 18 may communicate using an efficient network layer as part of its Open Systems Interconnection (OSI) model. In certain embodiments, one component of the network interface 18 may communicate with one logical network (e.g., WiFi) and another component of the network interface may communicate with another logical network (e.g., 802.15.4). In other words, the network interface 18 may enable the device 10 to wirelessly communicate via multiple IPv6 networks. As such, the network interface 18 may include a wireless card, Ethernet port, and/or other suitable transceiver connections.

The processor 20 may support one or more of a variety of different device functionalities. As such, the processor 20 may include one or more processors configured and programmed to carry out and/or cause to be carried out one or more of the functionalities described herein. In one embodiment, the processor 20 may include general-purpose processors carrying out computer code stored in local memory (e.g., flash memory, hard drive, random access memory), special-purpose processors or application-specific integrated circuits, other types of hardware/firmware/software processing platforms, and/or some combination thereof. Further, the processor 20 may be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, the processor 20 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 20 may include image recognition technology to identify particular occupants or objects.

In some instances, the processor 20 may predict desirable settings and/or implement those settings. For example, based on presence detection, the processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influences actions of a second device using one or more common profiles between the devices. For example, a first device can detect that a user has pulled into a garage (e.g., by detecting motion in the garage, detecting a change in light in the garage or detecting opening of the garage door). The first device can transmit this information to a second device via the fabric network, such that the second device can, e.g., adjust a home temperature setting, a light setting, a music setting, and/or a security-alarm setting. As another example, a first device can detect a user approaching a front door (e.g., by detecting motion or sudden light pattern changes). The first device may cause a general audio or visual signal to be presented (e.g., such as sounding of a doorbell) or cause a location-specific audio or visual signal to be presented (e.g., to announce the visitor's presence within a room that a user is occupying).

Figure 2:
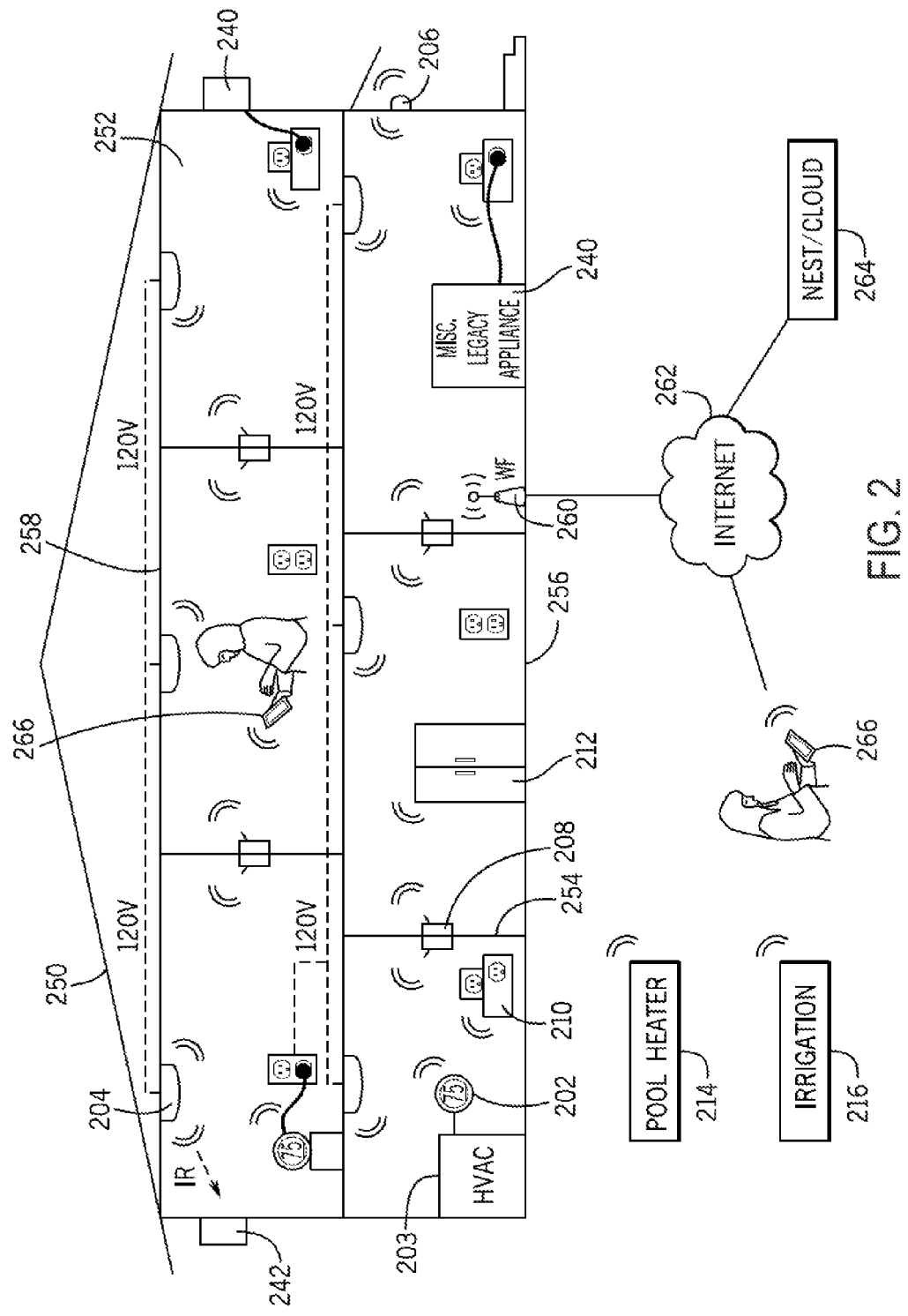
FIG. 2 illustrates a block diagram of a home environment in which the general device of FIG. 1 may communicate with other devices via the fabric network, in accordance with an embodiment.
Figure 3:
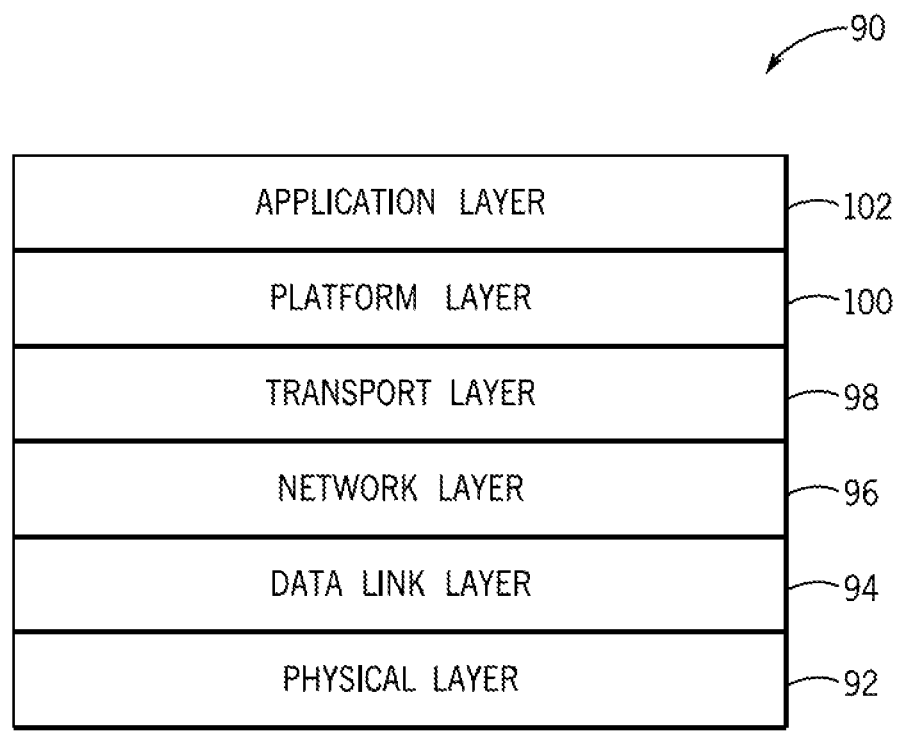
FIG. 3 illustrates a block diagram of an Open Systems Interconnection (OSI) model that characterizes a communication system for the home environment of FIG. 2, in accordance with an embodiment.

With the foregoing in mind, FIG. 2 illustrates a block diagram of a home environment 30 in which the device 10 of FIG. 1 may communicate with other devices via the fabric network. The depicted home environment 30 may include a structure 32 such as a house, office building, garage, or mobile home. It will be appreciated that devices can also be integrated into a home environment that does not include an entire structure 32, such as an apartment, condominium, office space, or the like. Further, the home environment 30 may control and/or be coupled to devices outside of the actual structure 32. Indeed, several devices in the home environment 30 need not physically be within the structure 32 at all. For example, a device controlling a pool heater 34 or irrigation system 36 may be located outside of the structure 32.

The depicted structure 32 includes multiple rooms 38, separated at least partly from each other via walls 40. The walls 40 can include interior walls or exterior walls. Each room 38 can further include a floor 42 and a ceiling 44. Devices can be mounted on, integrated with and/or supported by the wall 40, the floor 42, or the ceiling 44.

The home environment 30 may include multiple devices, including intelligent, multi-sensing, network-connected devices that may integrate seamlessly with each other and/or with cloud-based server systems to provide any of a variety of useful home objectives. One, more or each of the devices illustrated in the home environment 30 may include one or more sensors 12, a user interface 14, a power supply 16, a network interface 18, a processor 20 and the like.

Example devices 10 may include a network-connected thermostat 46 that may detect ambient climate characteristics (e.g., temperature and/or humidity) and control a heating, ventilation and air-conditioning (HVAC) system 48. Another example device 10 may include a hazard detection unit 50 that can detect the presence of a hazardous substance and/or a hazardous condition in the home environment 30 (e.g., smoke, fire, or carbon monoxide). Additionally, entryway interface devices 52, which can be termed a "smart doorbell", can detect a person's approach to or departure from a location, control audible functionality, announce a person's approach or departure via audio or visual means, or control settings on a security system (e.g., to activate or deactivate the security system).

In certain embodiments, the device 10 may include a light switch 54 that may detect ambient lighting conditions, detect room-occupancy states, and control a power and/or dim state of one or more lights. In some instances, the light switches 54 may control a power state or speed of a fan, such as a ceiling fan.

Additionally, wall plug interfaces 56 may detect occupancy of a room or enclosure and control supply of power to one or more wall plugs (e.g., such that power is not supplied to the plug if nobody is at home). The device 10 within the home environment 30 may further include an appliance 58, such as refrigerators, stoves and/or ovens, televisions, washers, dryers, lights (inside and/or outside the structure 32), stereos, intercom systems, garage-door openers, floor fans, ceiling fans, whole-house fans, wall air conditioners, pool heaters 34, irrigation systems 36, security systems, and so forth. While descriptions of FIG. 2 may identify specific sensors and functionalities associated with specific devices, it will be appreciated that any of a variety of sensors and functionalities (such as those described throughout the specification) may be integrated into the device 10.

In addition to containing processing and sensing capabilities, each of the example devices described above may be capable of data communications and information sharing with any other device, as well as to any cloud server or any other device that is network-connected anywhere in the world. In one embodiment, the devices 10 may send and receive communications via a fabric network discussed below. In one embodiment, fabric may enable the devices 10 to communicate with each other via one or more logical networks. As such, certain devices may serve as wireless repeaters and/or may function as bridges between devices, services, and/or logical networks in the home environment that may not be directly connected (i.e., one hop) to each other.

In one embodiment, a wireless router 60 may further communicate with the devices 10 in the home environment 30 via one or more logical networks (e.g., WiFi). The wireless router 60 may then communicate with the Internet 62 or other network such that each device 10 may communicate with a remote service or a cloud-computing system 64 through the Internet 62. The cloud-computing system 64 may be associated with a manufacturer, support entity or service provider associated with a particular device 10. As such, in one embodiment, a user may contact customer support using a device itself rather than using some other communication means such as a telephone or Internet-connected computer. Further, software updates can be automatically sent from the cloud-computing system 64 or devices in the home environment 30 to other devices in the fabric (e.g., when available, when purchased, when requested, or at routine intervals).

By virtue of network connectivity, one or more of the devices 10 may further allow a user to interact with the device even if the user is not proximate to the device. For example, a user may communicate with a device using a computer (e.g., a desktop computer, laptop computer, or tablet) or other portable electronic device (e.g., a smartphone) 66. A webpage or application may receive communications from the user and control the device 10 based on the received communications. Moreover, the webpage or application may present information about the device's operation to the user. For example, the user can view a current setpoint temperature for a device and adjust it using a computer that may be connected to the Internet 62. In this example, the thermostat 46 may receive the current setpoint temperature view request via the fabric network via one or more underlying logical networks.

In certain embodiments, the home environment 30 may also include a variety of non-communicating legacy appliances 68, such as old conventional washer/dryers, refrigerators, and the like which can be controlled, albeit coarsely (ON/OFF), by virtue of the wall plug interfaces 56. The home environment 30 may further include a variety of partially communicating legacy appliances 70, such as infra-red (IR) controlled wall air conditioners or other IR-controlled devices, which can be controlled by IR signals provided by the hazard detection units 50 or the light switches 54.

Figure 4:
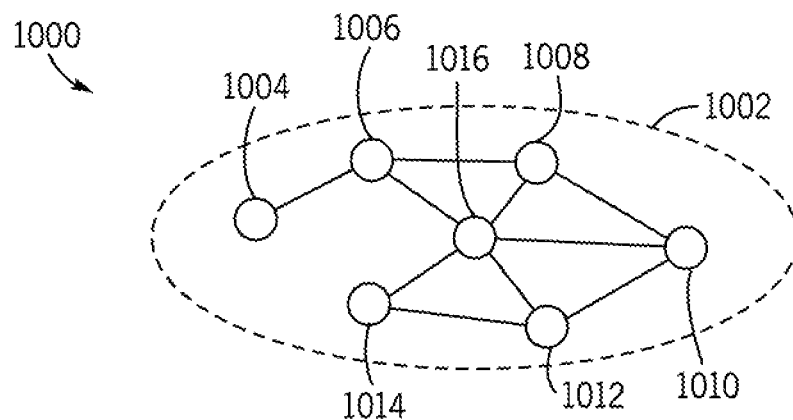
FIG. 4 illustrates the fabric network having a single logical network topology, in accordance with an embodiment.

As mentioned above, each of the example devices 10 described above may form a portion of a fabric network. Generally, the fabric network may be part of an Open Systems Interconnection (OSI) model 90 as depicted in FIG. 4. The OSI model 90 illustrates functions of a communication system with respect to abstraction layers. That is, the OSI model may specify a networking framework or how communications between devices may be implemented. In one embodiment, the OSI model may include six layers: a physical layer 92, a data link layer 94, a network layer 96, a transport layer 98, a platform layer 100, and an application layer 102. Generally, each layer in the OSI model 90 may serve the layer above it and may be served by the layer below it.

Keeping this in mind, the physical layer 92 may provide hardware specifications for devices that may communicate with each other. As such, the physical layer 92 may establish how devices may connect to each other, assist in managing how communication resources may be shared between devices, and the like.

The data link layer 94 may specify how data may be transferred between devices. Generally, the data link layer 94 may provide a way in which data packets being transmitted may be encoded and decoded into bits as part of a transmission protocol.

The network layer 96 may specify how the data being transferred to a destination node is routed. The network layer 96 may also provide a security protocol that may maintain the integrity of the data being transferred. The efficient network layer discussed above corresponds to the network layer 96. In certain embodiments, the network layer 96 may be completely independent of the platform layer 100 and include any suitable IPv6 network type (e.g., WiFi, Ethernet, HomePlug, 802.15.4, etc).

The transport layer 98 may specify a transparent transfer of the data from a source node to a destination node. The transport layer 98 may also control how the transparent transfer of the data remains reliable. As such, the transport layer 98 may be used to verify that data packets intended to transfer to the destination node indeed reached the destination node. Example protocols that may be employed in the transport layer 98 may include Transmission Control Protocol (TCP) and User Datagram Protocol (UDP).

The platform layer 100 includes the fabric network and establishes connections between devices according to the protocol specified within the transport layer 98 and may be agnostic of the network type used in the network layer 96. The platform layer 100 may also translate the data packets into a form that the application layer 102 may use. The application layer 102 may support a software application that may directly interface with the user. As such, the application layer 102 may implement protocols defined by the software application. For example, the software application may provide serves such as file transfers, electronic mail, and the like.

II. Fabric Device Interconnection

Figure 5:
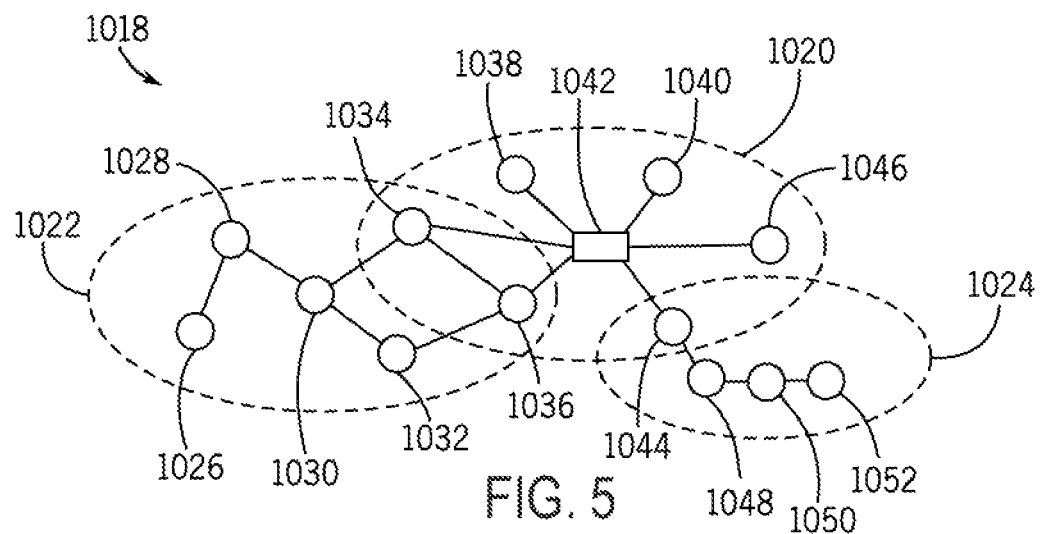
FIG. 5 illustrates the fabric network having a star network topology, in accordance with an embodiment.
Figure 6:
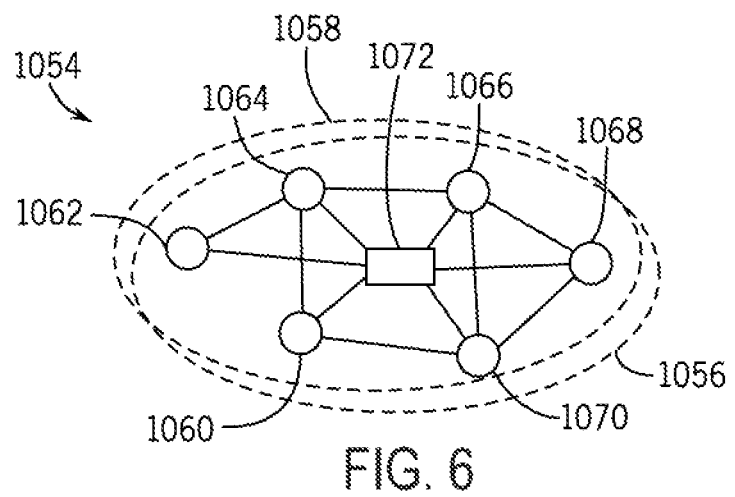
FIG. 6 illustrates the fabric network having an overlapping networks topology, in accordance with an embodiment.

As discussed above, a fabric may be implemented using one or more suitable communications protocols, such as IPv6 protocols. In fact, the fabric may be partially or completely agnostic to the underlying technologies (e.g., network types or communication protocols) used to implement the fabric. Within the one or more communications protocols, the fabric may be implemented using one or more network types used to communicatively couple electrical devices using wireless or wired connections. For example, certain embodiments of the fabric may include Ethernet, WiFi, 802.15.4, ZigBee, ISA100.11a, WirelessHART, MiWi™ power-line networks, and/or other suitable network types. Within the fabric devices (e.g., nodes) can exchange packets of information with other devices (e.g., nodes) in the fabric, either directly or via intermediary nodes, such as intelligent thermostats, acting as IP routers. These nodes may include manufacturer devices (e.g., thermostats and smoke detectors) and/or customer devices (e.g., phones, tablets, computers, etc.). Additionally, some devices may be "always on" and continuously powered using electrical connections. Other devices may have partially reduced power usage (e.g., medium duty cycle) using a reduced/intermittent power connection, such as a thermostat or doorbell power connection. Finally, some devices may have a short duty cycle and run solely on battery power. In other words, in certain embodiments, the fabric may include heterogeneous devices that may be connected to one or more sub-networks according to connection type and/or desired power usage. FIGS. 4-6 illustrate three embodiments that may be used to connect electrical devices via one or more sub-networks in the fabric.

A. Single Network Topology

FIG. 4 illustrates an embodiment of the fabric 1000 having a single network topology. As illustrated, the fabric 1000 includes a single logical network 1002. The network 1002 could include Ethernet, WiFi, 802.15.4, power-line networks, and/or other suitable network types in the IPv6 protocols. In fact, in some embodiments where the network 1002 includes a WiFi or Ethernet network, the network 1002 may span multiple WiFi and/or Ethernet segments that are bridged at a link layer.

The network 1002 includes one or more nodes 1004, 1006, 1008, 1010, 1012, 1014, and 1016, referred to collectively as 1004-1016. Although the illustrated network 1002 includes seven nodes, certain embodiments of the network 1002 may include one or more nodes interconnected using the network 1002. Moreover, if the network 1002 is a WiFi network, each of the nodes 1004-1016 may be interconnected using the node 1016 (e.g., WiFi router) and/or paired with other nodes using WiFi Direct (i.e., WiFi P2P).

B. Star Network Topology

FIG. 5 illustrates an alternative embodiment of fabric 1000 as a fabric 1018 having a star network topology. The fabric 1018 includes a hub network 1020 that joins together two periphery networks 1022 and 1024. The hub network 1020 may include a home network, such as WiFi/Ethernet network or power line network. The periphery networks 1022 and 1024 may additional network connection types different of different types than the hub network 1020. For example, in some embodiments, the hub network 1020 may be a WiFi/Ethernet network, the periphery network 1022 may include an 802.15.4 network, and the periphery network 1024 may include a power line network, a ZigBee® network, a ISA100.11a network, a WirelessHART, network, or a MiWi™ network. Moreover, although the illustrated embodiment of the fabric 1018 includes three networks, certain embodiments of the fabric 1018 may include any number of networks, such as 2, 3, 4, 5, or more networks. In fact, some embodiments of the fabric 1018 include multiple periphery networks of the same type.

Although the illustrated fabric 1018 includes fourteen nodes, each referred to individually by reference numbers 1024-1052, respectively, it should be understood that the fabric 1018 may include any number of nodes. Communication within each network 1020, 1022, or 1024, may occur directly between devices and/or through an access point, such as node 1042 in a WiFi/Ethernet network. Communications between periphery network 1022 and 1024 passes through the hub network 1020 using inter-network routing nodes. For example, in the illustrated embodiment, nodes 1034 and 1036 are be connected to the periphery network 1022 using a first network connection type (e.g., 802.15.4) and to the hub network 1020 using a second network connection type (e.g., WiFi) while the node 1044 is connected to the hub network 1020 using the second network connection type and to the periphery network 1024 using a third network connection type (e.g., power line). For example, a message sent from node 1026 to node 1052 may pass through nodes 1028, 1030, 1032, 1036, 1042, 1044, 1048, and 1050 in transit to node 1052.

C. Overlapping Networks Topology

FIG. 6 illustrates an alternative embodiment of the fabric 1000 as a fabric 1054 having an overlapping networks topology. The fabric 1054 includes networks 1056 and 1058. As illustrated, each of the nodes 1062, 1064, 1066, 1068, 1070, and 1072 may be connected to each of the networks. In other embodiments, the node 1072 may include an access point for an Ethernet/WiFi network rather than an end point and may not be present on either the network 1056 or network 1058, whichever is not the Ethernet/WiFi network. Accordingly, a communication from node 1062 to node 1068 may be passed through network 1056, network 1058, or some combination thereof. In the illustrated embodiment, each node can communicate with any other node via any network using any network desired. Accordingly, unlike the star network topology of FIG. 5, the overlapping networks topology may communicate directly between nodes via any network without using inter-network routing.

D. Fabric Network Connection to Services

Figure 7:
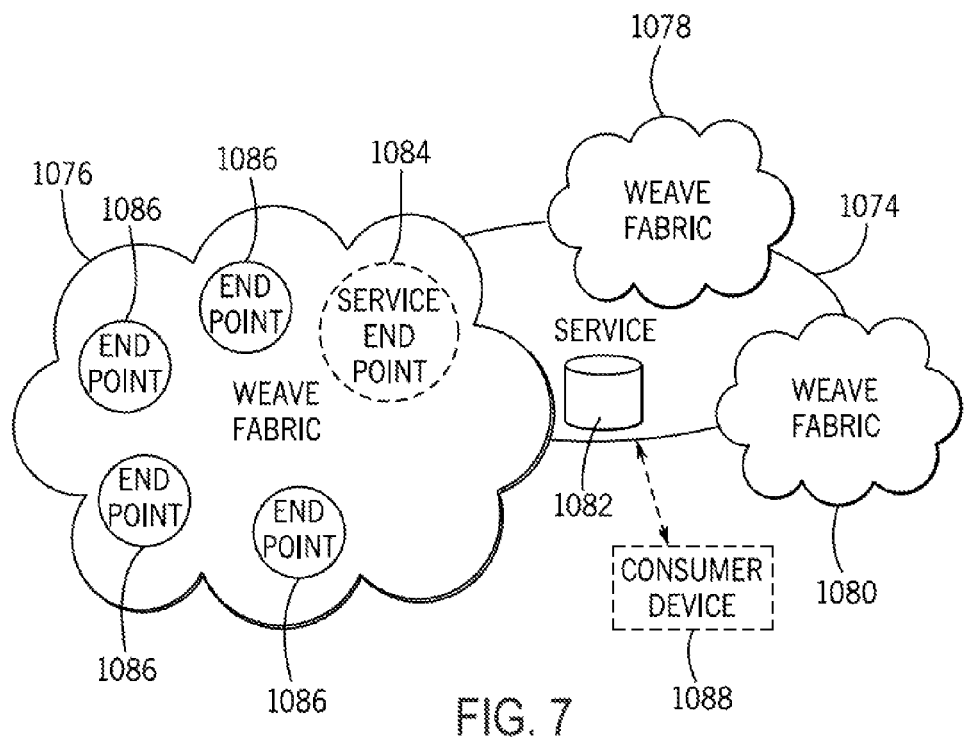
FIG. 7 illustrates a service communicating with one or more fabric networks, in accordance with an embodiment.

In addition to communications between devices within the home, a fabric (e.g., fabric 1000) may include services that may be located physically near other devices in the fabric or physically remote from such devices. The fabric connects to these services through one or more service end points. FIG. 7 illustrates an embodiment of a service 1074 communicating with fabrics 1076, 1078, and 1080. The service 1074 may include various services that may be used by devices in fabrics 1076, 1078, and/or 1080. For example, in some embodiments, the service 1074 may be a time of day service that supplies a time of day to devices, a weather service to provide various weather data (e.g., outside temperature, sunset, wind information, weather forecast, etc.), an echo service that "pings" each device, data management services, device management services, and/or other suitable services. As illustrated, the service 1074 may include a server 1082 (e.g., web server) that stores/accesses relevant data and passes the information through a service end point 1084 to one or more end points 1086 in a fabric, such as fabric 1076. Although the illustrated embodiment only includes three fabrics with a single server 1082, it should be appreciated that the service 1074 may connect to any number of fabrics and may include servers in addition to the server 1082 and/or connections to additional services.

In certain embodiments, the service 1074 may also connect to a consumer device 1088, such as a phone, tablet, and/or computer. The consumer device 1088 may be used to connect to the service 1074 via a fabric, such as fabric 1076, an Internet connection, and/or some other suitable connection method. The consumer device 1088 may be used to access data from one or more end points (e.g., electronic devices) in a fabric either directly through the fabric or via the service 1074. In other words, using the service 1074, the consumer device 1088 may be used to access/manage devices in a fabric remotely from the fabric.

E. Communication Between Devices in a Fabric

Figure 8:
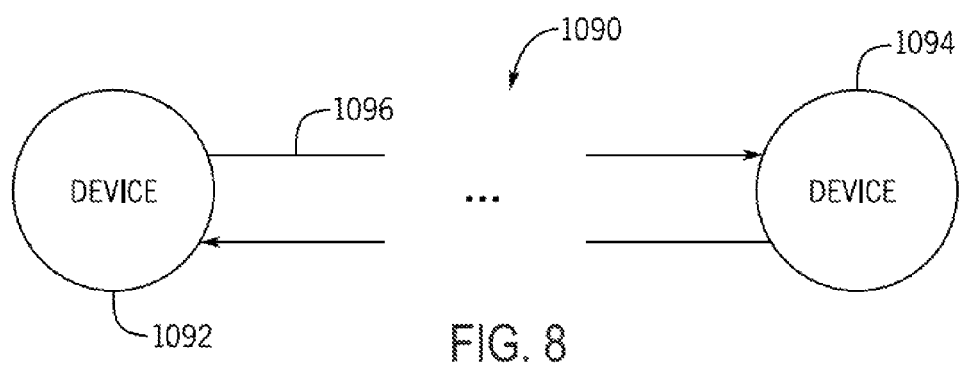
FIG. 8 illustrates two devices in a fabric network in communicative connection, in accordance with an embodiment.

As discussed above, each electronic device or node may communicate with any other node in the fabric, either directly or indirectly depending upon fabric topology and network connection types. Additionally, some devices (e.g., remote devices) may communicate through a service to communicate with other devices in the fabric. FIG. 8 illustrates an embodiment of a communication 1090 between two devices 1092 and 1094. The communication 1090 may span one or more networks either directly or indirectly through additional devices and/or services, as described above. Additionally, the communication 1090 may occur over an appropriate communication protocol, such as IPv6, using one or more transport protocols. For example, in some embodiments the communication 1090 may include using the transmission control protocol (TCP) and/or the user datagram protocol (UDP). In some embodiments, the device 1092 may transmit a first signal 1096 to the device 1094 using a connectionless protocol (e.g., UDP). In certain embodiments, the device 1092 may communicate with the device 1094 using a connection-oriented protocol (e.g., TCP). Although the illustrated communication 1090 is depicted as a bi-directional connection, in some embodiments, the communication 1090 may be a uni-directional broadcast.

i. Unique Local Address

As discussed above, data transmitted within a fabric received by a node may be redirected or passed through the node to another node depending on the desired target for the communication. In some embodiments, the transmission of the data may be intended to be broadcast to all devices. In such embodiments, the data may be retransmitted without further processing to determine whether the data should be passed along to another node. However, some data may be directed to a specific endpoint. To enable addressed messages to be transmitted to desired endpoints, nodes may be assigned identification information.

Each node may be assigned a set of link-local addresses (LLA), one assigned to each network interface. These LLAs may be used to communicate with other nodes on the same network. Additionally, the LLAs may be used for various communication procedures, such as IPv6 Neighbor Discovery Protocol. In addition to LLAs, each node is assigned a unique local address (ULA).

Figure 9:
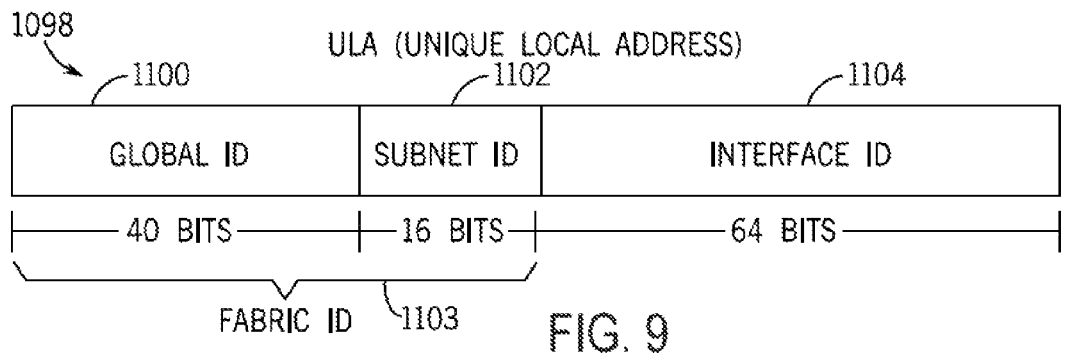
FIG. 9 illustrates a unique local address format (ULA) that may be used to address devices in a fabric network, in accordance with an embodiment.

FIG. 9 illustrates an embodiment of a unique local address (ULA) 1098 that may be used to address each node in the fabric. In certain embodiments, the ULA 1098 may be formatted as an IPv6 address format containing 128 bits divided into a global ID 1100, a subnet ID 1102, and an interface ID 1104. The global ID 1100 includes 40 bits and the subnet ID 1102 includes 16 bits. The global ID 1100 and subnet ID 1102 together form a fabric ID 1103 for the fabric.

The fabric ID 1103 is a unique 64-bit identifier used to identify a fabric. The fabric ID 1103 may be generated at creation of the associated fabric using a pseudo-random algorithm. For example, the pseudo-random algorithm may 1) obtain the current time of day in 64-bit NTP format, 2) obtain the interface ID 1104 for the device, 3) concatenate the time of day with the interface ID 1104 to create a key, 4) compute and SHA-1 digest on the key resulting in 160 bits, 5) use the least significant 40 bits as the global ID 1100, and 6) concatenate the ULA and set the least significant bit to 1 to create the fabric ID 1103. In certain embodiments, once the fabric ID 1103 is created with the fabric, the fabric ID 1103 remains until the fabric is dissolved.

The global ID 1100 identifies the fabric to which the node belongs. The subnet ID 1102 identifies logical networks within the fabric. The subnet ID 1102 may be assigned monotonically starting at one with the addition of each new logical network to the fabric. For example, a WiFi network may be identified with a hex value of 0x01, and a later connected 802.15.4 network may be identified with a hex value of 0x02 continuing on incrementally upon the connection of each new network to the fabric.

Finally, the ULA 1098 includes an interface ID 1104 that includes 64 bits. The interface ID 1104 may be assigned using a globally-unique 64-bit identifier according to the IEEE EUI-64 standard. For example, devices with IEEE 802 network interfaces may derive the interface ID 1104 using a burned-in MAC address for the devices "primary interface." In some embodiments, the designation of which interface is the primary interface may be determined arbitrarily. In other embodiments, an interface type (e.g., WiFi) may be deemed the primary interface, when present. If the MAC address for the primary interface of a device is 48 bits rather than 64-bit, the 48-bit MAC address may be converted to a EUI-64 value via encapsulation (e.g., organizationally unique identifier encapsulating). In consumer devices (e.g., phones or computers), the interface ID 1104 may be assigned by the consumer devices' local operating systems.

ii. Routing Transmissions Between Logical Networks

As discussed above in relation to a star network topology, inter-network routing may occur in communication between two devices across logical networks. In some embodiments, inter-network routing is based on the subnet ID 1102. Each inter-networking node (e.g., node 1034 of FIG. 5) may maintain a list of other routing nodes (e.g., node B 14 of FIG. 5) on the hub network 1020 and their respective attached periphery networks (e.g., periphery network 1024 of FIG. 5). When a packet arrives addressed to a node other than the routing node itself, the destination address (e.g., address for node 1052 of FIG. 5) is compared to the list of network prefixes and a routing node (e.g., node 1044) is selected that is attached to the desired network (e.g., periphery network 1024). The packet is then forwarded to the selected routing node. If multiple nodes (e.g., 1034 and 1036) are attached to the same periphery network, routing nodes are selected in an alternating fashion.

Additionally, inter-network routing nodes may regularly transmit Neighbor Discovery Protocol (NDP) router advertisement messages on the hub network to alert consumer devices to the existence of the hub network and allow them to acquire the subnet prefix. The router advertisements may include one or more route information options to assist in routing information in the fabric. For example, these route information options may inform consumer devices of the existence of the periphery networks and how to route packets the periphery networks.

Figure 10:
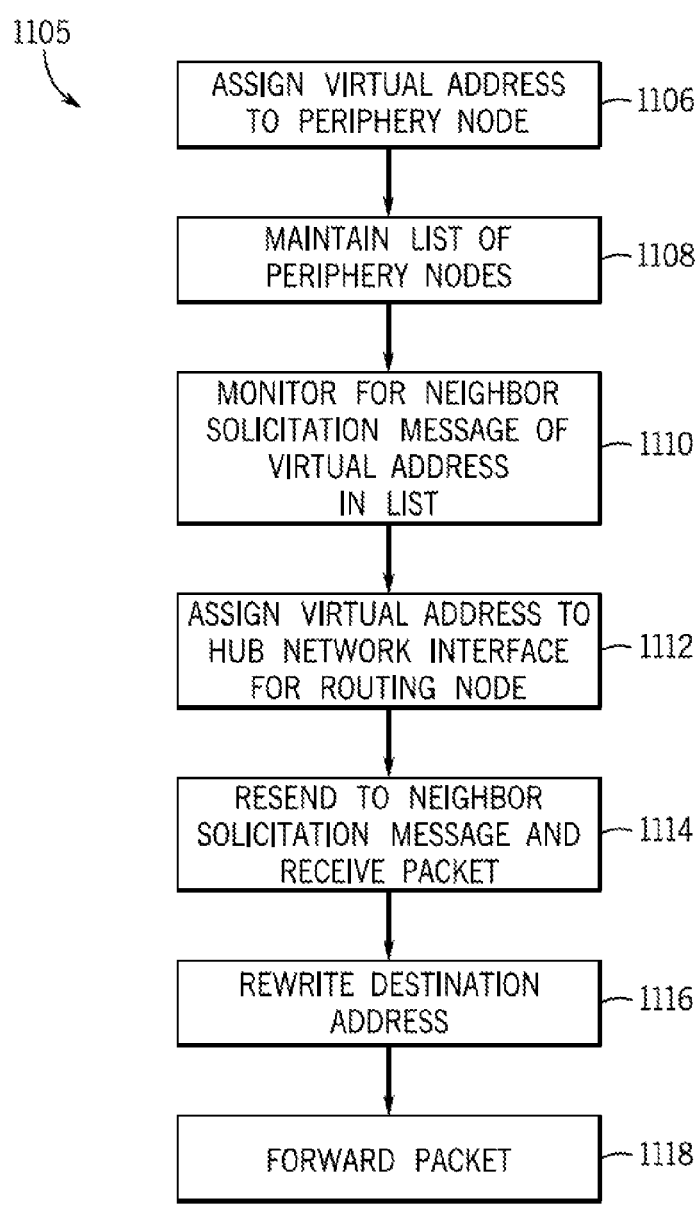
FIG. 10 illustrates a process for proxying periphery devices on a hub network, in accordance with an embodiment.

In addition to, or in place of route information options, routing nodes may act as proxies to provide a connection between consumer devices and devices in periphery networks, such as the process 1105 as illustrated in FIG. 10. As illustrated, the process 1105 includes each periphery network device being assigned a virtual address on the hub network by combining the subnet ID 1102 with the interface ID 1104 for the device on the periphery network (block 1106). To proxy using the virtual addresses, routing nodes maintain a list of all periphery nodes in the fabric that are directly reachable via one of its interfaces (block 1108). The routing nodes listen on the hub network for neighbor solicitation messages requesting the link address of a periphery node using its virtual address (block 1110). Upon receiving such a message, the routing node attempts to assign the virtual address to its hub interface after a period of time (block 1112). As part of the assignment, the routing node performs duplicate address detection so as to block proxying of the virtual address by more than one routing node. After the assignment, the routing node responds to the neighbor solicitation message and receives the packet (block 1114). Upon receiving the packet, the routing node rewrites the destination address to be the real address of the periphery node (block 1116) and forwards the message to the appropriate interface (block 1118).

iii. Consumer Devices Connecting to a Fabric

To join a fabric, a consumer device may discover an address of a node already in the fabric that the consumer device wants to join. Additionally, if the consumer device has been disconnected from a fabric for an extended period of time may need to rediscover nodes on the network if the fabric topology/layout has changed. To aid in discovery/rediscovery, fabric devices on the hub network may publish Domain Name System-Service Discovery (DNS-SD) records via mDNS that advertise the presence of the fabric and provide addresses to the consumer device III. Data Transmitted in the Fabric After creation of a fabric and address creation for the nodes, data may be transmitted through the fabric. Data passed through the fabric may be arranged in a format common to all messages and/or common to specific types of conversations in the fabric. In some embodiments, the message format may enable one-to-one mapping to JavaScript Object Notation (JSON) using a TLV serialization format discussed below. Additionally, although the following data frames are described as including specific sizes, it should be noted that lengths of the data fields in the data frames may be varied to other suitable bit-lengths.

It should be understood that each of the following data frames, profiles, and/or formats discussed below may be stored in memory (e.g., memory of the device 10) prior to and/or after transmission of a message. In other words, although the data frame, profiles, and formats may be generally discussed as transmissions of data, they may also be physically stored (e.g., in a buffer) before, during, and/or after transmission of the data frame, profiles, and/or formats. Moreover, the following data frames, profiles, schemas, and/or formats may be stored on a non-transitory, computer-readable medium that allows an electronic device to access the data frames, profiles, schemas, and/or formats. For example, instructions for formatting the data frames, profiles, schemas, and/or formats may be stored in any suitable computer-readable medium, such as in memory for the device 10, memory of another device, a portable memory device (e.g., compact disc, flash drive, etc.), or other suitable physical device suitable for storing the data frames, profiles, schemas, and/or formats.

A. Security

Along with data intended to be transferred, the fabric may transfer the data with additional security measures such as encryption, message integrity checks, and digital signatures. In some embodiments, a level of security supported for a device may vary according to physical security of the device and/or capabilities of the device. In certain embodiments, messages sent between nodes in the fabric may be encrypted using the Advanced Encryption Standard (AES) block cipher operating in counter mode (AES-CTR) with a 128-bit key. As discussed below, each message contains a 32-bit message id. The message id may be combined with a sending nodes id to form a nonce for the AES-CTR algorithm. The 32-bit counter enables 4 billion messages to be encrypted and sent by each node before a new key is negotiated.

In some embodiments, the fabric may insure message integrity using a message authentication code, such as HMAC-SHA-1, that may be included in each encrypted message. In some embodiments, the message authentication code may be generated using a 160-bit message integrity key that is paired one-to-one with the encryption key. Additionally, each node may check the message id of incoming messages against a list of recently received ids maintained on a node-by-node basis to block replay of the messages.

B. Tag Length Value (TLV) Formatting

To reduce power consumption, it is desirable to send at least a portion of the data sent over the fabric that compactly while enabling the data containers to flexibly represents data that accommodates skipping data that is not recognized or understood by skipping to the next location of data that is understood within a serialization of the data. In certain embodiments, tag-length-value (TLV) formatting may be used to compactly and flexibly encode/decode data. By storing at least a portion of the transmitted data in TLV, the data may be compactly and flexibly stored/sent along with low encode/decode and memory overhead, as discussed below in reference to Table 7. In certain embodiments, TLV may be used for some data as flexible, extensible data, but other portions of data that is not extensible may be stored and sent in an understood standard protocol data unit (PDU).

Data formatted in a TLV format may be encoded as TLV elements of various types, such as primitive types and container types. Primitive types include data values in certain formats, such as integers or strings. For example, the TLV format may encode: 1, 2, 3, 4, or 8 byte signed/unsigned integers, UTF-8 strings, byte strings, single/double-precision floating numbers (e.g., IEEE 754-1985 format), boolean, null, and other suitable data format types. Container types include collections of elements that are then sub-classified as container or primitive types. Container types may be classified into various categories, such as dictionaries, arrays, paths or other suitable types for grouping TLV elements, known as members. A dictionary is a collection of members each having distinct definitions and unique tags within the dictionary. An array is an ordered collection of members with implied definitions or no distinct definitions. A path is an ordered collection of members that described how to traverse a tree of TLV elements.

Figure 11:
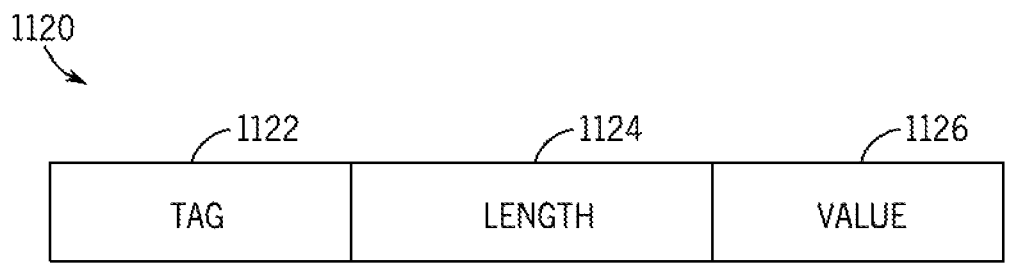
FIG. 11 illustrates a tag-length-value (TLV) packet that may be used to transmit data over the fabric network, in accordance with an embodiment.

As illustrated in FIG. 11, an embodiment of a TLV packet 1120 includes three data fields: a tag field 1122, a length field 1124, and a value field 1126. Although the illustrated fields 1122, 1124, and 1126 are illustrated as approximately equivalent in size, the size of each field may be variable and vary in size in relation to each other. In other embodiments, the TLV packet 1120 may further include a control byte before the tag field 1122.

In embodiments having the control byte, the control byte may be sub-divided into an element type field and a tag control field. In some embodiments, the element type field includes 5 lower bits of the control byte and the tag control field occupies the upper 3 bits. The element type field indicates the TLV element's type as well as the how the length field 1124 and value field 1126 are encoded. In certain embodiments, the element type field also encodes Boolean values and/or null values for the TLV. For example, an embodiment of an enumeration of element type field is provided in Table 1 below.

TABLE 1

Example element type field values.

| 7 | 6 | 5 | 4 | 3 | 2 | 1 | 0 | |
|---|---|---|---|---|---|---|---|---|
| | | | 0 | 0 | 0 | 0 | 0 | Signed Integer, 1 byte value value |
| | | | 0 | 0 | 0 | 0 | 1 | Signed Integer, 2 byte value |
| | | | 0 | 0 | 0 | 1 | 0 | Signed Integer, 4 byte value |
| | | | 0 | 0 | 0 | 1 | 1 | Signed Integer, 8 byte value |
| | | | 0 | 0 | 1 | 0 | 0 | Unsigned Integer, 1 byte value |
| | | | 0 | 0 | 1 | 0 | 1 | Unsigned Integer, 2 byte value |
| | | | 0 | 0 | 1 | 1 | 0 | Unsigned Integer, 4 byte value |
| | | | 0 | 0 | 1 | 1 | 1 | Unsigned Integer, 8 byte value |
| | | | 0 | 1 | 0 | 0 | 0 | Boolean False |
| | | | 0 | 1 | 0 | 0 | 1 | Boolean True |
| | | | 0 | 1 | 0 | 1 | 0 | Floating Point Number, 4 byte value |
| | | | 0 | 1 | 0 | 1 | 1 | Floating Point Number, 8 byte |

TABLE 1-continued

Example element type field values.

| 7 | 6 | 5 | 4 | 3 | 2 | 1 | 0 | value |
|---|---|---|---|---|---|---|---|---|
|   |   |   | 0 | 1 | 1 | 0 | 0 | UTF8-String, 1 byte length |
|   |   |   | 0 | 1 | 1 | 0 | 1 | UTF8-String, 2 byte length |
|   |   |   | 0 | 1 | 1 | 1 | 0 | UTF8-String, 4 byte length |
|   |   |   | 0 | 1 | 1 | 1 | 1 | UTF8-String, 8 byte length |
|   |   |   | 1 | 0 | 0 | 0 | 0 | Byte String, 1 byte length |
|   |   |   | 1 | 0 | 0 | 0 | 1 | Byte String, 2 byte length |
|   |   |   | 1 | 0 | 0 | 1 | 0 | Byte String, 4 byte length |
|   |   |   | 1 | 0 | 0 | 1 | 1 | Byte String, 8 byte length |
|   |   |   | 1 | 0 | 1 | 0 | 0 | Null |
|   |   |   | 1 | 0 | 1 | 0 | 1 | Dictionary |
|   |   |   | 1 | 0 | 1 | 1 | 0 | Array |
|   |   |   | 1 | 0 | 1 | 1 | 1 | Path |
|   |   |   | 1 | 1 | 0 | 0 | 0 | End of Container |

The tag control field indicates a form of the tag in the tag field 1122 assigned to the TLV element (including a zero-length tag). Examples, of tag control field values are provided in Table 2 below.

TABLE 2

Example values for tag control field.

| 7 | 6 | 5 | 4 | 3 | 2 | 1 | 0 |   |
|---|---|---|---|---|---|---|---|---|
| 0 | 0 | 0 |   |   |   |   |   | Anonymous, 0 bytes |
| 0 | 0 | 1 |   |   |   |   |   | Context-specific Tag, 1 byte |
| 0 | 1 | 0 |   |   |   |   |   | Core Profile Tag, 2 bytes |
| 0 | 1 | 1 |   |   |   |   |   | Core Profile Tag, 4 bytes |
| 1 | 0 | 0 |   |   |   |   |   | Implicit Profile Tag, 2 bytes |
| 1 | 0 | 1 |   |   |   |   |   | Implicit Profile Tag, 4 bytes |
| 1 | 1 | 0 |   |   |   |   |   | Fully-qualified Tag, 6 bytes |
| 1 | 1 | 1 |   |   |   |   |   | Fully-qualified Tag, 8 bytes |

In other words, in embodiments having a control byte, the control byte may indicate a length of the tag.

In certain embodiments, the tag field 1122 may include zero to eight bytes, such as eight, sixteen, thirty two, or sixty four bits. In some embodiments, the tag of the tag field may be classified as profile-specific tags or context-specific tags. Profile-specific tags identify elements globally using a vendor Id, a profile Id, and/or tag number as discussed below. Context-specific tags identify TLV elements within a context of a containing dictionary element and may include a single-byte tag number. Since context-specific tags are defined in context of their containers, a single context-specific tag may have different interpretations when included in different containers. In some embodiments, the context may also be derived from nested containers.

In embodiments having the control byte, the tag length is encoded in the tag control field and the tag field 1122 includes a possible three fields: a vendor Id field, a profile Id field, and a tag number field. In the fully-qualified form, the encoded tag field 1122 includes all three fields with the tag number field including 16 or 32 bits determined by the tag control field. In the implicit form, the tag includes only the tag number, and the vendor Id and profile number are inferred from the protocol context of the TLV element. The core profile form includes profile-specific tags, as discussed above. Context-specific tags are encoded as a single byte conveying the tag number. Anonymous elements have zero-length tag fields 1122.

In some embodiments without a control byte, two bits may indicate a length of the tag field 1122, two bits may indicate a length of the length field 1124, and four bits may indicate a type of information stored in the value field 1126. An example of possible encoding for the upper 8 bits for the tag field is illustrated below in Table 3.

TABLE 3

Tag field of a TLV packet

| Byte 0 | | | | | | | | |
|---|---|---|---|---|---|---|---|---|
| 7 | 6 | 5 | 4 | 3 | 2 | 1 | 0 | Description |
| 0 | 0 | — | — | — | — | — | — | Tag is 8 bits |
| 0 | 1 | — | — | — | — | — | — | Tag is 16 bits |
| 1 | 0 | — | — | — | — | — | — | Tag is 32 bits |
| 1 | 1 | — | — | — | — | — | — | Tag is 64 bits |
| — | — | 0 | 0 | — | — | — | — | Length is 8 bits |
| — | — | 0 | 1 | — | — | — | — | Length is 16 bits |
| — | — | 1 | 0 | — | — | — | — | Length is 32 bits |
| — | — | 1 | 1 | — | — | — | — | Length is 64 bits |
| — | — | — | — | 0 | 0 | 0 | 0 | Boolean |
| — | — | — | — | 0 | 0 | 0 | 1 | Fixed 8-bit Unsigned |
| — | — | — | — | 0 | 0 | 1 | 0 | Fixed 8-bit Signed |
| — | — | — | — | 0 | 0 | 1 | 1 | Fixed 16-bit Unsigned |
| — | — | — | — | 0 | 1 | 0 | 0 | Fixed 16-bit Signed |
| — | — | — | — | 0 | 1 | 0 | 1 | Fixed 32-bit Unsigned |
| — | — | — | — | 0 | 1 | 1 | 0 | Fixed 32-bit Signed |
| — | — | — | — | 0 | 1 | 1 | 1 | Fixed 64-bit Unsigned |
| — | — | — | — | 1 | 0 | 0 | 0 | Fixed 64-bit Signed |
| — | — | — | — | 1 | 0 | 0 | 1 | 32-bit Floating Point |
| — | — | — | — | 1 | 0 | 1 | 0 | 64-bit Floating Point |
| — | — | — | — | 1 | 0 | 1 | 1 | UTF-8 String |
| — | — | — | — | 1 | 1 | 0 | 0 | Opaque Data |
| — | — | — | — | 1 | 1 | 0 | 1 | Container |

As illustrated in Table 3, the upper 8 bits of the tag field 1122 may be used to encode information about the tag field 1122, length field 1124, and the value field 1126, such that the tag field 112 may be used to determine length for the tag field 122 and the length fields 1124. Remaining bits in the tag field 1122 may be made available for user-allocated and/or user-assigned tag values.

The length field 1124 may include eight, sixteen, thirty two, or sixty four bits as indicated by the tag field 1122 as illustrated in Table 3 or the element field as illustrated in Table 2. Moreover, the length field 1124 may include an unsigned integer that represents a length of the encoded in the value field 1126. In some embodiments, the length may be selected by a device sending the TLV element. The value field 1126 includes the payload data to be decoded, but interpretation of the value field 1126 may depend upon the tag length fields, and/or control byte. For example, a TLV packet without a control byte including an 8 bit tag is illustrated in Table 4 below for illustration.

TABLE 4

Example of a TLV packet including an 8-bit tag

| Tag | Length | Value | Description |
|---|---|---|---|
| 0x0d | 0x24 | | |
| 0x09 | 0x04 | 0x42 95 00 00 | 74.5 |
| 0x09 | 0x04 | 0x42 98 66 66 | 76.2 |
| 0x09 | 0x04 | 0x42 94 99 9a | 74.3 |
| 0x09 | 0x04 | 0x42 98 99 9a | 76.3 |
| 0x09 | 0x04 | 0x42 95 33 33 | 74.6 |
| 0x09 | 0x04 | 0x42 98 33 33 | 76.1 |

As illustrated in Table 4, the first line indicates that the tag field 1122 and the length field 1124 each have a length of 8 bits. Additionally, the tag field 1122 indicates that the tag type is for the first line is a container (e.g., the TLV packet). The tag field 1124 for lines two through six indicate that each entry in the TLV packet has a tag field 1122 and length field 1124 consisting of 8 bits each. Additionally, the tag field 1124 indicates that each entry in the TLV packet has a value field 1126 that includes a 32-bit floating point. Each entry in the value field 1126 corresponds to a floating number that may be decoded using the corresponding tag field 1122 and length field 1124 information. As illustrated in this example, each entry in the value field 1126 corresponds to a temperature in Fahrenheit. As can be understood, by storing data in a TLV packet as described above, data may be transferred compactly while remaining flexible for varying lengths and information as may be used by different devices in the fabric. Moreover, in some embodiments, multi-byte integer fields may be transmitted in little-endian order or big-endian order.

By transmitting TLV packets in using an order protocol (e.g., little-endian) that may be used by sending/receiving device formats (e.g., JSON), data transferred between nodes may be transmitted in the order protocol used by at least one of the nodes (e.g., little endian). For example, if one or more nodes include ARM or ix86 processors, transmissions between the nodes may be transmitted using little-endian byte ordering to reduce the use of byte reordering. By reducing the inclusion of byte reordering, the TLV format enable devices to communicate using less power than a transmission that uses byte reordering on both ends of the transmission. Furthermore, TLV formatting may be specified to provide a one-to-one translation between other data storage techniques, such as JSON+ Extensible Markup Language (XML). As an example, the TLV format may be used to represent the following XML Property List:

```
<?xml version="1.0" encoding="UTF-8"?>
<!DOCTYPE plist PUBLIC "-//Apple Computer//DTD PLIST 1.0//EN"
"http://www.apple.com/DTDs/PropertyList-1.0.dtd">
<plist version="1.0">
<dict>
   <key>OfflineMode</key>
   <false/>
   <key>Network</key>
   <dict>
      <key>IPv4</key>
      <dict>
         <key>Method</key>
         <string>dhcp</string>
      </dict>
      <key>IPv6</key>
      <dict>
         <key>Method</key>
         <string>auto</string>
      </dict>
   </dict>
   <key>Technologies</key>
   <dict>
      <key>wifi</key>
      <dict>
         <key>Enabled</key>
         <true/>
         <key>Devices</key>
         <dict>
            <key>wifi__18b4300008b027</key>
            <dict>
               <key>Enabled</key>
               <true/>
            </dict>
         </dict>
         <key>Services</key>
         <array>
            <string>wifi__18b4300008b027__3939382d33204 16
            c70696e652054657 272616365</string>
         </array>
      </dict>
      <key>802.15.4</key>
      <dict>
         <key>Enabled</key>
         <true/>
         <key>Devices</key>
         <dict>
            <key>802.15.4__18b43000000002fac4</key>
            <dict>
               <key>Enabled</key>
               <true/>
            </dict>
         </dict>
         <key>Services</key>
         <array>
            <string>802.15.4__18b43000000002fac4__3 939382d332041
            6c70696e6520546572</string>
         </array>
      </dict>
   </dict>
   <key>Services</key>
   <dict>
   <key>wifi__18b4300008b027__3939382d3320416c70696e6520546572
   72616365</key>
      <dict>
         <key>Name</key>
         <string>998-3 Alpine Terrace</string>
         <key>SSID</key>
         <data>3939382d3320416c70696e652054657272616365
         </data>
         <key>Frequency</key>
         <integer>2462</integer>
         <key>AutoConnect</key>
         <true/>
         <key>Favorite</key>
         <true/>
         <key>Error</key>
         <string/>
         <key>Network</key>
         <dict>
            <key>IPv4</key>
            <dict>
               <key>DHCP</key>
               <dict>
                  <key>LastAddress</key>
                  <data>0a02001e</data>
               </dict>
            </dict>
            <key>IPv6</key>
            <dict/>
         </dict>
      </dict>
      <key>802.15.4__18b43000000002fac4__3939382d3320416c70696e
      6520546572</key>
      <dict>
         <key>Name</key>
         <string>998-3 Alpine Ter</string>
         <key>EPANID</key>
         <data>3939382d3320416c70696e6520546572</data>
         <key>Frequency</key>
         <integer>2412</integer>
         <key>AutoConnect</key>
         <true/>
         <key>Favorite</key>
         <true/>
         <key>Error</key>
         <string/>
         <key>Network</key>
         <dict/>
      </dict>
   </dict>
</dict>
</plist>
```

As an example, the above property list may be represented in tags of the above described TLV format (without a control byte) according to Table 5 below.

TABLE 5

Example representation of the XML Property List in TLV format

| XML Key | Tag Type | Tag Number |
|---|---|---|
| OfflineMode | Boolean | 1 |
| IPv4 | Container | 3 |
| IPv6 | Container | 4 |
| Method | String | 5 |
| Technologies | Container | 6 |
| WiFi | Container | 7 |
| 802.15.4 | Container | 8 |
| Enabled | Boolean | 9 |
| Devices | Container | 10 |
| ID | String | 11 |
| Services | Container | 12 |
| Name | String | 13 |
| SSID | Data | 14 |
| EPANID | Data | 15 |
| Frequency | 16-bit Unsigned | 16 |
| AutoConnect | Boolean | 17 |
| Favorite | Boolean | 18 |
| Error | String | 19 |
| DHCP | String | 20 |
| LastAddress | Data | 21 |
| Device | Container | 22 |
| Service | Container | 23 |

Similarly, Table 6 illustrates an example of literal tag, length, and value representations for the example XML Property List.

TABLE 6

Example of literal values for tag, length, and value fields for XML Property List

| Tag | Length | Value | Description |
|---|---|---|---|
| 0x40 01 | 0x01 | 0 | OfflineMode |
| 0x4d 02 | 0x14 | | Network |
| 0x4d 03 | 0x07 | | Network.IPv4 |
| 0x4b 05 | 0x04 | "dhcp" | Network.IPv4.Method |
| 0x4d 04 | 0x07 | | Network.IPv6 |
| 0x4b 05 | 0x04 | "auto" | Network.IPv6.Method |
| 0x4d 06 | 0xd6 | | Technologies |
| 0x4d 07 | 0x65 | | Technologies.wifi |
| 0x40 09 | 0x01 | 1 | Technologies.wifi.Enabled |
| 0x4d 0a | 0x5e | | Technologies.wifi.Devices |
| 0x4d 16 | 0x5b | | Technologies.wifi.Devices.Device.[0] |
| 0x4b 0b | 0x13 | "wifi_18b43 . . . " | Technologies.wifi.Devices.Device.[0].ID |
| 0x40 09 | 0x01 | 1 | Technologies.wifi.Devices.Device.[0].Enabled |
| 0x4d 0c | 0x3e | | Technologies.wifi.Devices.Device.[0].Services |
| 0x0b | 0x3c | "wifi_18b43 . . . " | Technologies.wifi.Devices.Device.[0].Services.[0] |
| 0x4d 08 | 0x6b | | Technologies.802.15.4 |
| 0x40 09 | 0x01 | 1 | Technologies.802.15.4.Enabled |
| 0x4d 0a | 0x64 | | Technologies.802.15.4.Devices |
| 0x4d 16 | 0x61 | | Technologies.802.15.4.Devices.Device.[0] |
| 0x4b 0b | 0x1a | "802.15.4_18 . . . " | Technologies.802.15.4.Devices.Device.[0].ID |
| 0x40 09 | 0x01 | 1 | Technologies.802.15.4.Devices.Device.[0].Enabled |
| 0x4d 0c | 0x3d | | Technologies.802.15.4.Devices.Device.[0].Services |
| 0x0b | 0x3b | "802.15.4_18 . . . " | Technologies.802.15.4.Devices.Device.[0].Services.[0] |
| 0x4d 0c | 0xcb | | Services |
| 0x4d 17 | 0x75 | | Services.Service.[0] |
| 0x4b 0b | 0x13 | "wifi_18b43 . . . " | Services.Service.[0].ID |
| 0x4b 0d | 0x14 | "998-3 Alp . . . " | Services.Service.[0].Name |
| 0x4c 0f | 0x28 | 3939382d . . . | Services.Service.[0].SSID |
| 0x45 10 | 0x02 | 2462 | Services.Service.[0].Frequency |
| 0x40 11 | 0x01 | 1 | Services.Service.[0].AutoConnect |
| 0x40 12 | 0x01 | 1 | Services.Service.[0].Favorite |
| 0x4d 02 | 0x0d | | Services.Service.[0].Network |
| 0x4d 03 | 0x0a | | Services.Service.[0].Network.IPv4 |
| 0x4d 14 | 0x07 | | Services.Service.[0].Network.IPv4.DHCP |
| 0x45 15 | 0x04 | 0x0a02001e | Services.Service.[0].Network.IPv4.LastAddress |
| 0x4d 17 | 0x50 | | Services.Service.[1] |
| 0x4b 0b | 0x1a | "802.15.4_18 . . . " | Services.Service.[1].ID |
| 0x4c 0d | 0x10 | "998-3 Alp . . . " | Services.Service.[1].Name |
| 0x4c 0f | 0x10 | 3939382d . . . | Services.Service.[1].EPANID |
| 0x45 10 | 0x02 | 2412 | Services.Service.[1].Frequency |
| 0x40 11 | 0x01 | 1 | Services.Service.[1].AutoConnect |
| 0x40 12 | 0x01 | 1 | Services.Service.[1].Favorite |

The TLV format enables reference of properties that may also be enumerated with XML, but does so with a smaller storage size. For example, Table 7 illustrates a comparison of data sizes of the XML Property List, a corresponding binary property list, and the TLV format.

TABLE 7

Comparison of the sizes of property list data sizes.

| List Type | Size in Bytes | Percentage of XML Size |
|---|---|---|
| XML | 2,199 | — |
| Binary | 730 | −66.8% |
| TLV | 450 | −79.5% |

By reducing the amount of data used to transfer data, the TLV format enables the fabric 1000 transfer data to and/or from devices having short duty cycles due to limited power (e.g., battery supplied devices). In other words, the TLV format allows flexibility of transmission while increasing compactness of the data to be transmitted.

C. General Message Protocol

Figure 12:
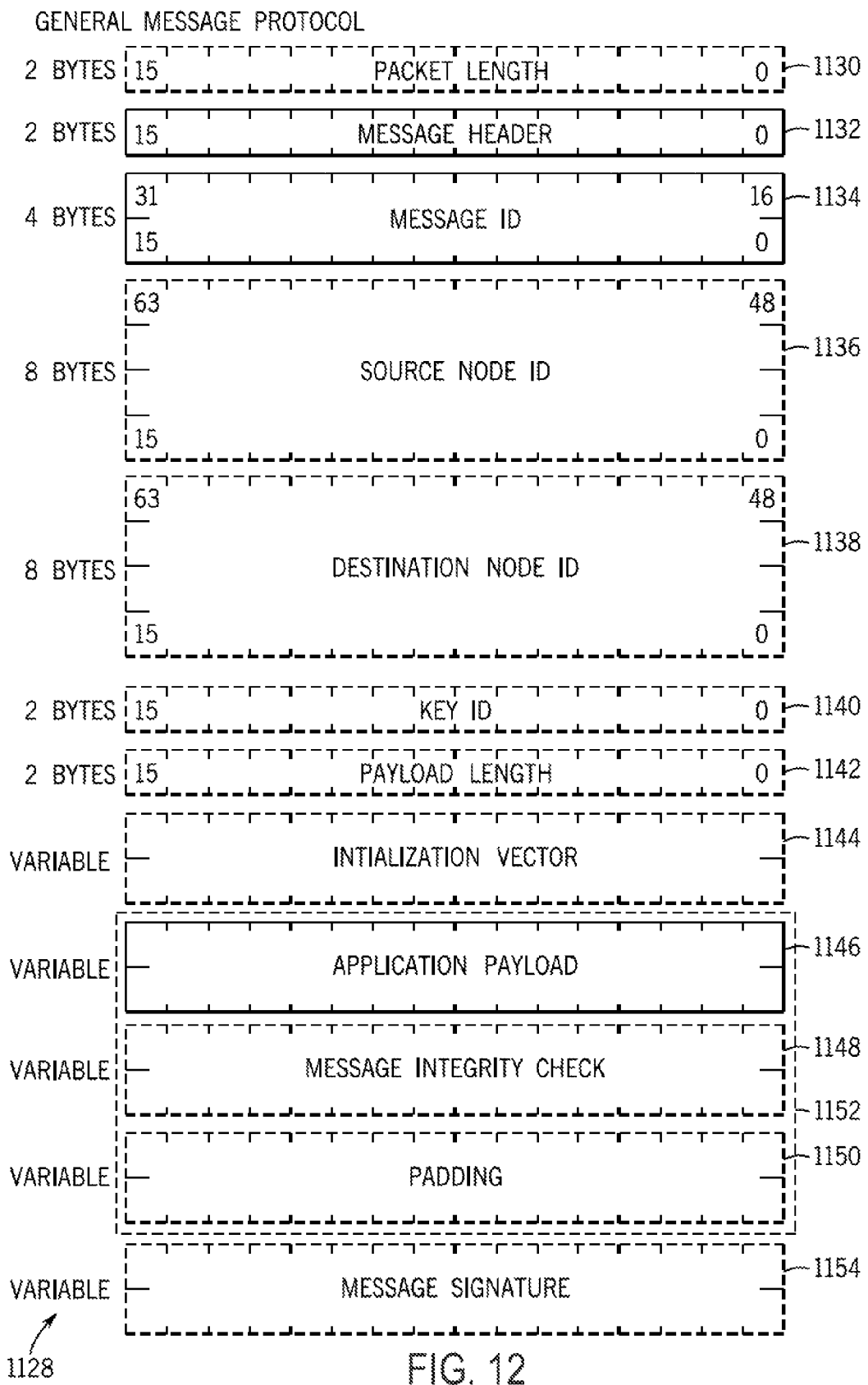
FIG. 12 illustrates a general message protocol (GMP) that may be used to transmit data over the fabric network that may include the TLV packet of FIG. 11, in accordance with an embodiment.

In addition to sending particular entries of varying sizes, data may be transmitted within the fabric using a general message protocol that may incorporate TLV formatting. An embodiment of a general message protocol (GMP) 1128 is illustrated in FIG. 12. In certain embodiments, the general message protocol (GMP) 1128 may be used to transmit data within the fabric. The GMP 1128 may be used to transmit data via connectionless protocols (e.g., UDP) and/or connection-oriented protocols (e.g., TCP). Accordingly, the GMP 1128 may flexibly accommodate information that is used in one protocol while ignoring such information when using another protocol. Moreover, the GMP 1226 may enable omission of fields that are not used in a specific transmission. Data that may be omitted from one or more GMP 1226 transfers is generally indicated using grey borders around the data units. In some embodiments, the multi-byte integer fields may be transmitted in a little-endian order or a big-endian order.

i. Packet Length

In some embodiments, the GMP 1128 may include a Packet Length field 1130. In some embodiments, the Packet Length field 1130 includes 2 bytes. A value in the Packet Length field 1130 corresponds to an unsigned integer indicating an overall length of the message in bytes, excluding the Packet Length field 1130 itself. The Packet Length field 1130 may be present when the GMP 1128 is transmitted over a TCP connection, but when the GMP 1128 is transmitted over a UDP connection, the message length may be equal to the payload length of the underlying UDP packet obviating the Packet Length field 1130.

ii. Message Header

Figure 13:
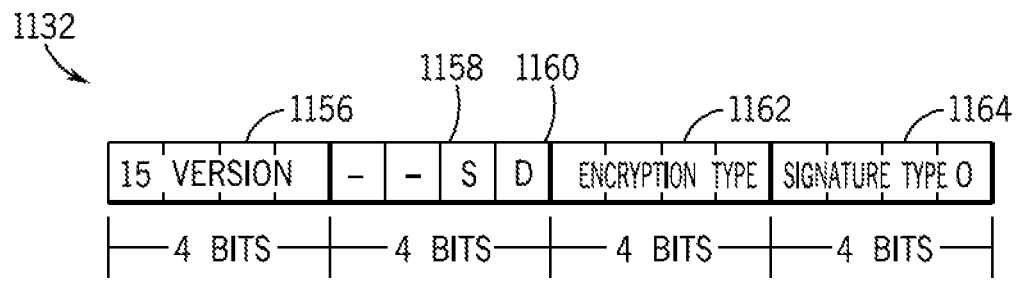
FIG. 13 illustrates a message header field of the GMP of FIG. 12, in accordance with an embodiment.

The GMP 1128 may also include a Message Header 1132 regardless of whether the GMP 1128 is transmitted using TCP or UDP connections. In some embodiments, the Message Header 1132 includes two bytes of data arranged in the format illustrated in FIG. 13. As illustrated in FIG. 13, the Message Header 1132 includes a Version field 1156. The Version field 1156 corresponds to a version of the GMP 1128 that is used to encode the message. Accordingly, as the GMP 1128 is updated, new versions of the GMP 1128 may be created, but each device in a fabric may be able to receive a data packet in any version of GMP 1128 known to the device. In addition to the Version field 1156, the Message Header 1132 may include an S Flag field 1158 and a D Flag 1160. The S Flag 1158 is a single bit that indicates whether a Source Node Id (discussed below) field is included in the transmitted packet. Similarly, the D Flag 1160 is a single bit that indicates whether a Destination Node Id (discussed below) field is included in the transmitted packet.

The Message Header 1132 also includes an Encryption Type field 1162. The Encryption Type field 1162 includes four bits that specify which type of encryption/integrity checking applied to the message, if any. For example, 0x0 may indicate that no encryption or message integrity checking is included, but a decimal 0x1 may indicate that AES-128-CTR encryption with HMAC-SHA-1 message integrity checking is included.

Finally, the Message Header 1132 further includes a Signature Type field 1164. The Signature Type field 1164 includes four bits that specify which type of digital signature is applied to the message, if any. For example, 0x0 may indicate that no digital signature is included in the message, but 0x1 may indicate that the Elliptical Curve Digital Signature Algorithm (ECDSA) with Prime256v1 elliptical curve parameters is included in the message.

iii. Message Id

Returning to FIG. 12, the GMP 1128 also includes a Message Id field 1134 that may be included in a transmitted message regardless of whether the message is sent using TCP or UDP. The Message Id field 1134 includes four bytes that correspond to an unsigned integer value that uniquely identifies the message from the perspective of the sending node. In some embodiments, nodes may assign increasing Message Id 1134 values to each message that they send returning to zero after reaching $2^{32}$ messages.

iv. Source Node Id

In certain embodiments, the GMP 1128 may also include a Source Node Id field 1136 that includes eight bytes. As discussed above, the Source Node Id field 1136 may be present in a message when the single-bit S Flag 1158 in the Message Header 1132 is set to 1. In some embodiments, the Source Node Id field 1136 may contain the Interface ID 1104 of the ULA 1098 or the entire ULA 1098. In some embodiments, the bytes of the Source Node Id field 1136 are transmitted in an ascending index-value order (e.g., EUI[0] then EUI[1] then EUI[2] then EUI[3], etc.).

v. Destination Node Id

The GMP 1128 may include a Destination Node Id field 1138 that includes eight bytes. The Destination Node Id field 1138 is similar to the Source Node Id field 1136, but the Destination Node Id field 1138 corresponds to a destination node for the message. The Destination Node Id field 1138 may be present in a message when the single-bit D Flag 1160 in the Message Header 1132 is set to 1. Also similar to the Source Node Id field 1136, in some embodiments, bytes of the Destination Node Id field 1138 may be transmitted in an ascending index-value order (e.g., EUI[0] then EUI[1] then EUI[2] then EUI[3], etc.).

vi. Key Id

In some embodiments, the GMP 1128 may include a Key Id field 1140. In certain embodiments, the Key Id field 1140 includes two bytes. The Key Id field 1140 includes an unsigned integer value that identifies the encryption/message integrity keys used to encrypt the message. The presence of the Key Id field 1140 may be determined by the value of Encryption Type field 1162 of the Message Header 1132. For example, in some embodiments, when the value for the Encryption Type field 1162 of the Message Header 1132 is 0x0, the Key Id field 1140 may be omitted from the message.

Figure 14:
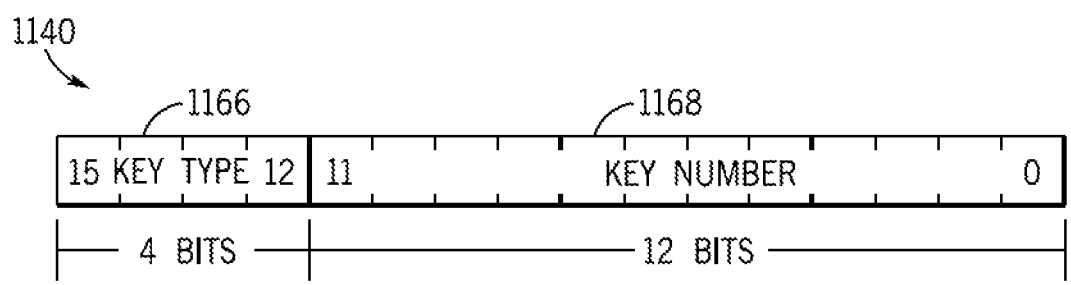
FIG. 14 illustrates a key identifier field of the GMP of FIG. 12, in accordance with an embodiment.

An embodiment of the Key Id field 1140 is presented in FIG. 14. In the illustrated embodiment, the Key Id field 1140 includes a Key Type field 1166 and a Key Number field 1168. In some embodiments, the Key Type field 1166 includes four bits. The Key Type field 1166 corresponds to an unsigned integer value that identifies a type of encryption/message integrity used to encrypt the message. For example, in some embodiments, if the Key Type field 1166 is 0x0, the fabric key is shared by all or most of the nodes in the fabric. However, if the Key Type field 1166 is 0x1, the fabric key is shared by a pair of nodes in the fabric.

The Key Id field 1140 also includes a Key Number field 1168 that includes twelve bits that correspond to an unsigned integer value that identifies a particular key used to encrypt the message out of a set of available keys, either shared or fabric keys.

vii. Payload Length

In some embodiments, the GMP 1128 may include a Payload Length field 1142. The Payload Length field 1142, when present, may include two bytes. The Payload Length field 1142 corresponds to an unsigned integer value that indicates a size in bytes of the Application Payload field. The Payload Length field 1142 may be present when the message is encrypted using an algorithm that uses message padding, as described below in relation to the Padding field.

viii. Initialization Vector

In some embodiments, the GMP 1128 may also include an Initialization Vector (IV) field 1144. The IV field 1144, when present, includes a variable number of bytes of data. The IV field 1144 contains cryptographic IV values used to encrypt the message. The IV field 1144 may be used when the message is encrypted with an algorithm that uses an IV. The length of the IV field 1144 may be derived by the type of encryption used to encrypt the message.

ix. Application Payload

The GMP 1128 includes an Application Payload field 1146. The Application Payload field 1146 includes a variable number of bytes. The Application Payload field 1146 includes application data conveyed in the message. The length of the Application Payload field 1146 may be determined from the Payload Length field 1142, when present. If the Payload Length field 1142 is not present, the length of the Application Payload field 1146 may be determined by subtracting the length of all other fields from the overall length of the message and/or data values included within the Application Payload 1146 (e.g., TLV).

Figure 15:
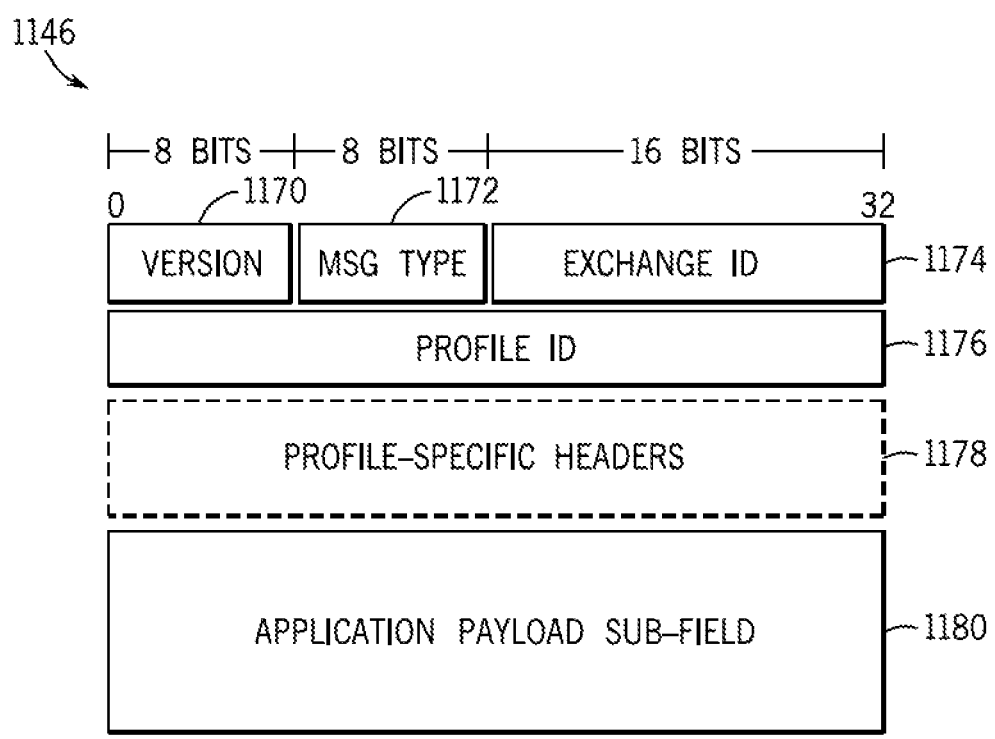
FIG. 15 illustrates an application payload field of the GMP of FIG. 12, in accordance with an embodiment.

An embodiment of the Application Payload field 1146 is illustrated in FIG. 15. The Application Payload field 1146 includes an APVersion field 1170. In some embodiments, the APVersion field 1170 includes eight bits that indicate what version of fabric software is supported by the sending device. The Application Payload field 1146 also includes a Message Type field 1172. The Message Type field 1172 may include eight bits that correspond to a message operation code that indicates the type of message being sent within a profile. For example, in a software update profile, a 0x00 may indicate that the message being sent is an image announce. The Application Payload field 1146 further includes an Exchange Id field 1174 that includes sixteen bits that corresponds to an exchange identifier that is unique to the sending node for the transaction.

In addition, the Application Payload field 1146 includes a Profile Id field 1176. The Profile Id 1176 indicates a "theme of discussion" used to indicate what type of communication occurs in the message. The Profile Id 1176 may correspond to one or more profiles that a device may be capable of communicating. For example, the Profile Id 1176 may indicate that the message relates to a core profile, a software update profile, a status update profile, a data management profile, a climate and comfort profile, a security profile, a safety profile, and/or other suitable profile types. Each device on the fabric may include a list of profiles which are relevant to the device and in which the device is capable of "participating in the discussion." For example, many devices in a fabric may include the core profile, the software update profile, the status update profile, and the data management profile, but only some devices would include the climate and comfort profile. The APVersion field 1170, Message Type field 1172, the Exchange Id field, the Profile Id field 1176, and the Profile-Specific Header field 1176, if present, may be referred to in combination as the "Application Header."

In some embodiments, an indication of the Profile Id via the Profile Id field 1176 may provide sufficient information to provide a schema for data transmitted for the profile. However, in some embodiments, additional information may be used to determine further guidance for decoding the Application Payload field 1146. In such embodiments, the Application Payload field 1146 may include a Profile-Specific Header field 1178. Some profiles may not use the Profile-Specific Header field 1178 thereby enabling the Application Payload field 1146 to omit the Profile-Specific Header field 1178. Upon determination of a schema from the Profile Id field 1176 and/or the Profile-Specific Header field 1178, data may be encoded/decoded in the Application Payload sub-field 1180. The Application Payload sub-field 1180 includes the core application data to be transmitted between devices and/or services to be stored, rebroadcast, and/or acted upon by the receiving device/service.

x. Message Integrity Check

Returning to FIG. 12, in some embodiments, the GMP 1128 may also include a Message Integrity Check (MIC) field 1148. The MIC field 1148, when present, includes a variable length of bytes of data containing a MIC for the message. The length and byte order of the field depends upon the integrity check algorithm in use. For example, if the message is checked for message integrity using HMAC-SHA-1, the MIC field 1148 includes twenty bytes in big-endian order. Furthermore, the presence of the MIC field 1148 may be determined by whether the Encryption Type field 1162 of the Message Header 1132 includes any value other than 0x0.

xi. Padding

The GMP 1128 may also include a Padding field 1150. The Padding field 1150, when present, includes a sequence of bytes representing a cryptographic padding added to the message to make the encrypted portion of the message evenly divisible by the encryption block size. The presence of the Padding field 1150 may be determined by whether the type of encryption algorithm (e.g., block ciphers in cipher-block chaining mode) indicated by the Encryption Type field 1162 in the Message Header 1132 uses cryptographic padding.

xii. Encryption

The Application Payload field 1146, the MIC field 1148, and the Padding field 1150 together form an Encryption block 1152. The Encryption block 1152 includes the portions of the message that are encrypted when the the Encryption Type field 1162 in the Message Header 1132 is any value other than 0x0.

xiii. Message Signature

The GMP 1128 may also include a Message Signature field 1154. The Message Signature field 1154, when present, includes a sequence of bytes of variable length that contains a cryptographic signature of the message. The length and the contents of the Message Signature field may be determined according to the type of signature algorithm in use and indicated by the Signature Type field 1164 of the Message Header 1132. For example, if ECDSA using the Prime256v1 elliptical curve parameters is the algorithm in use, the Message Signature field 1154 may include two thirty-two bit integers encoded in little-endian order.

IV. Profiles and Protocols

As discussed above, one or more schemas of information may be selected upon desired general discussion type for the message. A profile may consist of one or more schemas. For example, one set of schemas of information may be used to encode/decode data in the Application Payload sub-field 1180 when one profile is indicated in the Profile Id field 1176 of the Application Payload 1146. However, a different set of schemas may be used to encode/decode data in the Application Payload sub-field 1180 when a different profile is indicated in the Profile Id field 1176 of the Application Payload 1146.

Figure 16:
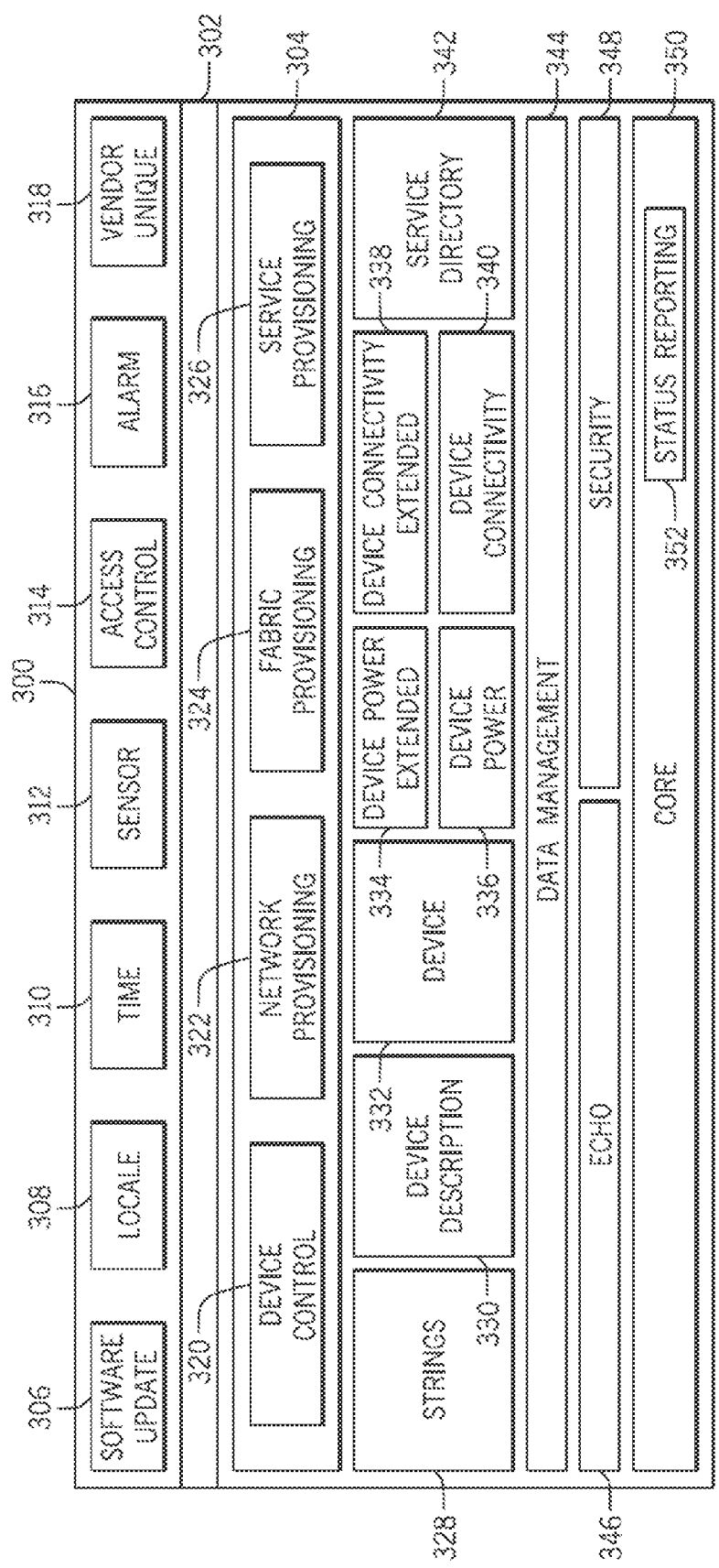
FIG. 16 illustrates a profile library that includes various profiles that may be used in the application payload field of FIG. 15.

FIG. 16 illustrates a schematic view of a variety of profiles that may be used in various messages. For example, one or more profile schemas may be stored in a profile library 300 that may be used by the devices to encode or decode messages based on a profile ID. The profile library 300 may organize the profiles into groups. For example, an application- and vendor-specific profile group 302 of profiles may be application- and vendor-specific profiles, and a provisioning group 304 of profiles may profiles used to provision networks, services, and/or fabrics. The application- and vendor-specific profile group 302 may include a software update profile 306, a locale profile 308, a time profile 310, a sensor profile 312, an access control profile 314, an alarm profile 316, and one or more vendor unique profiles 318. The software update profile 306 may be used by the devices to update software within the devices. The locale profile 308 may be used to specify a location and/or language set as the active locale for the device. The alarm profile 316 may be used to send, read, and propagate alarms.

The profiles library 300 may also include a device control profile 320, a network provisioning profile 322, a fabric provisioning profile 324, and a service provisioning profile 326. The device control profile 320 allows one device to request that another device exercise a specified device control (e.g., arm failsafe, etc.) capability. The network provisioning profile 322 enables a device to be added to a new logical network (e.g., WiFi or 802.15.4). The fabric provisioning profile 324 allows the devices to join a pre-existing fabric or create a new fabric. The service provisioning profile 326 enables the devices to be paired to a service.

The profiles library 300 may also include a strings profile 328, a device description profile 330, a device profile 332, device power extended profile 334, a device power profile 336, a device connectivity extended profile 338, a device connectivity profile 340, a service directory profile 342, a data management profile 344, an echo profile 346, a security profile 348, and a core profile 350. The device description profile 330 may be used by a device to identify one or more other devices. The service directory profile 342 enables a device to communicate with a service. The data management profile 344 enables devices to view and/or track data stored in another device. The echo profile 346 enables a device to determine whether the device is connected to a target device and the latency in the connection. The security profile 348 enables the devices to communicate securely.

The core profile 350 includes a status reporting profile 352 that enables devices to report successes and failures of requested actions. Additionally, in certain embodiments, each device may include a set of methods used to process profiles. For example, a core protocol may include the following profiles: GetProfiles, GetSchema, GetSchemas, GetProperty, GetProperties, SetProperty, SetProperties, RemoveProperty, RemoveProperties, RequestEcho, NotifyPropertyChanged, and/or NotifyPropertiesChanged. The Get Profiles method may return an array of profiles supported by a queried node. The GetSchema and GetSchemas methods may respectively return one or all schemas for a specific profile. GetProperty and GetProperties may respectively return a value or all value pairs for a profile schema. SetProperty and SetProperties may respectively set single or multiple values for a profile schema. RemoveProperty and RemoveProperties may respectively attempt to remove a single or multiple values from a profile schema. RequestEcho may send an arbitrary data payload to a specified node which the node returns unmodified. NotifyPropertyChange and NotifyPropertiesChanged may respectively issue a notification if a single/multiple value pairs have changed for a profile schema.

To aid in understanding profiles and schemas, a non-exclusive list of profiles and schemas are provided below for illustrative purposes.

A. Status Reporting

Figure 17:
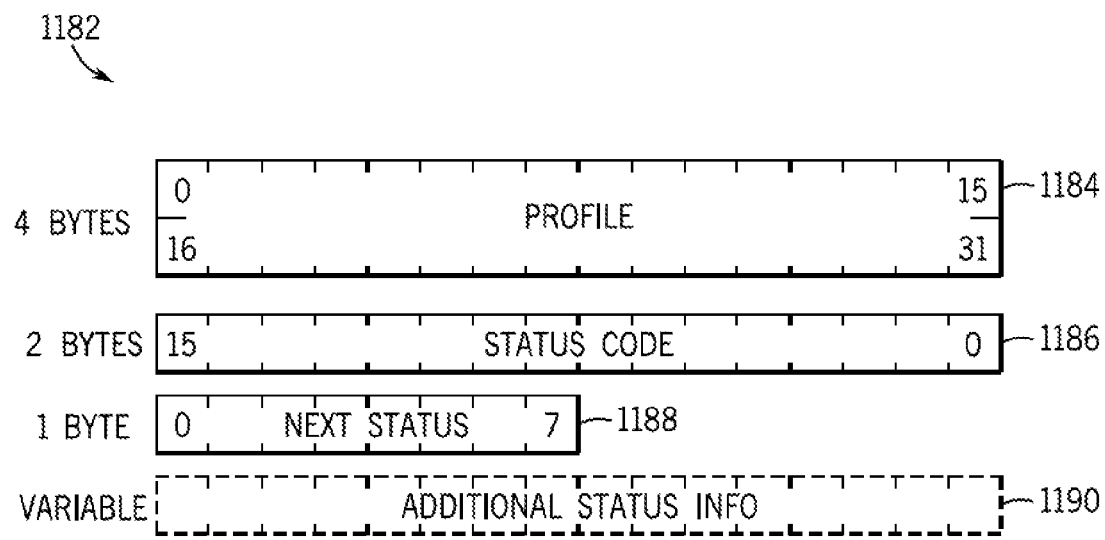
FIG. 17 illustrates a status reporting schema that may be used to update status information in the fabric network, in accordance with an embodiment.

A status reporting schema is presented as the status reporting frame 1182 in FIG. 17. The status reporting schema may be a separate profile or may be included in one or more profiles (e.g., a core profile). In certain embodiments, the status reporting frame 1182 includes a profile field 1184, a status code field 1186, a next status field 1188, and may include an additional status info field 1190.

i. Profile Field

Figure 18:
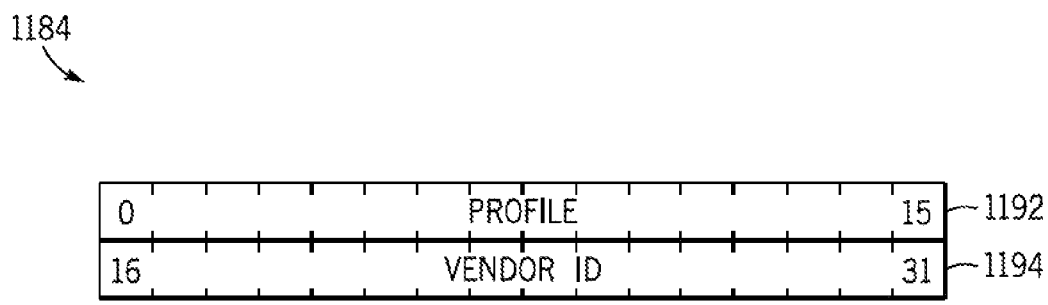
FIG. 18 illustrates a profile field of the status reporting schema of FIG. 17, in accordance with an embodiment.

In some embodiments, the profile field 1184 includes four bytes of data that defines the profile under which the information in the present status report is to be interpreted. An embodiment of the profile field 1184 is illustrated in FIG. 18 with two sub-fields. In the illustrated embodiment, the profile field 1184 includes a profile Id sub-field 1192 that includes sixteen bits that corresponds to a vendor-specific identifier for the profile under which the value of the status code field 1186 is defined. The profile field 1184 may also includes a vendor Id sub-field 1194 that includes sixteen bits that identifies a vendor providing the profile identified in the profile Id sub-field 1192.

ii. Status Code

In certain embodiments, the status code field 1186 includes sixteen bits that encode the status that is being reported. The values in the status code field 1186 are interpreted in relation to values encoded in the vendor Id sub-field 1192 and the profile Id sub-field 1194 provided in the profile field 1184. Additionally, in some embodiments, the status code space may be divided into four groups, as indicated in Table 8 below.

TABLE 8

Status Code Range Table

| Range | Name | Description |
| --- | --- | --- |
| 0x0000 . . . 0x0010 | success | A request was successfully processed. |
| 0x0011 . . . 0x0020 | client error | An error has or may have occurred on the client-side of a client/server exchange. For example, the client has made a badly-formed request. |

TABLE 8-continued

Status Code Range Table

| Range | Name | Description |
|---|---|---|
| 0x0021 ... 0x0030 | server error | An error has or may have occurred on the server side of a client/server exchange. For example, the server has failed to process a client request to an operating system error. |
| 0x0031 ... 0x0040 | continue/redirect | Additional processing will be used, such as redirection, to complete a particular exchange, but no errors yet. |

Although Table 8 identifies general status code ranges that may be used separately assigned and used for each specific profile Id, in some embodiments, some status codes may be common to each of the profiles. For example, these profiles may be identified using a common profile (e.g., core profile) identifier, such as 0x00000000.

iii. Next Status

In some embodiments, the next status code field 1188 includes eight bits. The next status code field 1188 indicates whether there is following status information after the currently reported status. If following status information is to be included, the next status code field 1188 indicates what type of status information is to be included. In some embodiments, the next status code field 1188 may always be included, thereby potentially increasing the size of the message. However, by providing an opportunity to chain status information together, the potential for overall reduction of data sent may be reduced. If the next status field 1186 is 0x00, no following status information field 1190 is included. However, non-zero values may indicate that data may be included and indicate the form in which the data is included (e.g., in a TLV packet).

iv. Additional Status Info

When the next status code field 1188 is non-zero, the additional status info field 1190 is included in the message. If present, the status item field may contain status in a form that may be determined by the value of the preceding status type field (e.g., TLV format)

B. Software Update

The software update profile or protocol is a set of schemas and a client/server protocol that enables clients to be made aware of or seek information about the presence of software that they may download and install. Using the software update protocol, a software image may be provided to the profile client in a format known to the client. The subsequent processing of the software image may be generic, device-specific, or vendor-specific and determined by the software update protocol and the devices.

i. General Application Headers for the Application Payload

In order to be recognized and handled properly, software update profile frames may be identified within the Application Payload field 1146 of the GMP 1128. In some embodiments, all software update profile frames may use a common Profile Id 1176, such as 0x0000000C. Additionally, software update profile frames may include a Message Type field 1172 that indicates additional information and may chosen according to Table 9 below and the type of message being sent.

TABLE 9

Software update profile message types

| Type | Message |
|---|---|
| 0x00 | image announce |
| 0x01 | image query |

TABLE 9-continued

Software update profile message types

| Type | Message |
|---|---|
| 0x02 | image query response |
| 0x03 | download notify |
| 0x04 | notify response |
| 0x05 | update notify |
| 0x06 ... 0xff | reserved |

Additionally, as described below, the software update sequence may be initiated by a server sending the update as an image announce or a client receiving the update as an image query. In either embodiment, an Exchange Id 1174 from the initiating event is used for all messages used in relation to the software update.

ii. Protocol Sequence

Figure 19:
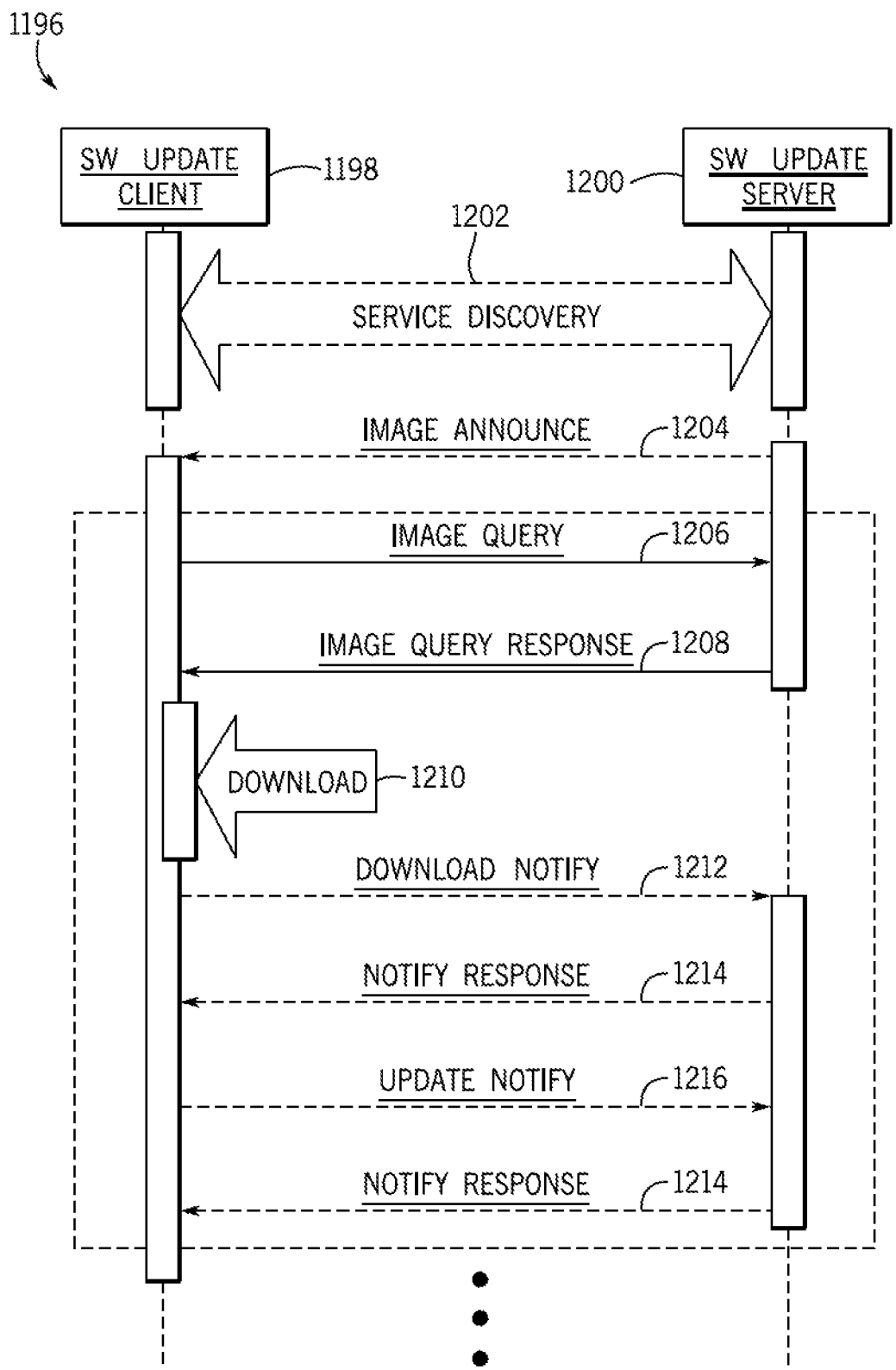
FIG. 19 illustrates a protocol sequence that may be used to perform a software update between a client and a server, in accordance with an embodiment.

FIG. 19 illustrates an embodiment of a protocol sequence 1196 for a software update between a software update client 1198 and a software update server 1200. In certain embodiments, any device in the fabric may be the software update client 1198 or the software update server 1200. Certain embodiments of the protocol sequence 1196 may include additional steps, such as those illustrated as dashed lines that may be omitted in some software update transmissions.

1. Service Discovery

In some embodiments, the protocol sequence 1196 begins with a software update profile server announcing a presence of the update. However, in other embodiments, such as the illustrated embodiment, the protocol sequence 1196 begins with a service discovery 1202, as discussed above.

2. Image Announce

In some embodiments, an image announce message 1204 may be multicast or unicast by the software update server 1200. The image announce message 1204 informs devices in the fabric that the server 1200 has a software update to offer. If the update is applicable to the client 1198, upon receipt of the image announce message 1204, the software update client 1198 responds with an image query message 1206. In certain embodiments, the image announce message 1204 may not be included in the protocol sequence 1196. Instead, in such embodiments, the software update client 1198 may use a polling schedule to determine when to send the image query message 1206.

3. Image Query

Figure 20:
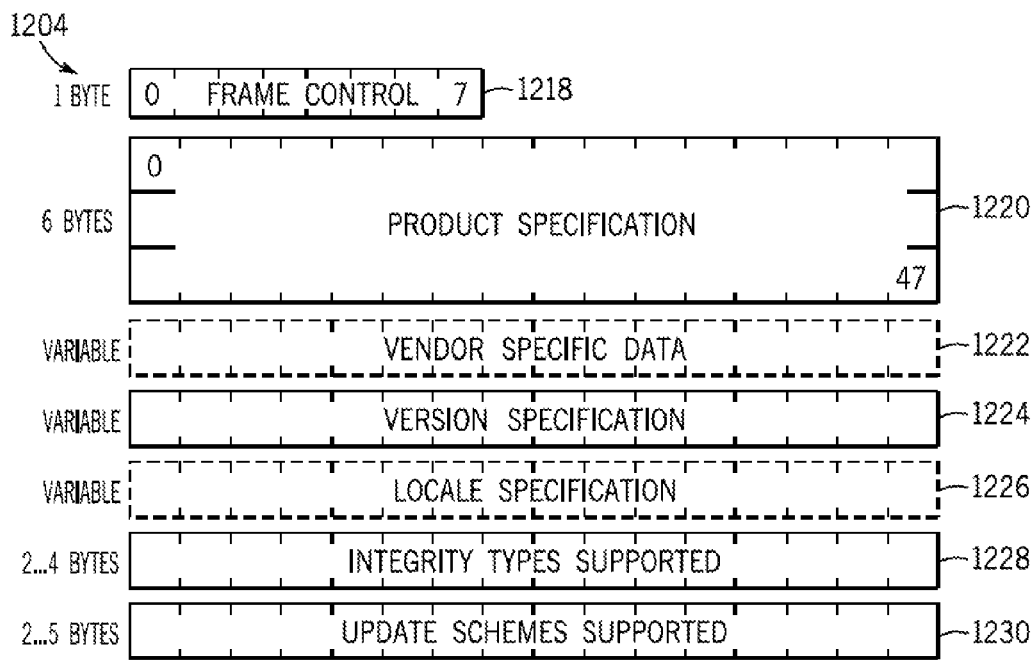
FIG. 20 illustrates an image query frame that may be used in the protocol sequence of FIG. 19, in accordance with an embodiment.

In certain embodiments, the image query message 1206 may be unicast from the software update client 1198 either in response to an image announce message 1204 or according to a polling schedule, as discussed above. The image query message 1206 includes information from the client 1198 about itself. An embodiment of a frame of the image query message 1206 is illustrated in FIG. 20. As illustrated in FIG.

20, certain embodiments of the image query message 1206 may include a frame control field 1218, a product specification field 1220, a vendor specific data field 1222, a version specification field 1224, a locale specification field 1226, an integrity type supported field 1228, and an update schemes supported field 1230.

a. Frame Control

Figure 21:
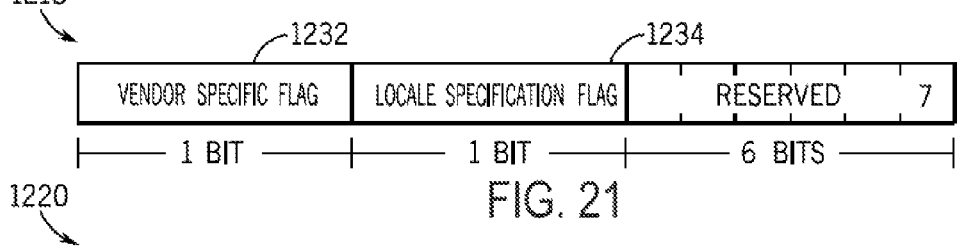
FIG. 21 illustrates a frame control field of the image query frame of FIG. 20, in accordance with an embodiment.

The frame control field 1218 includes 1 byte and indicates various information about the image query message 1204. An example of the frame control field 128 is illustrated in FIG. 21. As illustrated, the frame control field 1218 may include three sub-fields: vendor specific flag 1232, locale specification flag 1234, and a reserved field S3. The vendor specific flag 1232 indicates whether the vendor specific data field 1222 is included in the message image query message. For example, when the vendor specific flag 1232 is 0 no vendor specific data field 1222 may be present in the image query message, but when the vendor specific flag 1232 is 1 the vendor specific data field 1222 may be present in the image query message. Similarly, a 1 value in the locale specification flag 1234 indicates that a locale specification field 1226 is present in the image query message, and a 0 value indicates that the locale specification field 1226 in not present in the image query message.

b. Product Specification

Figure 22:
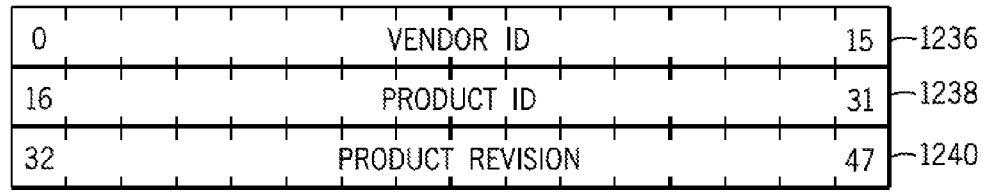
FIG. 22 illustrates a product specification field of the image query frame of FIG. 20, in accordance with an embodiment.

The product specification field 1220 is a six byte field. An embodiment of the product specification field 1220 is illustrated in FIG. 22. As illustrated, the product specification field 1220 may include three sub-fields: a vendor Id field 1236, a product Id field 1238, and a product revision field 1240. The vendor Id field 1236 includes sixteen bits that indicate a vendor for the software update client 1198. The product Id field 1238 includes sixteen bits that indicate the device product that is sending the image query message 1206 as the software update client 1198. The product revision field 1240 includes sixteen bits that indicate a revision attribute of the software update client 1198.

c. Vendor Specific Data

The vendor specific data field 1222, when present in the image query message 1206, has a length of a variable number of bytes. The presence of the vendor specific data field 1222 may be determined from the vendor specific flag 1232 of the frame control field 1218. When present, the vendor specific data field 1222 encodes vendor specific information about the software update client 1198 in a TLV format, as described above.

d. Version Specification

Figure 23:
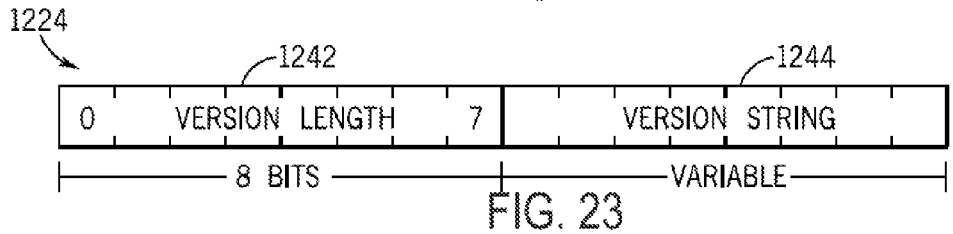
FIG. 23 illustrates a version specification field of the image query frame of FIG. 20, in accordance with an embodiment.

An embodiment of the version specification field 1224 is illustrated in FIG. 23. The version specification field 1224 includes a variable number of bytes sub-divided into two sub-fields: a version length field 1242 and a version string field 1244. The version length field 1242 includes eight bits that indicate a length of the version string field 1244. The version string field 1244 is variable in length and determined by the version length field 1242. In some embodiments, the version string field 1244 may be capped at 255 UTF-8 characters in length. The value encoded in the version string field 1244 indicates a software version attribute for the software update client 1198.

e. Locale Specification

Figure 24:
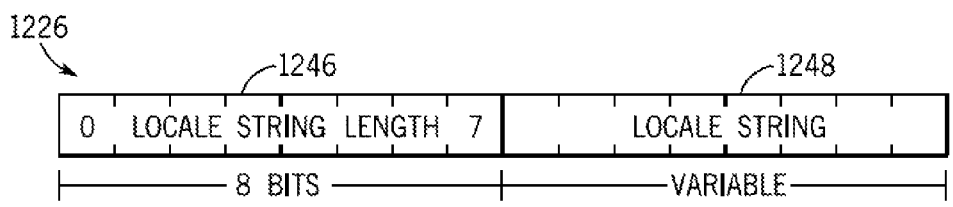
FIG. 24 illustrates a locale specification field of the image query frame of FIG. 20, in accordance with an embodiment.

In certain embodiments, the locale specification field 1226 may be included in the image query message 1206 when the locale specification flag 1234 of the frame control field 1218 is 1. An embodiment of the locale specification field 1226 is illustrated in FIG. 24. The illustrated embodiment of the locale specification field 1226 includes a variable number of bytes divided into two sub-fields: a locale string length field 1246 and a locale string field 1248. The locale string length field 1246 includes eight bits that indicate a length of the locale string field 1248. The locale string field 1248 of the locale specification field 1226 may be variable in length and contain a string of UTF-8 characters encoding a local description based on Portable Operating System Interface (POSIX) locale codes. The standard format for POSIX locale codes is [language[_territory][.codeset][@modifier]] For example, the POSIX representation for Australian English is en_AU.UTF8.

f. Integrity Types Supported

Figure 25:
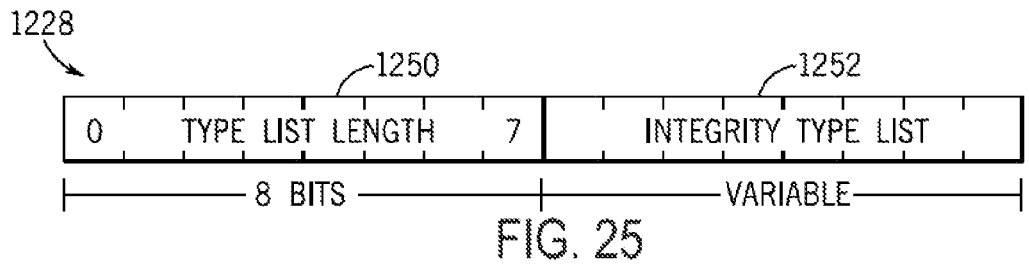
FIG. 25 illustrates an integrity types supported field of the image query frame of FIG. 20, in accordance with an embodiment.

An embodiment of the integrity types field 1228 is illustrated in FIG. 25. The integrity types supported field 1228 includes two to four bytes of data divided into two sub-fields: a type list length field 1250 and an integrity type list field 1252. The type list length field 1250 includes eight bits that indicate the length in bytes of the integrity type list field 1252. The integrity type list field 1252 indicates the value of the software update integrity type attribute of the software update client 1198. In some embodiments, the integrity type may be derived from Table 10 below.

TABLE 10

Example integrity types

| Value | Integrity Type |
| --- | --- |
| 0x00 | SHA-160 |
| 0x01 | SHA-256 |
| 0x02 | SHA-512 |

The integrity type list field 1252 may contain at least one element from Table 10 or other additional values not included.

g. Update Schemes Supported

Figure 26:
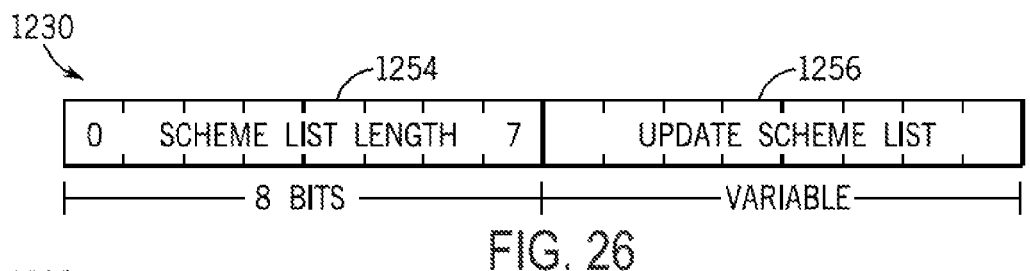
FIG. 26 illustrates an update schemes supported field of the image query frame of FIG. 20, in accordance with an embodiment.

An embodiment of the schemes supported field 1230 is illustrated in FIG. 26. The schemes supported field 1230 includes a variable number of bytes divided into two sub-fields: a scheme list length field 1254 and an update scheme list field 1256. The scheme list length field 1254 includes eight bits that indicate a length of the update scheme list field in bytes. The update scheme list field 1256 of the update schemes supported field 1222 is variable in length determined by the scheme list length field 1254. The update scheme list field 1256 represents an update schemes attributes of the software update profile of the software update client 1198. An embodiment of example values is shown in Table 11 below.

TABLE 11

Example update schemes

| Value | Update Scheme |
| --- | --- |
| 0x00 | HTTP |
| 0x01 | HTTPS |
| 0x02 | SFTP |
| 0x03 | Fabric-specific File Transfer Protocol (e.g., Bulk Data Transfer discussed below) |

Upon receiving the image query message 1206, the software update server 1200 uses the transmitted information to determine whether the software update server 1200 has an update for the software update client 1198 and how best to deliver the update to the software update client 1198.

4. Image Query Response

Returning to FIG. 19, after the software update server 1200 receives the image query message 1206 from the software update client 1198, the software update server 1200 responds with an image query response 1208. The image query response 1208 includes either information detailing why an update image is not available to the software update client 1198 or information about the available image update to enable to software update client 1198 to download and install the update.

Figure 27:
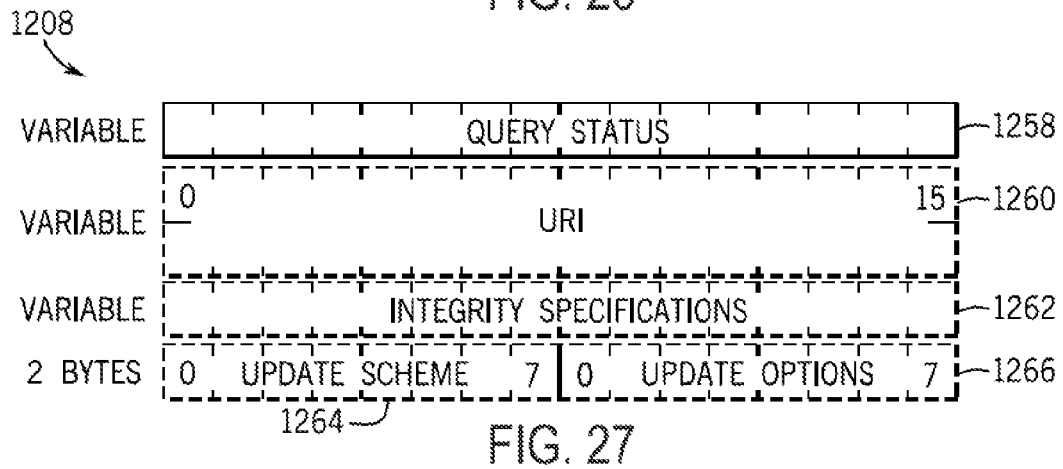
FIG. 27 illustrates an image query response frame that may be used in the protocol sequence of FIG. 19, in accordance with an embodiment.

An embodiment of a frame of the image query response 1208 is illustrated in FIG. 27. As illustrated, the image query response 1208 includes five possible sub-fields: a query status field 1258, a uniform resource identifier (URI) field 1260, an integrity specification field 1262, an update scheme field 1264, and an update options field 1266.

a. Query Status

The query status field 1258 includes a variable number of bytes and contains status reporting formatted data, as discussed above in reference to status reporting. For example, the query status field 1258 may include image query response status codes, such as those illustrated below in Table 12.

TABLE 12

Example image query response status codes

| Profile | Code | Description |
| --- | --- | --- |
| 0x00000000 | 0x0000 | The server has processed the image query message 1206 and has an update for the software update client 1198. |
| 0x0000000C | 0x0001 | The server has processed the image query message 1206, but the server does not have an update for the software update client 1198. |
| 0x00000000 | 0x0010 | The server could not process the request because of improper form for the request. |
| 0x00000000 | 0x0020 | The server could not process the request due to an internal error | b. URI

Figure 28:
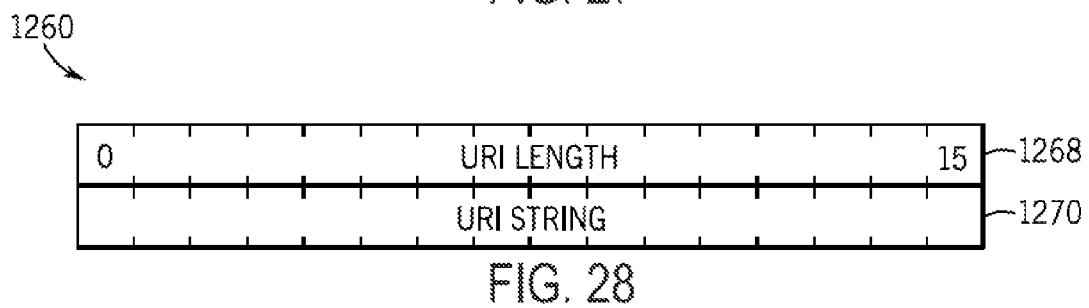
FIG. 28 illustrates a uniform resource identifier (URI) field of the image query response frame of FIG. 27, in accordance with an embodiment.

The URI field 1260 includes a variable number of bytes. The presence of the URI field 1260 may be determined by the query status field 1258. If the query status field 1258 indicates that an update is available, the URI field 1260 may be included. An embodiment of the URI field 1260 is illustrated in FIG. 28. The URI field 1260 includes two sub-fields: a URI length field 1268 and a URI string field 1270. The URI length field 1268 includes sixteen bits that indicates the length of the URI string field 1270 in UTF-8 characters. The URI string field 1270 and indicates the URI attribute of the software image update being presented, such that the software update client 1198 may be able to locate, download, and install a software image update, when present.

c. Integrity Specification

Figure 29:
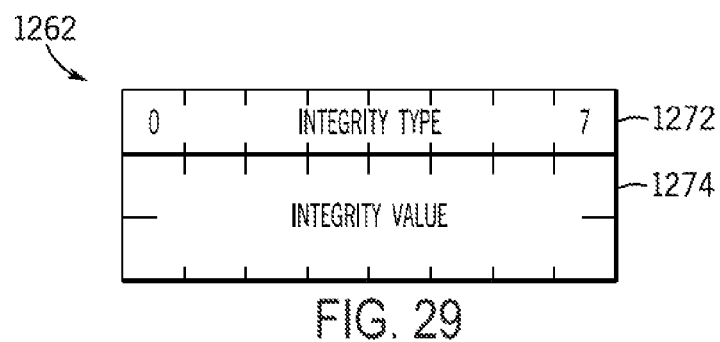
FIG. 29 illustrates a integrity specification field of the image query response frame of FIG. 27, in accordance with an embodiment.

The integrity specification field 1262 may variable in length and present when the query status field 1258 indicates that an update is available from the software update server 1198 to the software update client 1198. An embodiment of the integrity specification field 1262 is illustrated in FIG. 29. As illustrated, the integrity specification field 1262 includes two sub-fields: an integrity type field 1272 and an integrity value field 1274. The integrity type field 1272 includes eight bits that indicates an integrity type attribute for the software image update and may be populated using a list similar to that illustrated in Table 10 above. The integrity value field 1274 includes the integrity value that is used to verify that the image update message has maintained integrity during the transmission.

d. Update Scheme

The update scheme field 1264 includes eight bits and is present when the query status field 1258 indicates that an update is available from the software update server 1198 to the software update client 1198. If present, the update scheme field 1264 indicates a scheme attribute for the software update image being presented to the software update server 1198.

e. Update Options

Figure 30:
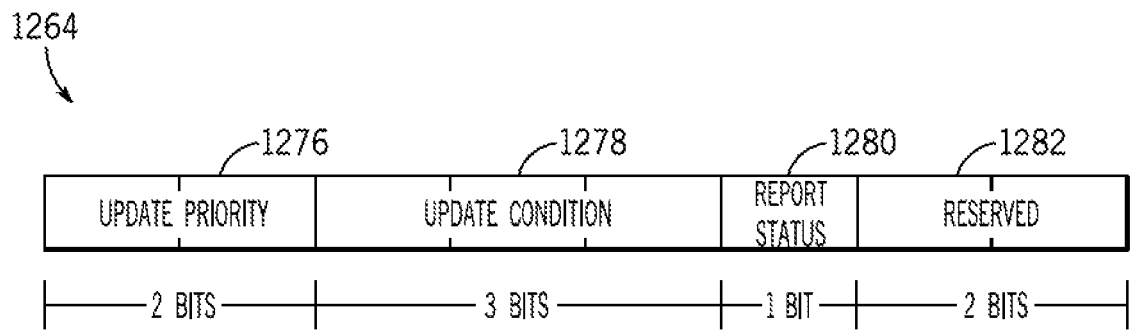
FIG. 30 illustrates an update scheme field of the image query response frame of FIG. 27, in accordance with an embodiment.

The update options field 1266 includes eight bits and is present when the query status field 1258 indicates that an update is available from the software update server 1198 to the software update client 1198. The update options field 1266 may be sub-divided as illustrated in FIG. 30. As illustrated, the update options field 1266 includes four sub-fields: an update priority field 1276, an update condition field 1278, a report status flag 1280, and a reserved field 1282. In some embodiments, the update priority field 1276 includes two bits. The update priority field 1276 indicates a priority attribute of the update and may be determined using values such as those illustrated in Table 13 below.

TABLE 13

Example update priority values

| Value | Description |
| --- | --- |
| 00 | Normal - update during a period of low network traffic |
| 01 | Critical - update as quickly as possible |

The update condition field 1278 includes three bits that may be used to determine conditional factors to determine when or if to update. For example, values in the update condition field 1278 may be decoded using the Table 14 below.

TABLE 14

Example update conditions

| Value | Decryption |
| --- | --- |
| 0 | Update without conditions |
| 1 | Update if the version of the software running on the update client software does not match the update version. |
| 2 | Update if the version of the software running on the update client software is older than the update version. |
| 3 | Update if the user opts into an update with a user interface |

The report status flag 1280 is a single bit that indicates whether the software update client 1198 should respond with a download notify message 1210. If the report status flag 1280 is set to 1 the software update server 1198 is requesting a download notify message 1210 to be sent after the software update is downloaded by the software update client 1200.

If the image query response 1208 indicates that an update is available. The software update client 1198 downloads 1210 the update using the information included in the image query response 1208 at a time indicated in the image query response 1208.

5. Download Notify

After the update download 1210 is successfully completed or failed and the report status flag 1280 value is 1, the software update client 1198 may respond with the download notify message 1212. The download notify message 1210 may be formatted in accordance with the status reporting format discussed above. An example of status codes used in the download notify message 1212 is illustrated in Table 15 below.

TABLE 15

Example download notify status codes

| Profile | Code | Description |
|---|---|---|
| 0x00000000 | 0x0000 | The download has been completed, and integrity verified |
| 0x0000000C | 0x0020 | The download could not be completed due to faulty download instructions. |
| 0x0000000C | 0x0021 | The image query response message 1208 appears proper, but the download or integrity verification failed. |
| 0x0000000C | 0x0022 | The integrity of the download could not be verified. |

In addition to the status reporting described above, the download notify message 1208 may include additional status information that may be relevant to the download and/or failure to download.

6. Notify Response

The software update server 1200 may respond with a notify response message 1214 in response to the download notify message 1212 or an update notify message 1216. The notify response message 1214 may include the status reporting format, as described above. For example, the notify response message 1214 may include status codes as enumerated in Table 16 below.

TABLE 16

Example notify response status codes

| Profile | Code | Description |
|---|---|---|
| 0x00000000 | 0x0030 | Continue - the notification is acknowledged, but the update has not completed, such as download notify message 1214 received but update notify message 1216 has not. |
| 0x00000000 | 0x0000 | Success - the notification is acknowledged, and the update has completed. |
| 0x0000000C | 0x0023 | Abort - the notification is acknowledged, but the server cannot continue the update. |
| 0x0000000C | 0x0031 | Retry query - the notification is acknowledged, and the software update client 1198 is directed to retry the update by submitting another image query message 1206. |

In addition to the status reporting described above, the notify response message 1214 may include additional status information that may be relevant to the download, update, and/or failure to download/update the software update.

7. Update Notify

After the update is successfully completed or failed and the report status flag 1280 value is 1, the software update client 1198 may respond with the update notify message 1216. The update notify message 1216 may use the status reporting format described above. For example, the update notify message 1216 may include status codes as enumerated in Table 17 below.

TABLE 17

Example update notify status codes

| Profile | Code | Description |
|---|---|---|
| 0x00000000 | 0x0000 | Success - the update has been completed. |
| 0x0000000C | 0x0010 | Client error - the update failed due to a problem in the software update client 1198. |

In addition to the status reporting described above, the update notify message 1216 may include additional status information that may be relevant to the update and/or failure to update.

C. Bulk Transfer

In some embodiments, it may be desirable to transfer bulk data files (e.g., sensor data, logs, or update images) between nodes/services in the fabric 1000. To enable transfer of bulk data, a separate profile or protocol may be incorporated into one or more profiles and made available to the nodes/services in the nodes. The bulk data transfer protocol may model data files as collections of data with metadata attachments. In certain embodiments, the data may be opaque, but the metadata may be used to determine whether to proceed with a requested file transfer.

Figure 31:
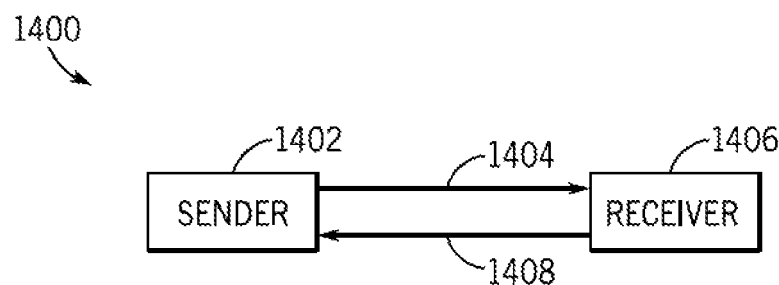
FIG. 31 illustrates a communicative connection between a sender and a receiver in a bulk data transfer, in accordance with an embodiment.

Devices participating in a bulk transfer may be generally divided according to the bulk transfer communication and event creation. As illustrated in FIG. 31, each communication 1400 in a bulk transfer includes a sender 1402 that is a node/service that sends the bulk data 1404 to a receiver 1406 that is a node/service that receives the bulk data 1404. In some embodiments, the receiver may send status information 1408 to the sender 1402 indicating a status of the bulk transfer. Additionally, a bulk transfer event may be initiated by either the sender 1402 (e.g., upload) or the receiver 1406 (e.g., download) as the initiator. A node/service that responds to the initiator may be referred to as the responder in the bulk data transfer.

Bulk data transfer may occur using either synchronous or asynchronous modes. The mode in which the data is transferred may be determined using a variety of factors, such as the underlying protocol (e.g., UDP or TCP) on which the bulk data is sent. In connectionless protocols (e.g., UDP), bulk data may be transferred using a synchronous mode that allows one of the nodes/services ("the driver") to control a rate at which the transfer proceeds. In certain embodiments, after each message in a synchronous mode bulk data transfer, an acknowledgment may be sent before sending the next message in the bulk data transfer. The driver may be the sender 1402 or the receiver 1406. In some embodiments, the driver may toggle between an online state and an offline mode while sending messages to advance the transfer when in the online state. In bulk data transfers using connection-oriented protocols (e.g., TCP), bulk data may be transferred using an asynchronous mode that does not use an acknowledgment before sending successive messages or a single driver.

Regardless of whether the bulk data transfer is performed using a synchronous or asynchronous mode, a type of message may be determined using a Message Type 1172 in the Application Payload 1146 according the Profile Id 1176 in the Application Payload. Table 18 includes an example of message types that may be used in relation to a bulk data transfer profile value in the Profile Id 1176.

TABLE 18

Examples of message types for bulk data transfer profiles

| Message Type | Message |
|---|---|
| 0x01 | SendInit |
| 0x02 | SendAccept |
| 0x03 | SendReject |
| 0x04 | ReceiveInit |
| 0x05 | ReceiveAccept |
| 0x06 | ReceiveReject |
| 0x07 | BlockQuery |
| 0x08 | Block |

TABLE 18-continued

Examples of message types for bulk data transfer profiles

| Message Type | Message |
|---|---|
| 0x09 | BlockEOF |
| 0x0A | Ack |
| 0x0B | Block EOF |
| 0x0C | Error | i. SendInit

Figure 32:
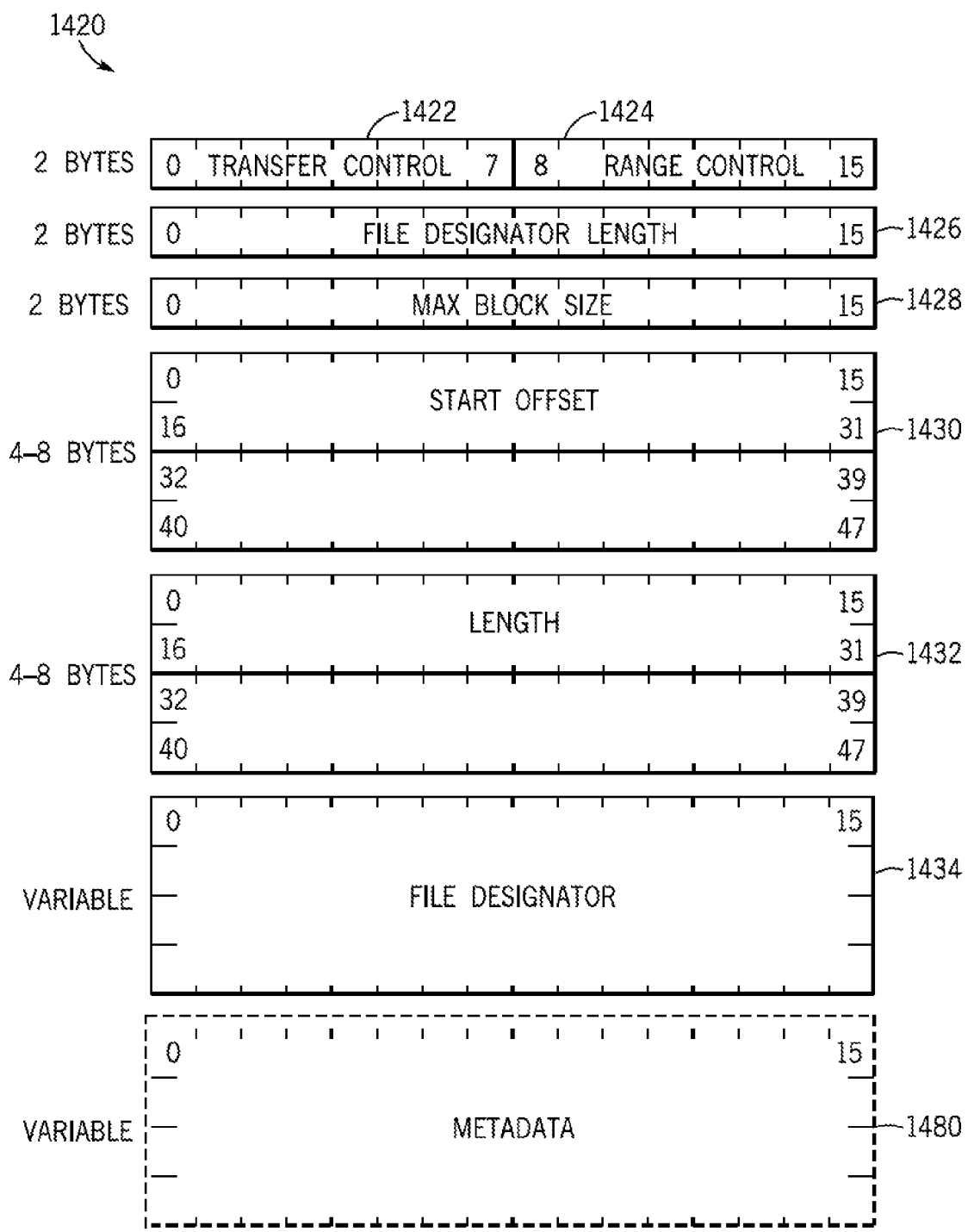
FIG. 32 illustrates a SendInit message that may be used to initiate the communicative connection by the sender of FIG. 31, in accordance with an embodiment.

An embodiment of a SendInit message 1420 is illustrated in FIG. 32. The SendInit message 1420 may include seven fields: a transfer control field 1422, a range control field 1424, a file designator length field 1426, a proposed max block size field 1428, a start offset field 1430, length field 1432, and a file designator field 1434.

Figure 33:
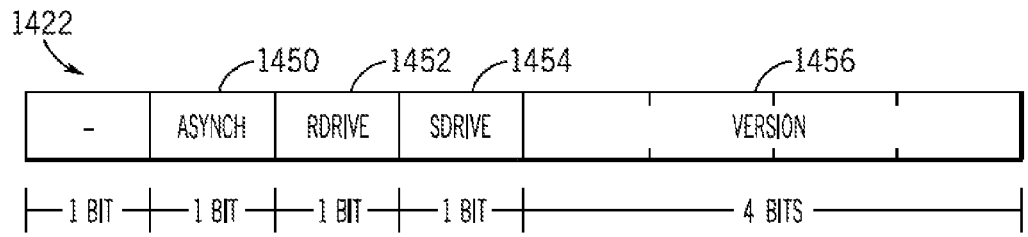
FIG. 33 illustrates a transfer control field of the SendInit message of FIG. 32, in accordance with an embodiment.

The transfer control field 1422 includes a byte of data illustrated in FIG. 33. The transfer control field includes at least four fields: an Asynch flag 1450, an RDrive flag 1452, an SDrive flag 1454, and a version field 1456. The Asynch flag 1450 indicates whether the proposed transfer may be performed using a synchronous or an asynchronous mode. The RDrive flag 1452 and the SDrive flag 1454 each respectively indicates whether the receiver 1406 is capable of transferring data with the receiver 1402 or the sender 1408 driving a synchronous mode transfer.

Figure 34:
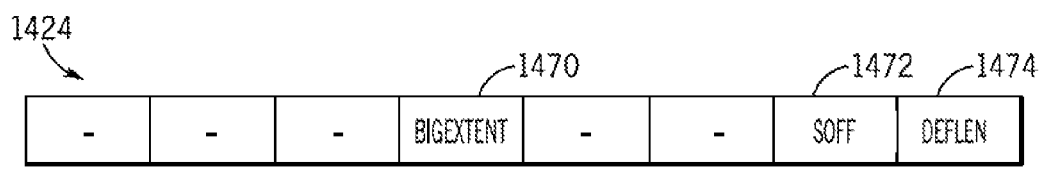
FIG. 34 illustrates a range control field of the SendInit message of FIG. 33, in accordance with an embodiment.

The range control field 1424 includes a byte of data such as the range control field 1424 illustrated in FIG. 34. In the illustrated embodiment, the range control field 1424 includes at least three fields: a BigExtent flag 1470, a start offset flag 1472, and a definite length flag 1474. The definite length flag 1474 indicates whether the transfer has a definite length. The definite length flag 1474 indicates whether the length field 1432 is present in the SendInit message 1420, and the BigExtent flag 1470 indicates a size for the length field 1432. For example, in some embodiments, a value of 1 in the BigExtent flag 1470 indicates that the length field 1432 is eight bytes. Otherwise, the length field 1432 is four bytes, when present. If the transfer has a definite length, the start offset flag 1472 indicates whether a start offset is present. If a start offset is present, the BigExtent flag 1470 indicates a length for the start offset field 1430. For example, in some embodiments, a value of 1 in the BigExtent flag 1470 indicates that the start offset field 1430 is eight bytes. Otherwise, the start offset field 1430 is four bytes, when present.

Returning to FIG. 32, the file designator length field 1426 includes two bytes that indicate a length of the file designator field 1434. The file designator field 1434 which is a variable length field dependent upon the file designator length field 1426. The max block size field 1428 proposes a maximum size of block that may be transferred in a single transfer.

The start offset field 1430, when present, has a length indicated by the BigExtent flag 1470. The value of the start offset field 1430 indicates a location within the file to be transferred from which the sender 1402 may start the transfer, essentially allowing large file transfers to be segmented into multiple bulk transfer sessions.

The length field 1432, when present, indicates a length of the file to be transferred if the definite length field 1474 indicates that the file has a definite length. In some embodiments, if the receiver 1402 receives a final block before the length is achieved, the receiver may consider the transfer failed and report an error as discussed below.

The file designator field 1434 is a variable length identifier chosen by the sender 1402 to identify the file to be sent. In some embodiments, the sender 1402 and the receiver 1406 may negotiate the identifier for the file prior to transmittal. In other embodiments, the receiver 1406 may use metadata along with the file designator field 1434 to determine whether to accept the transfer and how to handle the data. The length of the file designator field 1434 may be determined from the file designator length field 1426. In some embodiments, the SendInit message 1420 may also include a metadata field 1480 of a variable length encoded in a TLV format. The metadata field 1480 enables the initiator to send additional information, such as application-specific information about the file to be transferred. In some embodiments, the metadata field 1480 may be used to avoid negotiating the file designator field 1434 prior to the bulk data transfer.

ii. SendAccept

Figure 35:
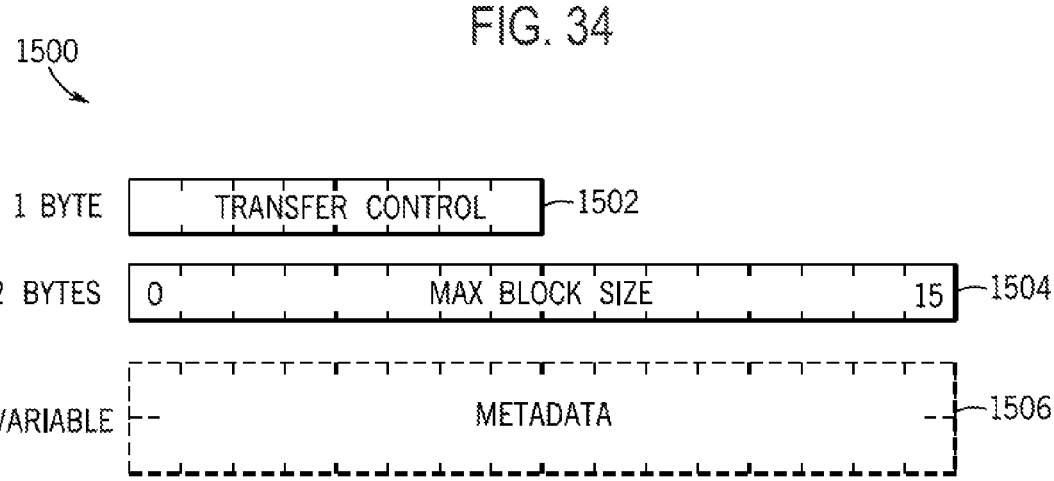
FIG. 35 illustrates a SendAccept message that may be used to accept a communicative connection proposed by the SendInit message of FIG. 32 sent by the sender of FIG. 32, in accordance with an embodiment.

A send accept message is transmitted from the responder to indicate the transfer mode chosen for the transfer. An embodiment of a SendAccept message 1500 is presented in FIG. 35. The SendAccept message 1500 includes a transfer control field 1502 similar to the transfer control field 1422 of the SendInit message 1420. However, in some embodiments, only the RDrive flag 1452 or the SDrive 1454 may have a nonzero value in the transfer control field 1502 to identify the sender 1402 or the receiver 1406 as the driver of a synchronous mode transfer. The SendAccept message 1500 also includes a max block size field 1504 that indicates a maximum block size for the transfer. The block size field 1504 may be equal to the value of the max block field 1428 of the SendInit message 1420, but the value of the max block size field 1504 may be smaller than the value proposed in the max block field 1428. Finally, the SendAccept message 1500 may include a metadata field 1506 that indicates information that the receiver 1506 may pass to the sender 1402 about the transfer.

iii. SendReject

Figure 36:
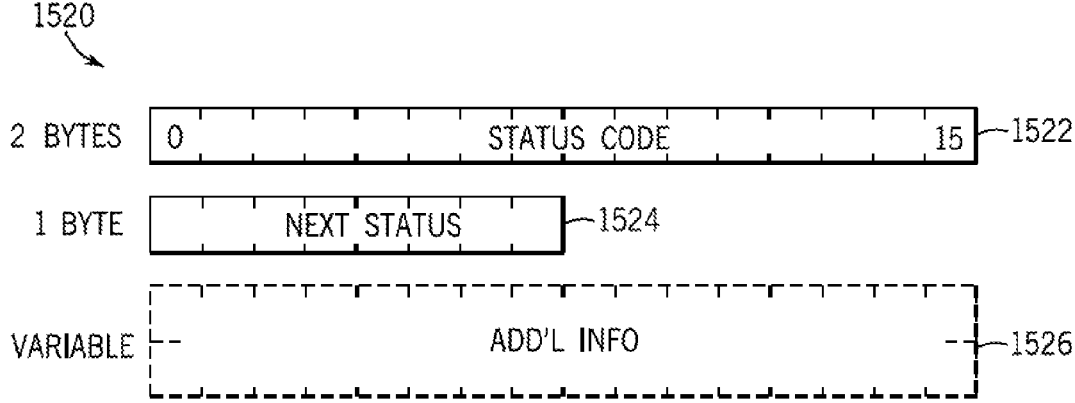
FIG. 36 illustrates a SendReject message that may be used to reject a communicative connection proposed by the SendInit message of FIG. 32 sent by the sender of FIG. 32, in accordance with an embodiment.

When the receiver 1206 rejects a transfer after a SendInit message, the receiver 1206 may send a SendReject message that indicates that one or more issues exist regarding the bulk data transfer between the sender 1202 and the receiver 1206. The send reject message may be formatted according to the status reporting format described above and illustrated in FIG. 36. A send reject frame 1520 may include a status code field 1522 that includes two bytes that indicate a reason for rejecting the transfer. The status code field 1522 may be decoded using values similar to those enumerated as indicated in the Table 19 below.

TABLE 19

Example status codes for send reject message

| Status Code | Description |
|---|---|
| 0x0020 | Transfer method not supported |
| 0x0021 | File designator unknown |
| 0x0022 | Start offset not supported |
| 0x0011 | Length required |
| 0x0012 | Length too large |
| 0x002F | Unknown error |

In some embodiments, the send reject message 1520 may include a next status field 1524. The next status field 1524, when present, may be formatted and encoded as discussed above in regard to the next status field 1188 of a status report frame. In certain embodiments, the send reject message 1520 may include an additional information field 1526. The additional information field 1526, when present, may store information about an additional status and may be encoded using the TLV format discussed above.

iv. ReceiveInit

A ReceiveInit message may be transmitted by the receiver 1206 as the initiator. The ReceiveInit message may be formatted and encoded similar to the SendInit message 1480 illustrated in FIG. 32, but the BigExtent field 1470 may be referred to as a maximum length field that specifies the maximum file size that the receiver 1206 can handle.

v. ReceiveAccept

Figure 37:
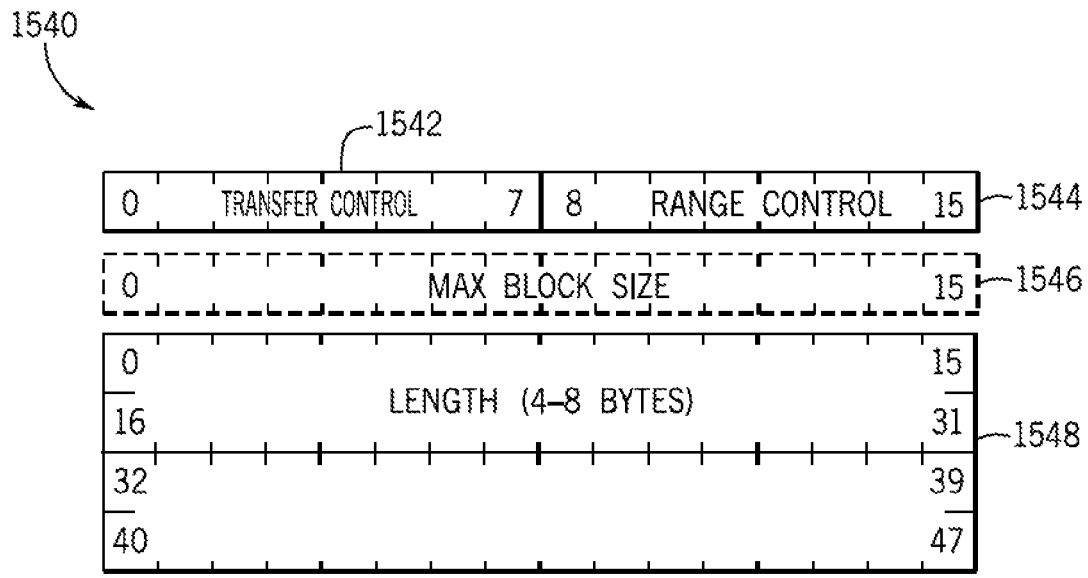
FIG. 37 illustrates a ReceiveAccept message that may be used to accept a communicative connection proposed by the receiver of FIG. 32, in accordance with an embodiment.

When the sender 1202 receives a ReceiveInit message, the sender 1202 may respond with a ReceiveAccept message. The ReceiveAccept message may be formatted and encoded as the ReceiveAccept message 1540 illustrated in FIG. 37. The ReceiveAccept message 1540 may include four fields: a transfer control field 1542, a range control field 1544, a max block size field 1546, and sometimes a length field 1548. The ReceiveAccept message 1540 may be formatted similar to the SendAccept message 1502 of FIG. 35 with the second byte indicating the range control field 1544. Furthermore, the range control field 1544 may be formatted and encoded using the same methods discussed above regarding the range control field 1424 of FIG. 34.

vi. ReceiveReject

If the sender 1202 encounters an issue with transferring the file to the receiver 1206, the sender 1202 may send a ReceiveReject message formatted and encoded similar to a SendReject message 48 using the status reporting format, both discussed above. However, the status code field 1522 may be encoded/decoded using values similar to those enumerated as indicated in the Table 20 below.

TABLE 20

Example status codes for receive reject message

| Status Code | Description |
| --- | --- |
| 0x0020 | Transfer method not supported |
| 0x0021 | File designator unknown |
| 0x0022 | Start offset not supported |
| 0x0013 | Length too short |
| 0x002F | Unknown error | vii. BlockQuery

A BlockQuery message may be sent by a driving receiver 1202 in a synchronous mode bulk data transfer to request the next block of data. A BlockQuery impliedly acknowledges receipt of a previous block of data if not explicit Acknowledgement has been sent. In embodiments using asynchronous transfers, a BlockQuery message may be omitted from the transmission process.

viii. Block

Blocks of data transmitted in a bulk data transfer may include any length greater than 0 and less than a max block size agreed upon by the sender 1202 and the receiver 1206.

ix. BlockEOF

A final block in a data transfer may be presented as a Block end of file (BlockEOF). The BlockEOF may have a length between 0 and the max block size. If the receiver 1206 finds a discrepancy between a pre-negotiated file size (e.g., length field 1432) and the amount of data actually transferred, the receiver 1206 may send an Error message indicating the failure, as discussed below.

x. Ack

If the sender 1202 is driving a synchronous mode transfer, the sender 1202 may wait until receiving an acknowledgment (Ack) after sending a Block before sending the next Block. If the receiver is driving a synchronous mode transfer, the receiver 1206 may send either an explicit Ack or a BlockQuery to acknowledge receipt of the previous block. Furthermore, in asynchronous mode bulk transfers, the Ack message may be omitted from the transmission process altogether.

xi. AckEOF

An acknowledgement of an end of file (AckEOF) may be sent in bulk transfers sent in synchronous mode or asynchronous mode. Using the AckEOF the receiver 1206 indicates that all data in the transfer has been received and signals the end of the bulk data transfer session.

xii. Error

In the occurrence of certain issues in the communication, the sender 1202 or the receiver 1206 may send an error message to prematurely end the bulk data transfer session. Error messages may be formatted and encoded according to the status reporting format discussed above. For example, an error message may be formatted similar to the SendReject frame 1520 of FIG. 36. However, the status codes may be encoded/decoded with values including and/or similar to those enumerated in Table 21 below.

TABLE 21

Example status codes for an error message in a bulk data transfer profile

| Status code | Description |
| --- | --- |
| 0x001F | Transfer failed unknown error |
| 0x0011 | Overflow error |

D. Data Management Profile

The data management profile (WDM) provides a method for nodes to view, share and update node-resident information between each other and/or a service. Any device viewing or requesting the data may be referred to as a client, and any device storing the information locally that is sent out may be referred to as a publisher. For example, a thermostat node, acting as a client, may view and update a heat state from on to off in a radiator control node as a publisher. The data management profile includes message types, status values, and data tags each with a corresponding schema. As discussed previously in relation to the general message format, each message may include a profile ID and associated message type. For example, logically a profile ID and message type (e.g., [<WDMprofile>, <view request>]) indicates that the data management profile is called with the specific message type of a view request. Moreover, the view request message may also include a path list [[ . . . {{<radiator profile>,} {<heat state>}]] that indicates that the data being viewed in the heat state of the radiator profile.

As previously discussed, a class of interactions between nodes on a fabric, e.g. remote sensing and control, configuration management and so on, may be described as data management. In these and many other cases, a particular node "owns" a data set and other nodes may inquire about its values, submit updates and/or subscribe to notifications when values within the data set change. Furthermore, a number of protocols that go beyond simple data management, e.g. software update or data logging, often have parameter sets that control their operation or encapsulate their state and the management and sharing of these parameters may properly be viewed as data management as well.

Figure 38:
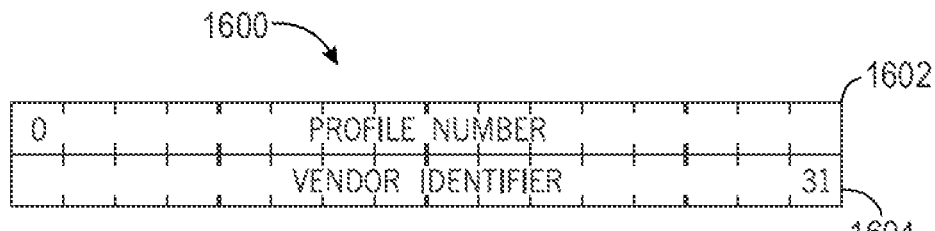
FIG. 38 illustrates a profile identifier used to identify a message as pertaining to a specific profile, in accordance with an embodiment.

Seen from this point of view, a fabric node may appear as an unordered collection of application-specific domains, formally known as profiles, e.g. for settings synchronization, software update, HVAC control and so on. As previously discussed, each profile is identified by a 32-bit vendor-specific profile identifier 1600, as illustrated in FIG. 38.

A 16-bit profile number subfield 1602 of the profile identifier 1600 is assigned by a vendor for the device. In some embodiments, a 16-bit vendor identifier subfield 1604 of the profile identifier 1600 may be assigned by a central arbiter. Moreover, in some embodiments, the central arbiter may be a manufacturer with its own vendor ID is 0x235A. In some embodiments, the vendor identifier 0 may be used to designate "Core" profiles intended for common usage. In some embodiments, the profile identifier 0xFFFFFFFF may be reserved for a "profile identifier unspecified" error code. A profile may define 3 things: 1) A set of messages that, again by convention, imply protocols, which are the basis of inter-node exchanges over the fabric; 2) a set of profile-specific status codes; and 3) a schema for profile-related data.

Figure 39:
FIG. 39 illustrates a data management (WDM) frame for the WDM profile, in accordance with an embodiment.

WDM frames, generally speaking, address and/or contain profile data for one or more profiles and the representation of that data may be entirely determined by the profile of interest. For example, FIG. 39 illustrates a WDM frame 1606. The profile identifier 1602 in the exchange header identifies the frame as belonging to the data management protocol, but the profile identifiers in the various elements that make up the body of the message are likely to belong to some other profile, e.g. "HVAC control". In this case the WDM profile is being used to manage and communicate HVAC control data on behalf of other profiles resident on devices in the fabric.

The disposition and format of actual data on a fabric node may vary widely between instances of different profiles being managed. To give a few examples, a piece of data used in the operation of a profile may be readily available in RAM, but it may also be in some form of persistent storage that requires special access. In some embodiments, the data may be under the control of a different thread or process and may include a multi-step process to retrieve, or it may be read from external hardware and never stored at all. In order to make sense of disparate and differently accessible data, a schema is defined whereby data may be organized, understood and published for external access without regard to its internal representation.

For example, the data may be formatted using the TLV format discussed above. In other words, data may be represented as a hierarchical structure of tag-value pairs possibly incorporating ordered lists (arrays) with elements of arbitrary type; a representation for null and empty data items; the ability to handle a variety of primitive data types, such as Boolean values, signed and unsigned integers of various lengths, single and double-precision floating point values, byte strings, and UTF-8 strings; and representation of paths that provide access to particular data items or subtrees within the hierarchy.

In some embodiments, the over-the-air (OTA) representation of profile data is in the TLV format. The internal format may be TLV in cases where that is appropriate or it may be something completely different depending on constraints imposed by the platform, profiles, and/or applications. However, in some embodiments, the internal format may be efficiently converted to the OTA format and vice-versa.

a. WDM Architecture

Figure 40:
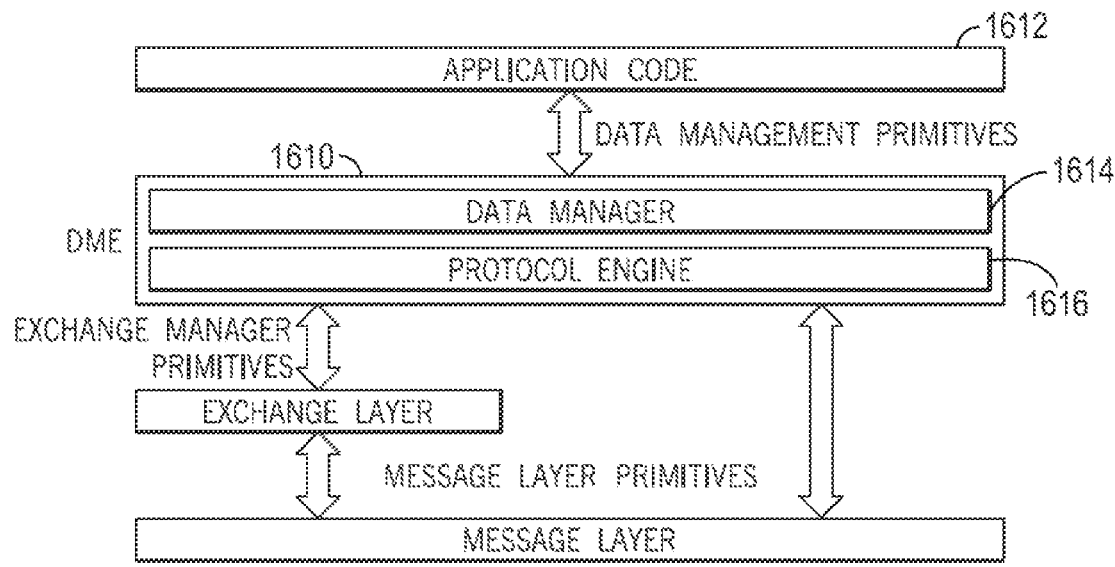
FIG. 40 illustrates WDM architecture in a smart device, in accordance with an embodiment.

As shown in FIG. 40, a data management entity (DME) 1610 has a layered architecture to separate data representation from communication. Application code 1612 communicates with the DME 1610 using a set of general-purpose primitives. The upper sublayer of the DME, the data manager 1614, makes few assumptions about the underlying medium of exchange. As a result, the DME 1610 could be adapted to participate in data management exchanges that take place across IPC channels or other media. The data manager 1614 sublayer is responsible for data management proper. For example, the data manager 1614 sublayer may maintain an internal model for the data of interest; provide access to data based on a set of predefined paths, established by convention as part of profile definition; track changes and resolve conflicts that may arise between multiple updaters of the same data set; link data paths to methods for merging data from disparate sources (e.g. in the case of a request to view); and/or link data paths to methods for disseminating changes to their disparate destinations (e.g. in the case of a request to update).

The DME 1610 communicates via its lower sublayer, a protocol engine 1616. The protocol engine 1616 sublayer may bind requests to a particular node or service endpoint, maintenance—including creation, disposal and cancellation—of transactions covering the lifecycle of an OTA data management operation (e.g., an update), establish and maintain listeners in the case where a device may listen for unsolicited requests (e.g., view requests or receiving unsolicited notifications as a result of a subscription request), parse and pack WDM frames; and/or interaction with the fabric exchange manager, including the creation and disposal of exchange contexts and the transmission and receipt of frames.

b. Functions

The DME 1610 handles data management service on behalf of higher layers generally using a fabric as a medium of exchange. Services offered by the DME 1610 may include: publishing (e.g., setting up a node or service endpoint, a publisher) to "own" and manage a particular data set and accept requests to view it, update it and subscribe to notifications when that data is changed; binding to a single remote node or service endpoint as the publisher of a data set of interest or as the default client of a particular publisher; viewing (e.g., asking a publisher for a snapshot of the data referenced by some set of paths in the data set under its control); updating (e.g., requesting a modification to data under control of a publisher); and/or subscribing to notifications from a publisher in the event that data under the control of that publisher changes.

i. Definitions

A path, P, is a pair, $\{p[e_0 \ldots e_n]\}$, where p is a profile identifier and the sequence $[e_0 \ldots e_n]$ is an ordered set of path elements which, taken together, describe a path through the hierarchical structure defined by the profile schema in a way that is analogous to the way a path expression in Unix defines a path through the file system. In some cases, there may be more than one instance of a profile on a node and in these cases the profile identifiers are assigned an instance identifier, i, written $p_i$. Note here that, as shown in FIG. 39 above, the profile identifier in a path may be a profile other than the identifier of the data management profile. Instead, it may be the identifier for a profile that defines a schema wherein the sequence of elements $[e_0 \ldots e_n]$ may be used to uniquely identify a particular piece of data. In this sense the profile identifier acts as the "path root" for all paths defined for a particular profile.

A path list, L, is an array of paths, written $[P_0 \ldots P_n]$ and a data list is a list of triples $[\{P_0:v_0:X_0\} \ldots \{P_n:v_n:X_n\}]$ where the data items $[X_0 \ldots X_n]$ represent the data located at the places in the schema instance indicated by the paths $[P_0 \ldots P_n]$. We call X, the "terminal" of $P_i$. The $[v_0 \ldots v_n]$ are data versions associated with the terminals $[X_0 \ldots X_n]$. The version may be omitted in some case and the element will then be written $\{P_i::X_i\}$.

ii. Primitives

Operations may be described in terms of a set of primitives, which may be mapped onto function calls and callbacks, events queued between threads, RPC calls and so on. The DME primitives are discussed below. Each primitive has up to 4 variants: 1) request used to request a DME operation (e.g. view), 2) an indication used to communicate an internal event (e.g. the arrival of a view request), a response used to signal the completion of processing for an indication, and a confirmation used to signal the completion of processing for a request. If a primitive has a particular variant, an indication for the corresponding variant is shown to indicate that additional detail is provided below.

TABLE 22

DME primitives

| name | request | indication | response | confirm |
|---|---|---|---|---|
| DME-View | X | X | X | X |
| DME-Subscribe | X | X | X | X |
| DME-Update | X | X | X | X |
| DME-CancelTransaction | X |  |  | X |
| DME-CancelSubscription | X | X |  | X |
| DME-Bind | X |  |  | X |
| DME-BeginPublishing | X |  |  | X |
| DME-EndPublishing | X |  |  | X |
| DME-BeginSubscription | X |  |  | X |
| DME-Notify | X | X |  | X | iii. DME Frames

When DME operations pass between nodes or service endpoints, they may be sent as fabric frames. The fabric data management frames are shown in Table 23.

TABLE 23

DME frames

| name | description |
|---|---|
| view request | A view request frame, containing a path list, L = [$P_0 \ldots P_n$], is sent when a node or service endpoint wishes to receive a data list [{$P_0::X_0$} ... {$P_n::X_n$}] constituting a snapshot of the terminals of L in the data set under management by a remote node or service endpoint. |
| view response | A view response frame, containing the requested data list, is returned to the requestor in the case where a view request frame was successfully received and processed. |
| subscribe request | A subscribe request frame the same content as a view request, i.e. a path list L. The difference in semantics is that, in addition to requesting a snapshot of the data at the terminals of L, the requestor also expresses a wish to receive notifications when that data changes. |
| subscribe response | A subscribe response frame, containing both the requested data list and a topic ID chosen by the responder, is sent in response to a subscribe request to indicate that the subscription has been successfully established. |
| cancel subscription request | A cancel subscription request frame, containing the topic ID of the subscription to be canceled, is sent to request that the subscription be canceled and all state associated with it removed. |
| update request | An update request frame, containing a data list, is sent to request a modification to data under the management of a remote node or service endpoint. |
| notify request | A notify request frame, containing a topic ID and a data list, in which each item is required to contain the version component, is sent to inform a node or service endpoint that data of interest to it has changed. |

Data management exchanges may also include status report frames described in reference to the status report profile.

iv. DME Roles

There are four defined roles under the data management profile. These roles, along with the primitives they implement and the expected behavior appear in Table 24.

TABLE 24

WDM roles

| name | primitives | expected behavior |
|---|---|---|
| viewer | DME-View.request<br>DME-View.confirm<br>DME-CancelTransaction.request<br>DME-CancelTransaction.confirm<br>DME-Bind.request<br>DME-Bind.confirm | A viewer may implement the client portion of the view transaction and may be able to cancel a transaction that it has begun.<br>A viewer may implement the bind transaction. |
| updater | DME-Update.request<br>DME-Update.confirm<br>DME-CancelTransaction.request<br>DME-CancelTransaction.confirm<br>DME-Bind.request<br>DME-Bind.confirm | An updater may implement the client portion of the updater transaction and may be able to cancel a transaction that it has begun.<br>An updater may implement the bind transaction. |
| publisher | DME-View.indication<br>DME-View.response<br>DME-Update.indication<br>DME-Update.response<br>DME-Subscribe.indication<br>DME-Subscribe.response<br>DME-CancelTransaction.request<br>DME-CancelTransaction.confirm<br>DME-CancelSubscription.indication<br>DME-Bind.request<br>DME-Bind.confirm<br>DME-BeginPublishing.request<br>DME-BeginPublishing.confirm<br>DME-BeginSubscription.request<br>DME-BeginSubscription.confirm<br>DME-Notify.request | A publisher may implement the client portion of the notify transaction and may be able to cancel a transaction that it has begun.<br>A publisher may implement the begin publishing transaction.<br>A publisher may implement the begin subscription transaction.<br>A publisher may implement the server portion of the view transaction.<br>A publisher may implement the server portion of the update transaction.<br>A publisher may implement the |

TABLE 24-continued

WDM roles

| name | primitives | expected behavior |
|---|---|---|
| | DME-Notify.confirm | server portion of the subscribe transaction. A publisher may implement the server portion of the cancel subscription transaction. A updater may implement the bind transaction. |
| subscriber | DME-Subscribe.request DME-Subscribe.confirm DME-CancelTransaction.request DME-CancelTransaction.confirm DME-CancelSubscription.request DME-CancelSubscription.indication DME-CancelSubscription. confirm DME-Bind.request DME-Bind.confirm DME-Notify.indication | A subscriber may implement the server portion of the notify transaction. If a subscriber implements the client side of any transaction it may also implement the cancel transaction transaction. A subscriber may implement the client side of the subscribe transaction. A subscriber may implement the client side of the cancel subscription transaction. A subscriber may implement the bind transaction. |

The given roles may overlap such that, for example, an updater may also be a viewer of a particular remote schema instance and the publisher of this data may also be an updater.

v. Binding Function

Figure 41:
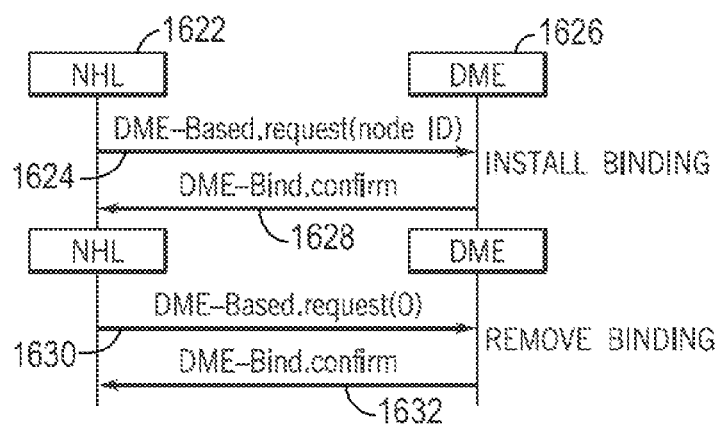
FIG. 41 illustrates a binding transaction protocol sequence created using the WDM profile, in accordance with an embodiment.

For a variety of applications, a DME instance may have a single peer node or service endpoint by default. In these cases, the instance may be bound to that peer and subsequent transactions may use the node identifier of that peer as a destination. FIG. 41 illustrates a binding transaction. As shown in FIG. 41, a next higher layer (NHL) 1620 issues a DME-Bind.request 1622 primitive containing the 64-bit peer node identifier (e.g., ULA) of interest to a DME 1626. The node identifier is installed as the value of the aPeerNodeId attribute of the DME 1626. The DME 1626 then responds with a DME-Bind.confirm message 1628. To remove the binding, the NHL 1620 replaces the value of aPeerNodeId in a DME-Based.request 1630 with the value of 0, meaning "no bound peer." The DME-Bind.confirm 1632 primitive is issued when the binding operation is complete and contains a status of success.

vi. Publishing and Subscription Functions

A node or service endpoint may set itself up as a publisher for a certain data set as long as the data can be represented. Devices with widely varying capabilities may become publishers, and the list of features associated with publishing may be designed to scale with the number of publishers or functions thereof.

1. Broadcast Publishing

Figure 42:
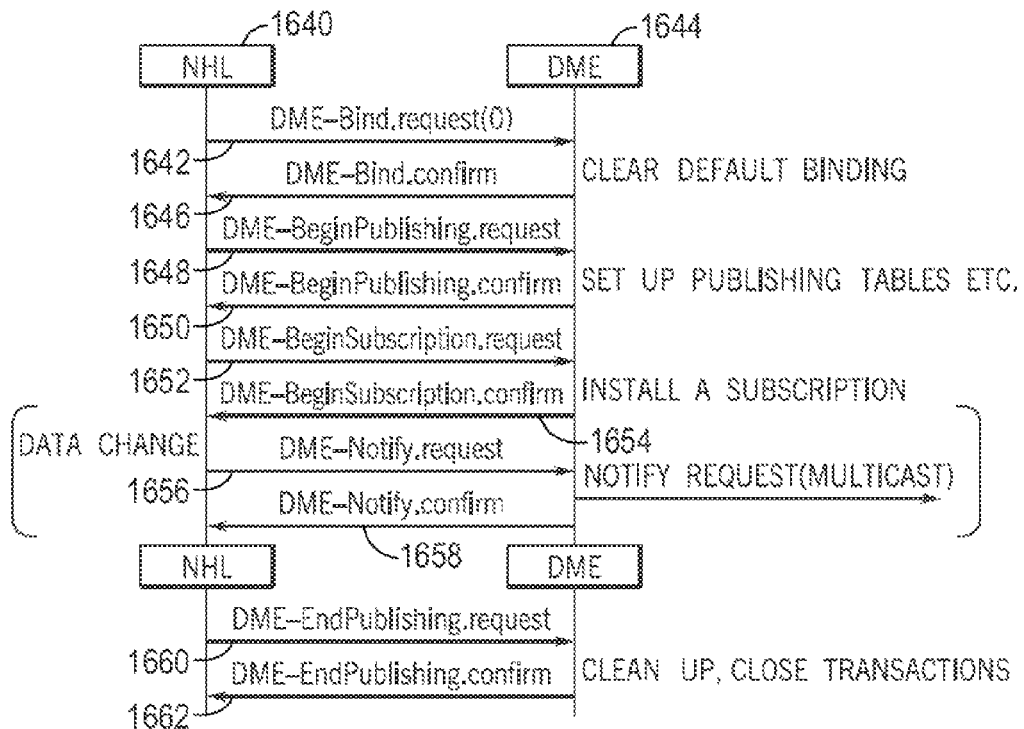
FIG. 42 illustrates a broadcast publish protocol sequence that may be performed using the WDM profile, in accordance with an embodiment.

In the simplest form of publishing, a publisher begins publishing or establishes one or more subscriptions, and then simply transmits the notification request frames via multicast as shown in FIG. 42. To establish itself as a broadcast publisher, an NHL 1640 in a request 1642 clears the DME 1644 default binding to 0 indicating that that the default destination for outgoing frames is a multicast address. The DME 1644 confirms the request in a confirmation message 1646. The NHL 1640 then begins publishing by issuing a DME-BeginPublishing.request 1648 primitive to the DME 1644. The results of this operation are communicated via the DME-BeginPublishing.confirm 1650 primitive. If the Status contained in the DME-BeginPublishing.confirm 1650 primitive has a value indicating success, then the NHL 1640 may establish one or more subscriptions in the DME 1644 using a subscription request 1652. Once this is done and the resulting DME-BeginSubscription.confirm 1654 primitives contain a status indicating success, the NHL 1640 may begin to issue change notification requests 1656. In some embodiments, when the default binding is set to 0, notifications are sent to a multicast address and interested parties on the fabric may receive them. In some embodiments, when issuing a notification, a reply is not expected from the recipient, and the DME 1644 may issue a DME-Notify.confirm 1658 primitive reflecting the status of the attempt on the part of the lower stack to transmit the frame.

The criteria whereby a publisher decides to issue a notification may be application-specific. For example, if the data in question is continuously and incrementally variable, a thresholding or timed-update strategy may be used. In the case of device configuration data, on the other hand, the call for a notification may occur whenever the data changes.

Publishing may be halted by issuing the DME-EndPublishing.request 1660 primitive. The DME 1644 waits until the states involved in publishing are cleaned up and, in particular, all active transactions have been disposed of, before issuing the corresponding DME_EndPublishing.confirm 1662 primitive.

2. Peer Publishing

Figure 43:
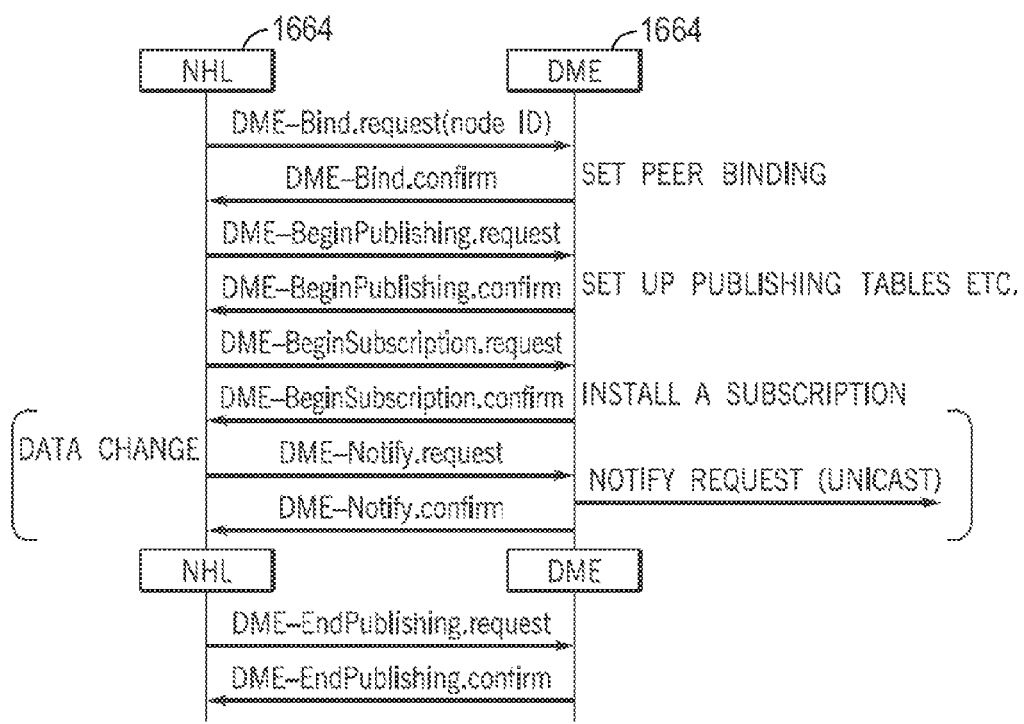
FIG. 43 illustrates a peer publish protocol sequence that may be performed using the WDM profile, in accordance with an embodiment.

A variant of broadcast publishing involves a single peer node or service endpoint may be called "peer publishing", which is shown in FIG. 43. The main differences between broadcast publishing and peer publishing are: 1) the DME is bound to a specific peer node or service endpoint, and 2) by default, a status response is requested for each notification.

3. Dynamic Subscription

Figure 44:
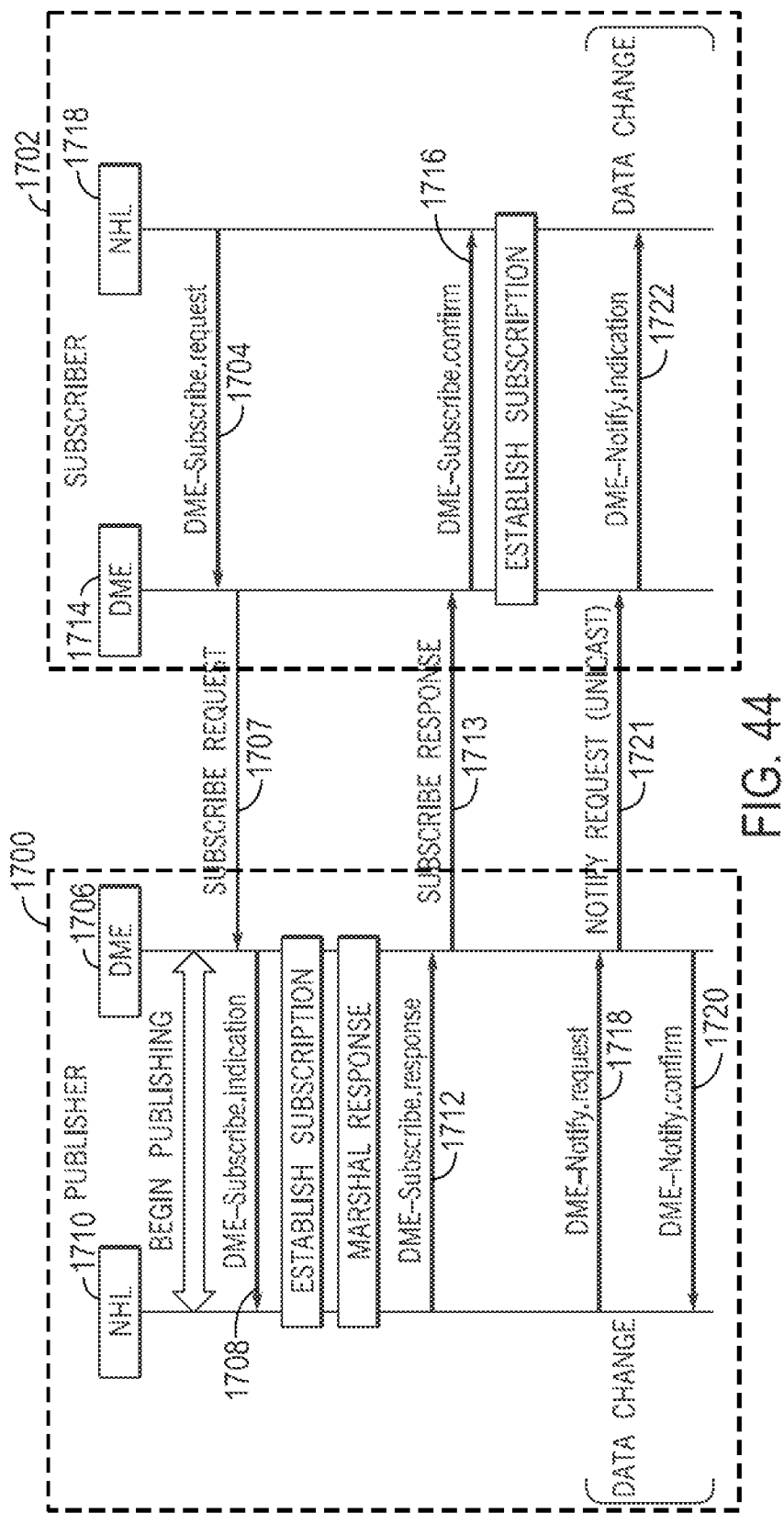
FIG. 44 illustrates a dynamic subscription publish protocol sequence that may be performed using the WDM profile, in accordance with an embodiment.

Of course, not all publishers may broadcast or peer publish. Some nodes and service endpoints may maintain subscriptions in the name of multiple devices and may deal with devices that enter and leave the fabric. In some embodiments, it may also be important to the subscriber to know whether its notifications have been received. In cases like this, it makes sense to have the subscribers explicitly request a subscription. As shown in FIG. 44, after a publisher 1700 begins publishing, a subscriber 1702 may request a subscription by issuing a DME-Subscribe.request 1704 primitive. On receipt of the DME-Subscribe.request 1704 primitive, the DME 1706 of the subscriber 1700 may establish a transaction with the identifier given by the value of the TransactionId parameter of the DME-Subscribe.request 1704 primitive. The DME 1706 may then format a subscribe request frame 1707. The subscriber 1700 either binds to the 64-bit node identifier of the publisher or includes the 64-bit node identifier of the publisher as the value of the DestinationId parameter of the DME-Subscribe.request 1708. This node identifier may be used as the intended destination of the subscribe request frame 1707.

The values of the topic identifier and path list fields of the subscribe request frame 1707 may reflect the values of the TopicId and PathList parameters of the DME-Subscribe.request 1704 primitive. Once the subscribe request frame 1707 has been formatted, the protocol engine sublayer of the DME 1706 may transmit it via a fabric exchange layer. If the Timeout parameter of the DME-Subscribe.request primitive has a non-zero value then the value may be used to set the expected response timeout for the fabric exchange.

Upon receipt of subscribe request frame 1707 from a fabric exchange manager in the publisher, the DME 1706 of the publishing node attempts to establish the requested subscription. If the topic identifier field of the subscribe request frame 1707 has a non-zero value, then the DME 1706 may attempt to match the value of that field with the identifier of an existing topic under management. If a matching topic is found, the 64-bit node identifier of the sender (e.g., subscriber 1702) of the subscribe request frame 1707 may be added to the list of subscribers for that topic.

If the topic identifier field of the subscribe request frame 1707 has a value of 0, indicating an undefined topic, a path list of non-zero length may be supplied. This path list is checked against the existing list of topics under management to determine if there is an existing topic with a matching path list. If a matching topic is found, the 64-bit node identifier of the sender (e.g., subscriber 1702) of the subscribe request frame 1707 is to be added to the list of subscribers for the topic. The DME 1706 then issues a DME-Subscribe.indication 1708 primitive where the TopicId and PathList parameters reflect the values selected above and the value of the ResponseCtx parameter may be the fabric exchange context object generated by the exchange manager and containing all the information required to send a response If no existing topic matches the supplied path list field, the DME 1706 may ensure that each entry in the path list field of the subscribe request frame 1707 is a valid path. If all path list items are valid, the DME 1706 issues a DME-Subscribe.indication 1708 primitive where the value of the TopicId parameter is 0, indicating an undefined topic, and the value of the PathList parameter is the list of paths present in the path list field of the subscribe request frame 1707. The NHL 1710 of the publisher 1700 may pick a topic identifier for the requested subscription and establish it using the DME-BeginSubscription.request primitive where the value of the Subscriber parameter is to be the 64-bit node identifier of the requesting node derived from the ResponseCtx parameter of the DME-Subscribe.indication 1708 primitive.

Once the subscription has been established and the NHL 1710 has marshalled the data to be used in responding to the DME-Subscribe.indication 1708, the NHL 170 issues a DME-Subscribe.response 1712 primitive to the DME. Then, the response 1713 is relayed to a DME 1714 of the subscriber 1702. On receipt of a DME-Subscribe.confirm 1716 primitive, an NHL 1718 of the subscriber disseminates the data list and may record the topic ID contained in the primitive. At this point, the subscription is established in the subscriber 1702. Thereafter, at the discretion of the NHL 1710, the publisher 1700 may issue DME-Notify.request 1718 primitives in response to changes in the data of interest as shown in the previous examples. The transaction uses reliable unicast transmission and a status response may be used.

On receipt of the DME-Notify.request 1718 primitive, the DME 1706 of the publisher 1700 determines the list of subscribers, if any, with an interest in the DataList parameter of the DME Notify.request 1718 primitive. If the TopicId parameter has been provided then that identifier may be compared against the topic identifier in each subscription and the associated node identifier added to the list of interested subscribers in the case of a match. If a topic identifier has not been supplied, for each data list item given in the DataList parameter, the path component is to be compared against each element of the path list given in the subscription. If a match is found, the associated node identifier is to be added to the list of interested subscribers. In some embodiments, the publisher DME 1706 may exclude a subscriber 1702 from the list of interested subscribers if it can be determined that the subscriber has the most up-to-date version of the data of interest.

If it is discovered that a particular subscriber has an interest in the DataList provided, the DME formats a notify request frame 1721 where the 64-bit node identifier of the interested subscriber may be used as the destination identifier for the frame. The data list field of the notify request frame 1721 reflects the value of the DataList parameter of the DME-Notify.request 1718 primitive. The publisher DME 1706 may remove items that it determines not to be of interest to the given subscriber 1702. Once the notify request frame 1721 has been formatted, it is sent via the fabric exchange manager. The process may be repeated for every interested subscriber identified in the subscriber list of the DME.

The DME 1706 may issue a DME-Notify.confirm 1720 primitive. The Status parameter may be a status report indicating the success or failure of the transmission attempt. The value of the TransactionId parameter may be the 16-bit identifier of the now-completed WDM transaction. On receipt of a DME-Notify.confirm primitive, the NHL of the notifier is informed of the success or failure of a previous request and the completion of the corresponding transaction. On receipt of the notify request frame 1721, the DME 1714 of the subscribing device 1718 issues a DME-Notify.indication 1722 primitive to the NHL. The values of the TopicId and DataList parameters reflect the corresponding field values form the notify request frame 1721.

Figure 45:
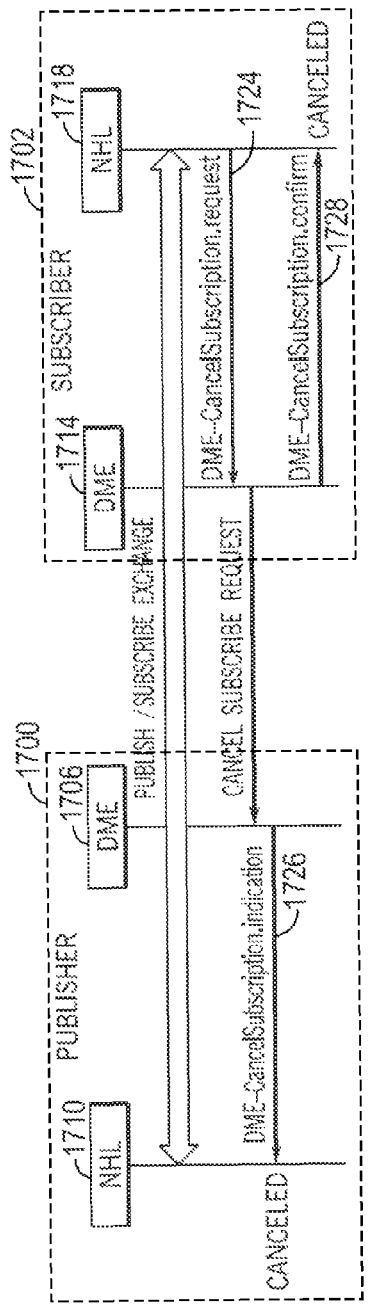
FIG. 45 illustrates a cancel subscription protocol sequence that may be performed using the WDM profile, in accordance with an embodiment.

On receipt of the DME-Notify.indication 1722 primitive, the NHL 1718 may begin the process of disseminating the data for each of the items in the DataList parameter. The subscriber 1702 may cancel the subscription by initiating a DME-CancelSubscription.request 1724 primitive as shown in FIG. 45. The DME 1706 of the publisher receives the cancellation request 1724 and sends the NHL 1710 an cancel subscription indication 1726. The DME 1714 of the subscriber 1702 may send the NHL 1718 of the subscriber a cancel subscription confirmation 1728 upon successful transmittal for the cancel subscription request 1724.

4. Topic Identifier

In the above cases, the publisher is, in principle, responsible for choosing a topic identifier for the subscription. The topic identifier is used in subsequent management operations around the subscription and may be used as a shorthand for the path list associated with the subscription (e.g., in the case of a DME-View.request). For a subscriber, the pair $\{t:N_p\}$ where t is a topic ID and $N_p$ is the node ID of the publisher should uniquely identify a subscribed data set and likewise, for a publisher, the pair $\{t:N_s\}$, where $N_s$ is the Node ID of the subscriber, uniquely identifies a subscription.

Topic IDs may, by convention, be chosen to have particular semantics so that, for example, an HVAC controller may define a topic called something like an HVAC State to capture whatever data in resident on that device was involved in HVAC control. Thus, in some embodiments, devices of a similar type (e.g., HVAC controllers) may use the same topic ID to simplify service discovery.

In the case of dynamic subscriptions, the subscriber may include a pre-agreed topic identifier in the subscribe request frame 1707 as a "shorthand" for the list of paths governed by intended subscription, or it may simply send a path list requiring the publisher to choose a topic identifier. The publisher may use a predefined topic identifier, if an applicable identifier is available, but the publisher may not give out that same topic ID to the same subscriber until the previous instance of it has been canceled. Topic IDs in this case may be sequenced, chosen at random (with duplicate checking), or another suitable scheme. In some embodiments, the topic identifier with the value 0 is reserved for an unspecified topic.

vii. Viewing Function

Figure 46:
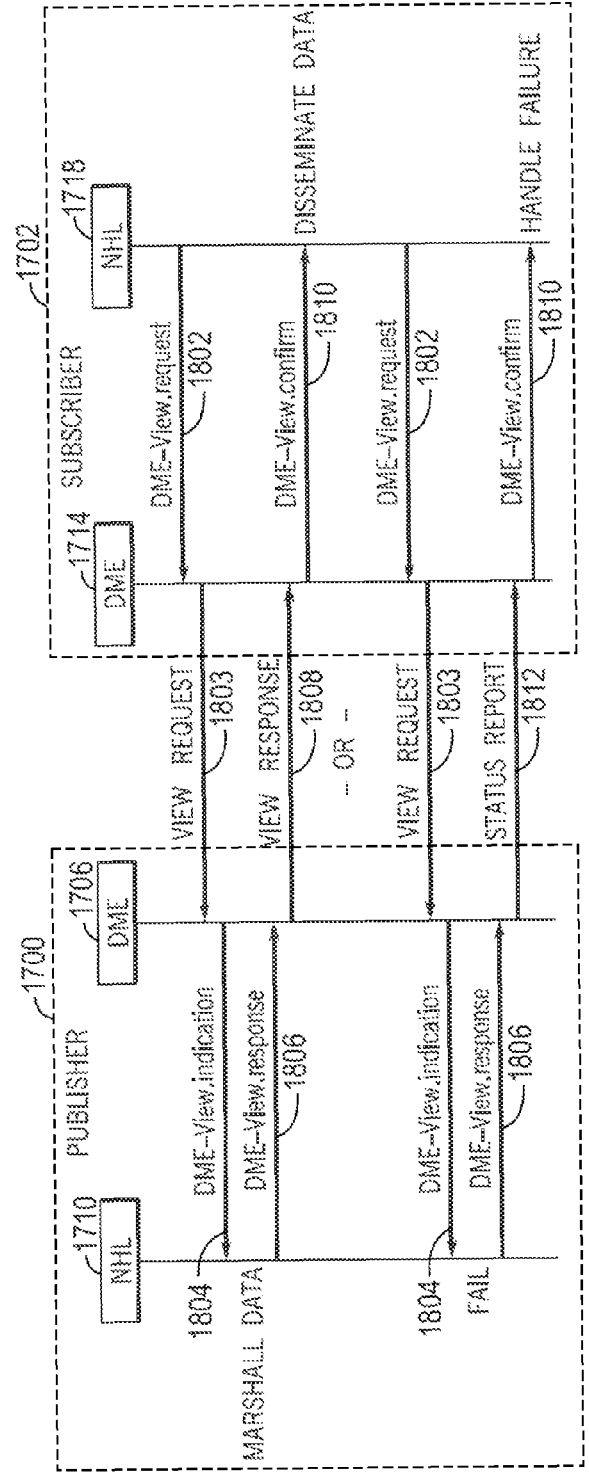
FIG. 46 illustrates a view transaction protocol sequence that may be performed using the WDM profile, in accordance with an embodiment.

FIG. 46 illustrates a view transaction 1800. On receipt of a DME-View.request 1802 primitive, the DME 1714 of the viewer 1702 establishes a transaction with the identifier given by the value of the TransactionId parameter of the DME-View.request 1802 primitive. The DME 1714 of the viewer 1702 then formats a view request frame 1803. If NHL 1718 has supplied a DestinationId parameter, the value of that parameter may be used as the identifier of the destination node. If no such parameter has been supplied, and a default binding has previously been established use the DME-Bind.request primitive, the node identifier found in that binding may be used as the identifier of the destination node. View request frames may also be transmitted via multicast in the case where the default binding is set to a value of 0.

If the TopicId parameter of the DME-View.request 1802 primitive has been supplied, the DME 1714 may use fabric TLV encoding of the list of paths corresponding to that topic identifier as the value of the path list field of the outgoing view request.

If the TopicId parameter has not been supplied, the PathList parameter may be supplied, and the value of the path list field of the view request frame 1803 may be the fabric TLV representation of the PathList parameter. Once the view request frame 1803 has been formatted, the protocol engine sublayer of the DME 1714 may transmit it via the fabric exchange layer. If the Timeout parameter of the DME-View.request 1802 primitive has a non-zero value, the value may be used to set the expected response timeout for the fabric exchange.

On receipt of the view request frame 1803, the DME 1706 of the publisher 1700 may issue a DME-View.indication 1804 primitive to the NHL 1710. The value of the ResponseCtx parameter of the DME-View.indication 1804 primitive may be the fabric exchange context object generated by the exchange manager and containing the information required to send a response. The PathList parameter of the DME-View.indication 1804 primitive may reflect the value of the path list field of the received view request frame 1803.

On receipt of the DME-View.indication 1804 primitive, the NHL 1710 begins the process of marshalling data for each of the paths contained in the PathList parameter. Once marshalling has been completed, the NHL 1710 issues a DME-View.response 1806 primitive. The Status parameter of the DME-View.response 1806 primitive reflects the status of the attempt to marshall results and, if the attempt is successful, the DataList parameter is supplied and has, as a value, a data list containing terminal values for all the paths in the PathList parameter of the corresponding DME-View.indication 1804. The ResponseCtx parameter of the DME-View.response 1806 primitive has the same value as that of the corresponding DME-View.indication 1804.

On receipt of the DME-View.response 1806 primitive, if the value of the Status parameter has a value denoting success, the DME 1706 may format and transmit a view response frame 1808 containing a fabric TLV encoding of the data list that is the value of the in the DataList parameter of the DEM-View.response 1806 primitive. The publisher provides the most recent version number for each data list item. On receipt of this view response frame 1808, the DME 1714 of the viewer 1718 issues a DME-View.confirm 1810 primitive. The Status parameter of the DME-View.confirm 1810 primitive may be a status report with a status code value denoting success. The DataList parameter of the DME-View.confirm 1810 primitive reflects the value of the data list field of the view response frame 1808.

If the value of the Status parameter denotes an outcome other than success, the DME 1706 may format and transmit a status report frame 1812, as previously described. On receipt of this status report, DME 1714 of the viewer issues a DME-View.confirm 1810 primitive. The value of the ResponderId parameter of the DME-View.confirm 1810 primitive may include the 64-bit node identifier of the publisher. The Status parameter may be a decoding of the status report frame. In some embodiments, the DataList parameter may be omitted. The value of the TransactionId parameter may be the 16-bit identifier of the now-completed WDM transaction. In either case, the transmission, via the fabric exchange layer, may be performed using the information in the ResponseCtx parameter.

On receipt of a DME-View.confirm primitive, the NHL of the viewer is informed of the success or failure of a previous request. In the case of success, the version and value of the data requested.

viii. Update Transaction

An update transaction is shown in FIG. 47. On receipt of a DME-Update.request 1820 primitive from an NHL 1822 of an updater device 1824, a DME 1826 of the updater 1824 establishes a transaction with the identifier given by the value of the TransactionId parameter of the DME-Update.request 1820 primitive. The DME 1826 of the updater 1824 then formats and transmits an update request frame 1828. If NHL 1822 has supplied a DestinationId parameter then the value of that parameter may be used as the identifier of the destination node. If no such parameter has been supplied, and a default binding has previously been established using the DME-Bind.request primitive, the node identifier found in that binding is used as the identifier of the destination node. Update request frames 1828 may also be transmitted via multicast in the case where the default binding has a value of 0. The value of the data list field of the update request frame may be the fabric TLV representation of the DataList parameter. The DME 1826 of the updater 1824 may include the most recent known version for each item in the outgoing data list.

Once the update request frame 1828 has been formatted, the protocol engine sublayer of the DME 1826 transmits it via the fabric exchange layer. If the Timeout parameter of the DME-Update.request 1820 primitive has a non-zero value then the value may be used to set the expected response timeout for the fabric exchange. On receipt of an update request frame, the DME 1706 of the publisher 1700 issues a DME-Update.indication 1830 primitive to the NHL 1710. The value of the ResponseCtx parameter of the DME-Update.indication 1830 primitive is the fabric exchange context object generated by the exchange manager and containing the information used to send a response. The DataList parameter of the DME-Update.indication 1830 primitive reflects the value of the data list field of the received update request frame 1828.

On receipt of the DME-Update.indication primitive 1830, the NHL 1710 begins the process of disseminating the data for each of the items in the DataList parameter. Once the dissemination has been completed, the NHL issues a DME-Update.response 1832 primitive. The Status parameter of the DME-Update.response 1832 primitive reflects the status of the attempt. The ResponseCtx parameter of the DME-Update.response 1832 primitive has the same value as that of the corresponding DME-Update.indication 1830. The DME 1706 then formats and transmits a status report frame 1834.

On receipt of a status report, DME 1826 of the updater 1824 issues a DME-Update.confirm 1836 primitive. The value of the ResponderId parameter of the DME-Update.confirm 1836 primitive the 64-bit node identifier of the publisher 1700. The Status parameter may be a decoding of the status report frame 1834. The value of the TransactionId parameter may be the 16-bit identifier of the now-completed WDM transaction.

On receipt of a DME-Update.confirm 1836 primitive, the NHL 1822 of the updater is informed of the success or failure of a previous request and the completion of the corresponding transaction.

1. Concurrent Updates

In an operating environment where multiple entities have an interest in a particular data set, there is the possibility that multiple entities will submit updates concurrently. FIG. 48 below shows an example of this in which subscribers 1900 and 1902 also have an interest in updating information on a publisher 1904. Updates may, in principle, be requested by a variety of entities, including the publisher 1904 itself, and might be requested "out of band" (e.g., not using WDM).

In the initial state, the data set of interest at path P is {P:a:X} (e.g., the terminal of P has the value X and the current version is a). On arrival of an update request 1906 from subscriber/updater 1, the DME of the publisher 1904 sets in motion the process of merging the data in the update request as described later. On arrival of the second update request 1908 from subscriber/updater 2 1902, the DME of the publisher 1904, noting that the path in question is currently being updated, queues the incoming update and waits until the currently running update is finished and a status report 1910 is issued (e.g., the NHL issues the DME-Update.response primitive). After the update for the first update request 1906 is finished, the DME of the publisher 1904 processes the second update from the second update request 1908 and issues a status report 1912. In this way updates are serialized on the publisher. When the data in the second update has been merged and after the status report 1912 detailing the success or failure of the update request has been issued, the DME also issues a notify request frame 1914 to both entities informing them of the results of the merge and receives notify responses 1916 and 1918.

ix. Failure Cases

Common failure cases, along with the contents of the status report produced, may be represented according to the Table 25. Note that the error code, in cases where one is available, may be attached to the status report as meta-data.

TABLE 25

Failure cases

| description | profile ID | status code | error code |
|---|---|---|---|
| The DME is unable to establish a transaction on request due to resource constraints. | Core | InternalError | OutOfMemory |
| The fabric exchange layer or lower fabric layer fails on request and returns an error, (e.g. fails to establish an exchange context or make a connection). | Core | fabricError | a fabric error |
| A requested timeout, e.g. for DME-View.request, is exceeded. | Core | Timeout | N/A |
| The DME on a publisher is unable to buffer an update due to resource constraints. | Core | InternalServer Problem | OutOfMemory |
| The DME on a publisher fails to find a requested path in its path table or subscriber table. This report will be received by the requester either if the path requested is not a part of the profile schema definition or the responder is has no path table entry for the given path. | WDM | InvalidPath | N/A |
| An update request contains an out-of-date version identifier. | WDM | InvalidVersion | N/A | x. DME Attributes

The DME has number of attributes or stored parameters that are used to manage and control behavior. Table 26 includes examples of DME attributes.

TABLE 26

Example DME attributes.

| name | type | range | Description |
|---|---|---|---|
| aUseTcp | boolean | true/false | This attribute has a value of true if the Protocol Engine sublayer of the DME is expected to establish a TCP connection with peer nodes in order to send data management messages. Otherwise, the attribute is false. |
| aDefaultTimeout | unsigned 16-bit integer | 0 . . . 0xffff | The default timeout for data management protocol operations. This timeout may be used in cases where one is not supplied by the requestor in a transaction. |

TABLE 26-continued

Example DME attributes.

| name | type | range | Description |
| --- | --- | --- | --- |
| aPeerNodeId | 64-bit Node ID | any | The bound peer address for this DME instance.<br>The value 0 means "no bound peer". | xi. DME-View Request

As previously discussed, the DME-View.request primitive is issued by the NHL to request a view or snapshot of profile data resident on a remote node. In some embodiments, the primitive interface includes a DestinationId, TopicId, PathList, TransactionId, and Timeout. Table 27 includes example DME-View parameters.

TABLE 27

DME-View.request parameters

| name | type | range | description |
| --- | --- | --- | --- |
| DestinationId | 64-bit Node ID | any | The 64-bit Node identifier of the node from which the profile data view is being requested.<br>In some embodiments, this parameter is optional in the case where a default binding has been set up using the DME-Bind primitive. In this case, if the parameter is not supplied then the default destination is used.<br>In some embodiments, the DestinationId may be 0 or use a default binding of 0. |
| PathList | a path list | — | A list of paths $[P_0 \ldots P_n]$ in an agreed profile schema that the entity issuing the primitive assumes is resident on the remote node and for which it wishes to receive the corresponding data list $[\{P_0::X_0\} \ldots \{P_n::X_n\}]$. |
| TransactionId | unsigned 16-bit integer | 1 ... 0xffff | A token used as local reference to the transaction set up to track this view, e.g. for cancellation.<br>The value 0 is reserved to mean "undefined ID" and may not be used in this context, in some embodiments. |
| Timeout | unsigned 32-bit integer | 1 ... 0xffff | A time in milliseconds to wait for a response. This parameter is optional. If a timeout is not provided then the default timeout, aDefaultTimeout, from the DME attributes table may be used.<br>The value 0 is reserved to mean "no timeout required" and may not be used in this context, in some embodiments. | xii. DME-View.indication

As previously discussed, a DME-View.indication primitive may be issued by the DME upon arrival, via the fabric exchange layer, of a view request frame. In some embodiments, the primitive interface may include a ResponseCtx or a PathList, which are defined in Table 28.

TABLE 28

DME-View.indication parameters

| name | type | range | description |
| --- | --- | --- | --- |
| ResponseCtx | — | any | An object (e.g., a fabric exchange context) that contains the information required for the protocol engine sublayer to frame a response to the received indication.<br>This object may be retained and passed back as the ResponseCtx parameter of the corresponding DME-View.response primitive. |
| PathList | a path list | — | A list of paths $[P_0 \ldots P_n]$ in an agreed profile schema that the requestor assumes is resident on the receiving node and for which the requestor wishes to receive the corresponding data list, $[\{P_0::X_0\} \ldots \{P_n::X_n\}]$. | xiii. DME-View.response

As previously discussed, a DME-View.response primitive is issued by the data manager sublayer of the DME to the protocol engine sublayer in response to the receipt, and after the processing, of a DME-View.indication primitive. The DME-View primitive interface may include ResponseCtx, Status, and DataList, such as the parameters described in Table 29.

TABLE 29

DME-View.response parameters

| name | type | range | description |
|---|---|---|---|
| ResponseCtx | — | any | The value of the ResponseCtx parameter of the DME-View.indication primitive to which this is a response. |
| Status | status report | any | The status of the indication containing profile identifier, status code and optional additional information. |
| DataList | a path list | — | A data list, $[\{P_0::X_0\} \ldots \{P_n::X_n\}]$, as described in clause 5 where the list length, n, is the same as the length of the path list in the DME-View.indication frame that produced this response and where each path $P_i$ is equal to one and only one element of the corresponding path list. In some embodiments, the version field of each data list element may be supplied but is not required. In some embodiments, this parameter be omitted unless the status expressed in the Status parameter is Success or an equivalent indicating successful processing of the corresponding DME-View.indication primitive. | xiv. DME-View.confirm

As previously discussed, a DME-View.confirm primitive is issued by the data manager sublayer of the DME to the NHL in response to the receipt, and after the processing, of a view response frame. In some embodiments, the primitive interface includes ResponderId, Status, DataList, and TransactionId, as discussed in Table 30.

TABLE 30

DME-View.confirm parameters

| name | type | range | description |
|---|---|---|---|
| ResponderId | 64-bit Node ID | any | The 64-bit identifier of the node from which the profile data view was requested. In some embodiments, the ResponderId may be optional when a unicast default binding has been set up using the DME-Bind primitive. |
| Status | status report | any | The status of the request containing profile identifier, status code and optional additional information. |
| DataList | a path list | — | A data list, $[\{P_0::X_0\} \ldots \{P_n::X_n\}]$ where the list length, n, is the same as the length of the path list in the DME-View.request primitive that produced this confirmation, and where each path $P_i$ is equal to one element of the corresponding path list. The version field of each data list element may be supplied. This parameter may be omitted unless the status expressed in the Status parameter is Success or an equivalent indicating a successful WDM exchange. |
| TransactionId | unsigned 16-bit integer | 1 ... 0xffff | The transaction identifier of the DME-View.request primitive of which this is a confirmation. The return of this identifier here indicates that the associated transaction may be freed and any associated state expunged. | xv. DME-Subscribe.request

As previously discussed, a DME-Subscribe.request primitive is issued by the NHL both to request a snapshot of profile data resident on a remote node and to request subsequent updates in the event that the data of interest changes. In some embodiments, the primitive interface may include a DestinationId, TopicId, PathList, TransactionId, and a Timeout, as defined in Table 31.

TABLE 31

DME-Subscribe.request parameters

| name | type | range | description |
|---|---|---|---|
| DestinationId | 64-bit Node ID | any | The 64-bit identifier of the node from which the profile data subscription is being requested. This parameter is optional in the case where a default unicast binding has been set up using the DME-Bind primitive. In this case, if the parameter is not supplied then the default destination is used. |
| TopicId | 16-bit topic ID | any | The 16-bit identifier of a topic, available on the publisher, to which the requestor wishes to subscribe. In some embodiments, the TopicId parameter or the PathList parameter, may be omitted. |
| PathList | a path list | — | A list of paths $[P_0 \ldots P_n]$ in an agreed profile schema that the entity issuing the primitive assumes is resident on the remote node and for which it wishes to subscribe. This parameter is optional. Either the TopicId parameter or the PathList parameter, but not both, may be supplied. |
| TransactionId | unsigned 16-bit integer | 1 ... 0xffff | A token used for local reference to the transaction set up to track this subscribe, e.g. for cancellation. The value 0 is reserved to mean "undefined ID" and may not be used in this context in some embodiments. |
| Timeout | unsigned 16-bit integer | 1 ... 0xffff | A time in milliseconds to wait for a response. This parameter is optional. The value 0 is reserved to mean "no timeout required" and may not be used in this context in some embodiments. | xvi. DME-Subscribe.indication

As previously discussed, a DME-Subscribe.indication primitive is issued by the DME protocol engine sublayer upon arrival, via the fabric exchange layer, of a subscribe request frame. In some embodiments, the primitive interface may include ResponseCtx, TopicId, and PathList, as represented in Table 32.

TABLE 32

DME-Subscribe.indication parameters

| name | type | range | description |
|---|---|---|---|
| ResponseCtx | — | any | An object, e.g. a fabric exchange context, that contains the information used for the protocol engine sublayer to frame a response to the received indication. This object may be retained and passed back as the ResponseCtx parameter of the corresponding DME-Subscribe.response primitive. |
| TopicId | 16-bit topic identifier | any | A topic identifier, known to the publisher, representing the content of the subscription. This parameter may be present if the topic id field is present in the corresponding subscribe request frame. |
| PathList | a path list | — | A list of paths $[P_0 \ldots P_n]$ in an agreed profile schema that the requestor assumes is resident on the receiving node and for which the requestor wishes to receive the corresponding $[\{P_0::X_0\} \ldots \{P_n::X_n\}]$ along with subsequent updates if data items covered by the path list are changed. |

TABLE 32-continued

DME-Subscribe.indication parameters

| name | type | range | description |
|---|---|---|---|
| | | | This parameter may be present if the path list field is present in the corresponding subscribe request frame. | xvii. DME-Subscribe.response

As previously discussed, a DME_Subscribe.response primitive is issued by the NHL in response to, and after processing of, a DME-Subscribe.indication primitive. In some embodiments, the primitive interface includes ResponseCtx, Status, TopicId, and DataList, as defined in Table 33.

TABLE 33

DME_Subscribe.response parameters

| name | type | range | description |
|---|---|---|---|
| ResponseCtx | — | any | The value of the ResponseCtx parameter of the DME-Subscribe.indication primitive to which this is a response. |
| Status | a status report | any | The status of the attempt to subscribe. |
| TopicId | unsigned 16-bit integer | any | A topic identifier chosen by the NHL for this subscription. |
| DataList | a data list | — | A data list, [{$P_0$::$X_0$} ... {$P_n$::$X_n$}], as described above, where the list length, n, is the same as the length of the path list in the DME-Subscribe.indication frame that produced this response and where each path $P_i$ is equal to one element of the corresponding path list. The version field of each data list element may be supplied. This parameter may be present if the status expressed in the Status parameter is Success or an equivalent indicating successful processing of the corresponding DME-Subscribe.indication primitive. | xviii. DME-Subscribe.confirm

As previously discussed, a DME Subscribe.confirm primitive is issued by the DME to the NHL to report the completion status of a previously issued DME-Subscribe.request. In some embodiments, the primitive interface includes ResponderId, Status, TopicId, DataList, and TransactionId, as defined in Table 34.

TABLE 34

DME_Subscribe.response parameters

| name | type | range | description |
|---|---|---|---|
| ResponderId | 64-bit node ID | any | The 64-bit identifier of the node from which the subscription was requested. This parameter is optional in the case where a unicast default binding has been set up using the DME-Bind primitive. In the case where a broadcast default binding has been established, the ResponderId parameter may be provided. |
| Status | a status report | — | The status of the subscribe request containing profile identifier, status code and optional additional information. |
| TopicId | unsigned 16-bit integer | any | The topic identifier chosen by the DME of the publishing device. |
| DataList | a data list | — | A data list, [{$P_0$::$X_0$} ... {$P_n$::$X_n$}], as described above, where the list length, n, is the same as the length of the path list in the DME-Subscribe.indication frame that produced this response and where each path $P_i$ is equal to one element of the corresponding path list. The version field of each data list element may be supplied. This parameter may be present if the status expressed in the Status parameter is Success or |

TABLE 34-continued

DME_Subscribe.response parameters

| name | type | range | description |
|---|---|---|---|
| | | | an equivalent indicating successful processing of the corresponding DME-Subscribe.indication primitive. |
| TransactionId | unsigned 16-bit integer | 1 ... 0xffff | The transaction identifier of the DME-Subscribe.request primitive of which this is a confirmation. The return of this identifier here indicates that the associated transaction may be freed and any associated state expunged. | xix. DME-Update.request

As previously discussed, a DME-update.request primitive is issued by the NHL to request a change to profile data resident on a remote node. In some embodiments, the primitive interface may include a DestinationId, DataList, TransactionId, and Timeout, as defined in Table 35.

TABLE 35

DME-Update.request parameters

| name | type | range | description |
|---|---|---|---|
| DestinationId | 64-bit Node ID | any | The 64-bit identifier of the publisher node on which the data for which a change is being requested is under management. If the DestinationId parameter is supplied and has a value of 0, then the resulting update request frame may be multicast. This parameter is optional in the case where a default binding has been set up using the DME-Bind primitive. In this case, if the parameter is not supplied then the default destination may be omitted. |
| DataList | a data list | — | A data list, [{$P_0$::$X_0$} ... {$P_n$::$X_n$}], as described above, describing both the location in the agreed profile schema and the new values of the data for which a change is being requested. In some embodiments, the version field of each data list element may be optional. |
| TransactionId | unsigned 16-bit integer | 1 ... 0xffff | A token used for local reference to the transaction set up to track this update (e.g. for cancellation). In some embodiments, the value 0 is reserved to mean "undefined ID." |
| Timeout | unsigned 16-bit integer | 1 ... 0xffff | A time in milliseconds to wait for a response. In some embodiments, this parameter is optional when the RspRequired parameter has a value of false. The value 0 is reserved to mean "no timeout required." | xx. DME-Update.indication

As previously discussed, a DME-Update.indication primitive is issued by the DME upon arrival, via the fabric exchange layer, of an update request frame. In some embodiments, the primitive interface may include ResponseCtx and DataList, as defined in Table 36.

TABLE 36

DME-Update.indication parameters

| name | type | range | description |
|---|---|---|---|
| ResponseCtx | — | any | An object that contains the information for the protocol engine sublayer to frame a response to the received indication. This object may be retained and passed back as the ResponseCtx parameter of the corresponding DME-update.response primitive. |
| DataList | a data list | — | A data list, [{$P_0$::$X_0$} ... {$P_n$::$X_n$}] describing both the location in the agreed profile schema and, as |

TABLE 36-continued

| DME-Update.indication parameters ||||
|---|---|---|---|
| name | type | range | description |
| | | | terminals, the new values of the data for which a change is being requested. | xxi. DME-Update.response

As previously discussed, a DME-update.response primitive is issued by the NHL in response to, and after processing of, a DME-update.indication primitive. The NHL sends a response if the RspRequired parameter of the corresponding DME-Update.indication primitive has a value of true. In some embodiments, the primitive interface includes ResponseCtx and Status, as defined in defined in Table 37.

TABLE 37

| DME_Update.response parameters ||||
|---|---|---|---|
| name | type | range | description |
| ResponseCtx | — | any | An object that contains the information for the protocol engine sublayer to frame a response to the received indication. |

TABLE 37-continued

| DME_Update.response parameters ||||
|---|---|---|---|
| name | type | range | description |
| Status | a status report | any | The status of the update indication containing profile identifier, status code and optional additional information. | xxii. DME-Update.confirm

As previously discussed, a DME-Update.confirm primitive is issued by the DME to the NHL to report the completion and status of an update transaction. In some embodiments, the primitive interface may include ResponderId, Status, and TransactionId, as defined in Table 38 below.

TABLE 38

| DME-Update.confirm parameters ||||
|---|---|---|---|
| name | type | range | description |
| ResponderId | 64-bit node ID | any | The 64-bit identifier of the node of which the update was requested. This parameter is optional in the case where a unicast default binding has been set up using the DME-Bind primitive. In the case where a broadcast default binding has been established, the ResponderId parameter may be provided. |
| Status | a status report | — | The status of the update request containing profile identifier, status code and optional additional information. |
| TransactionId | unsigned 16-bit integer | 1 ... 0xffff | The transaction identifier of the DME-Update.request primitive of which this is a confirmation. The return of this identifier here indicates that the associated transaction may be freed and any associated state expunged. | xxiii. DME-CancelTransaction.request

As previously discussed, a DME-CancelTransaction.request primitive is issued by the NHL in order to cancel a previously requested transaction. In some embodiments, the primitive interface may include a TransactionId and ErrorCode, as defined in Table 39.

TABLE 39

| DME_CancelTransaction.request parameters ||||
|---|---|---|---|
| name | type | range | description |
| TransactionId | unsigned 16-bit integer | 0 ... 0xffff | The identifier of the transaction to be canceled. A value of 0 in this context means, "cancel all transaction". |
| ErrorCode | — | — | An implementation-specific error code to be reported in the confirmation primitive that results from the canceled transaction. | xxiv. DME-CancelTransaction.confirm

As previously discussed, a DME-CancelTransaction.confirm primitive is issued by the DME to the NHL to confirm the cancellation of a transaction. In some embodiments, the primitive interface may include a TransactionId, as defined in Table 40.

TABLE 40

| DME_CancelTransaction.confirm parameters | | | |
|---|---|---|---|
| name | type | range | description |
| TransactionId | unsigned 16-bit integer | 0 . . . 0xffff | The identifier of the canceled transaction. A value of 0 in this context means, "all transactions canceled". | xxv. DME-CancelSubscription.request

As previously discussed, a DME-CancelSubscription.request transaction may be issued by the NHL of a subscriber to cancel an existing subscription. In some embodiments, the primitive interface may include DestinationId, TopicId, TransactionId, Timeout, as defined in Table 41.

TABLE 41

| DME_CancelSubscription.request parameters | | | |
|---|---|---|---|
| name | type | range | description |
| DestinationId | 64-bit node ID | any | The 64-bit identifier of the peer node for the subscription being canceled. This parameter is optional and need not be provided in the case where a default binding has been established. |
| TopicId | unsigned 16-bit integer | any | The topic identifier of subscription to be canceled. |
| TransactionId | unsigned 16-bit integer | 1 . . . 0xffff | A token used for local reference to the transaction set up to track this request, e.g. for cancellation. The value 0 is reserved to mean "undefined ID" and may not be used in this context in some embodiments. |
| Timeout | unsigned 16-bit integer | 1 . . . 0xffff | A time in milliseconds to wait for a response. This parameter is optional and, in particular, should not be provided is the RspRequired parameter has a value of false. The value 0 is reserved to mean "no timeout required" and may not be used in this context in some embodiments. |

TABLE 42

| DME_CancelSubscription.indication parameters | | | |
|---|---|---|---|
| name | type | range | description |
| RequestorId | 64-bit node ID | any | The node ID of the subscriber attempting to cancel a subscription. |

TABLE 42-continued

| DME_CancelSubscription.indication parameters | | | |
|---|---|---|---|
| name | type | range | description |
| TopicId | unsigned 16-bit integer | any | The topic identifier of subscription to be canceled. | xxvi. DME-CancelSubscription.indication

As previously discussed, a DME-CancelSubscription.indication transaction may be issued by the DME of a publisher on receipt of a cancel subscription request frame. In some embodiments, the primitive interface may include RequestorId and TopicId, as defined in Table 42.

xxvii. DME-CancelSubscription.confirm

As previously discussed, a DME-CancelSubscription.confirm primitive is issued by the DME of a subscriber to communicate the status of a previous attempt to cancel a subscription. In some embodiments, the primitive interface includes ResponderId, TopicId, Status, and TransactionId, as defined in Table 43.

TABLE 43

DME_CancelSubscription.confirm parameters

| name | type | range | description |
| --- | --- | --- | --- |
| ResponderId | 64-bit node ID | any | The 64-bit identifier of the node from which the subscription was requested. This parameter is optional in the case where a unicast default binding has been set up using the DME-Bind primitive. In the case where a broadcast default binding has been established, the ResponderId parameter may be provided. |
| TopicId | unsigned 16-bit integer | any | The topic identifier of subscription that has been canceled. |
| Status | a status report | any | The status of the cancel request. |
| TransactionId | unsigned 16-bit integer | 1 ... 0xffff | The token used for local reference to the now-completed transaction. The value 0 is reserved to mean "undefined ID" and may not be used in this context in some embodiments. | xxviii. DME-Bind.request

As previously discussed, a DME-Bind.request is issued by the NHL in order to provide a default destination address for WDM frames. In some embodiments, the primitive interface may include DestinationId, as defined in Table 44.

TABLE 44

DME-Bind.request parameters

| name | type | range | description |
| --- | --- | --- | --- |
| DestinationId | 64-bit Node ID | any | The 64-bit identifier of the node which is to be the default destination for WDM frames. If the DestinationId parameter has a value of 0, then the resulting update request frame is to be multicast. | xxix. DME-Bind.confirm

As previously discussed, a DME-Bind.confirm primitive is issued by the DME to report the status of a bind request. In some embodiments, the primitive interface includes Status, as described in Table 45.

TABLE 45

DME-Bind.confirm parameters

| name | type | range | description |
| --- | --- | --- | --- |
| Status | a status report | any | The status of the bind request. | xxx. DME-BeginPublishing.request

As previously discussed, a DME-BeginPublishing.request primitive is issued by the NHL when it wishes to set up a DME to act as a publisher. In some embodiments, the primitive interface includes no parameters.

xxxi. DME-BeginPublishing.confirm

As previously discussed, a DME-BeginPublishing.confirm primitive is issued by the DME to report the status of a request to begin publishing. In some embodiments, the primitive interface includes a Status, as described in Table 46.

TABLE 46

DME-BeginPublishing.confirm parameters

| name | type | range | description |
| --- | --- | --- | --- |
| Status | a status report | any | The status of the request. | xxxii. DME-EndPublishing.request

As previously discussed, a DME-EndPublishing.request primitive is issued by the NHL in order to end publishing activities for a particular DME instance. Thereafter, arriving DME frames may not be routed to that instance nor may issuing DME primitives to that instance have any effect. In some embodiments, the primitive interface has no parameters.

xxxiii. DME-EndPublishing.confirm

As previously discussed, a DME-EndPublishing.confirm primitive is issued by the DME to report the status of a request to end publishing. In some embodiments, the primitive interface includes Status, as described in Table 47.

TABLE 47

DME-EndPublishing.confirm parameters

| name | type | range | description |
| --- | --- | --- | --- |
| Status | a status report | any | The status of the request. | xxxiv. DME-BeginSubscription.request

As previously discussed, a DME-BeginSubscription primitive may be issued by the HNL to a DME instance that supports subscription in order to start a particular subscription. Thereafter, it should be able to handle DME-Subscribe.indication primitives with respect to the topic identified by the TopicId parameter of the DME-BeginSubscription.request primitive. The primitive interface may include TopicId, SubscriberId, and PathList, as described in Table 48.

TABLE 48

DME-BeginSubscription.request parameters

| name | type | range | description |
| --- | --- | --- | --- |
| TopicId | unsigned 16-bit integer | 1 ... 0xffff | The topic identifier to be associated with this subscription. |
| SubscriberId | 64-bit Node ID | any | The node identifier of the intended subscriber. A value of 0 indicating "any node ID" may be used in the case of broadcast publishing. |
| PathList | a path list | any | The list of paths, which is a sub-list of the path list given as the PathList parameter of the DME-BeginPublishing.request primitive, that is used to define the content of the subscription. In some embodiments, the PathList parameter may be omitted. | xxxv. DME-BeginSubscription.confirm

As previously discussed, a DME-BeginSubscription.confirm primitive is issued by the DME to report the status of a request to begin a subscription. In some embodiments, the primitive may include Status, as described in Table 49.

TABLE 49

DME-BeginSubscription.confirm parameters

| name | type | range | description |
| --- | --- | --- | --- |
| Status | a status report | any | The status of the request. | xxxvi. DME-Notify.request

As previously discussed, a DME-Notify.request primitive is issued by the NHL when it wishes to notify subscribers of changes in a published data set. In some embodiments, the primitive interface may include TopicId, DataList, TransactionId, and Timeout, as described in Table 50.

TABLE 50

DME-Notify.request parameters

| name | type | range | description |
| --- | --- | --- | --- |
| TopicId | unsigned 16-bit integer | any | The 16-bit topic identifier of the subscription under which this notification is being reported. |
| DataList | a data list | any | A data list containing changes to the data set under control of the DME instance to which this primitive is issued. |
| TransactionId | unsigned 16-bit integer | 1 ... 0xffff | A token used as local reference to the transaction set up to track this notify request, (e.g. for cancellation). The value 0 is reserved to mean "undefined ID." |
| Timeout | unsigned 32-bit integer | 1 ... 0xffff | A time in milliseconds to wait for a response. In some embodiments, this parameter is omitted. If a timeout is not provided then the default timeout, aDefaultTimeout, from the DME attributes table may be used. The value 0 is reserved to mean "no timeout required." | xxxvii. DME-Notify.indication

As previously discussed, a DME-Notify.indication primitive is issued by the DME of a subscriber upon arrival, via the fabric exchange manager, of a notify request frame. The primitive interface may include ResponseCtx, TopicId, and DataList, as described in Table 51.

TABLE 51

DME-Notify.indication parameters

| name | type | range | description |
| --- | --- | --- | --- |
| ResponseCtx | — | any | An object that contains the information required for the protocol engine sublayer to frame a response to the received indication. This object may be retained and passed back as the ResponseCtx parameter of the corresponding DME-Notify.response primitive. |
| TopicId | unsigned 16-bit integer | any | The 16-bit topic identifier of the subscription under which this notification is being reported. |
| DataList | a data list | any | A data list containing changes to a data set to which this DME instance has a subscription. | xxxviii. DME-Notify.confirm

As previously discussed, a DME-Notify.confirm primitive is issued by the DME to the NHL to report the completion and status of a notify transaction. The primitive interface may include TopicId, Status, and TransactionId, as defined in Table 52.

TABLE 53

DME_Notify.response parameters

| name | type | range | description |
|---|---|---|---|
| TopicId | unsigned 16-bit integer | any | The 16-bit topic identifier of the subscription under which this notification was reported. |
| Status | a status report | — | The status of the notify request containing profile identifier, status code and optional additional information. |
| TransactionId | unsigned 16-bit integer | 1 ... 0xffff | The transaction identifier of the DME-Notify.request primitive of which this is a confirmation. The return of this identifier here indicates that the associated transaction will be freed and any associated state expunged. | c. Frame Formats

A list of frames employed by WDM is provided above. In addition to the frames described here, data management exchanges may include status report profile frames, as previously discussed, when appropriate.

i. Fabric application header

As previously discussed, in order for a data management profile frame to be properly recognized and handled, the fabric application header identifies the frame as such.

1. Profile ID

In some embodiments, the profile identifier field of the fabric application header has a value of 0x0000000B for WDM frames.

2. Message Type

As previously discussed, the message type field of the fabric application header may have one of the following set of values for WDM frames.

TABLE 54

WDM profile message types

| type | message |
|---|---|
| 0x00 | view request |
| 0x01 | view response |
| 0x02 | subscribe request |
| 0x03 | subscribe response |
| 0x04 | cancel subscription request |
| 0x05 | update request |
| 0x06 | notify request |
| 0x09-0xff | reserved | ii. View Request Frame

Figure 49:
FIG. 49 illustrates a view request frame of the WDM profile, in accordance with an embodiment.

The view request frame may be sent when the requestor wants a view of profile data under management by a publisher. In some embodiments, the view request frame 2000 has the form illustrated in FIG. 49. The path list field 2002 of the view request frame 2000 is variable in length and extends to the end of the frame. The path list field 2002 is an array of paths, expressed in the TLV format and may contain at least one path to be viewed.

iii. View Response Frame

Figure 50:
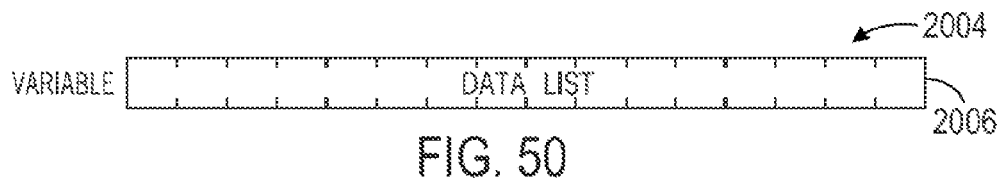
FIG. 50 illustrates a view response frame of the WDM profile, in accordance with an embodiment.

The view response frame may be sent, via unicast only, in response to the receipt and successful processing of a view request frame 2004 and may have the form shown in FIG. 50. The data list field 2006 of the view response frame 2004 is variable in length and extends to the end of the message. The data list field 2006 is an array of data items, expressed in the TLV format, that corresponds to the path list field 2002 of the view request frame 2000.

iv. View Request Status

If a view request frame cannot be processed successfully or a response cannot be formulated and sent, the receiver responds with a status report according to the status report profile discussed previously.

v. Subscribe Request Frame

Figure 51:
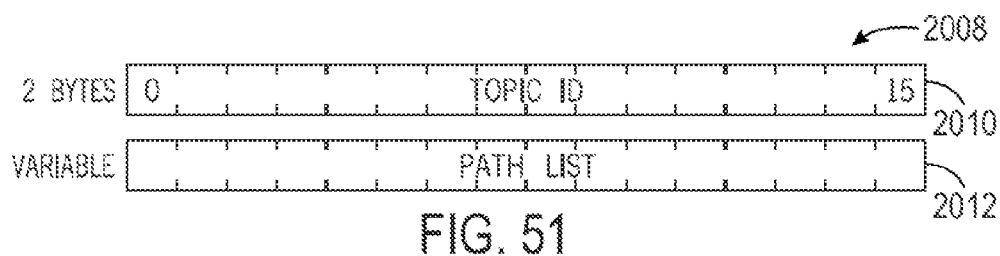
FIG. 51 illustrates a subscribe request frame of the WDM profile, in accordance with an embodiment.

The subscribe request 2008 as illustrated in FIG. 51 may be sent when the requestor wants both a view into the current state of profile data resident on a publisher and subsequent updates when the data of interest is modified that includes a topic identifier field 2010 and a path list field 2012, as previously discussed.

1. Topic ID Field

The topic ID field 2010 of the subscribe request frame is 16 bits in length and may either contain a value of 0, indicating "topic identifier not specified" or a non-zero value that is unique in the sense that no two active subscriptions from a particular subscribing node may have the same topic ID value.

2. Path List Field

The path list field 2012 of the subscribe request frame 2008 is variable in length and extends to the end of the frame. The path list field is an array of paths, expressed in the TLV format. If the topic ID field 2010 has a non-zero value then the path list field is empty. If the topic ID field has a value of 0, the path list field is non-empty and contains at least one path.

vi. Subscribe Response Frame

Figure 52:
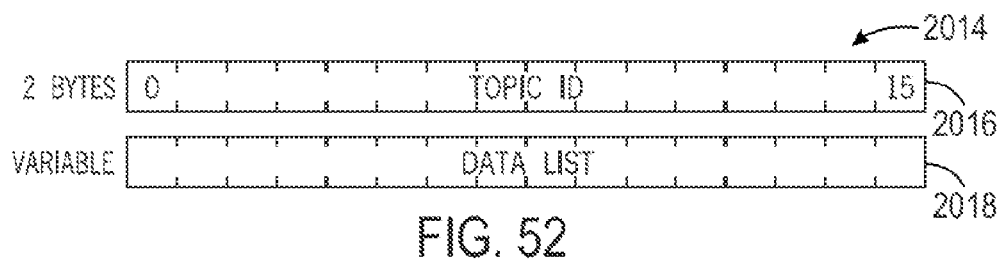
FIG. 52 illustrates a subscribe response frame of the WDM profile, in accordance with an embodiment.

The subscribe response frame 2014, as illustrated in FIG. 52, includes a topic id field 2016 and a data list field 2018. The subscribe response frame 2014 may be sent, via unicast in response to the receipt and successful processing of a subscribe request frame 2008.

1. Topic ID Field

The topic ID field 2016 of the subscribe response frame 2014 is 16 bits in length and may have the same value as the topic ID field 2010 of the view request frame 2008 to which the current frame is a response.

2. Data List Field

The data list field 2018 of the subscribe response frame 2014 is variable in length and contains the most recent snapshot available of the data of interest as requested in the corresponding subscribe request frame 2008. The data list field 2018 is an array of data items, expressed in the TLV format. In some embodiments, the data list field 2018 contains at least one data item.

vii. Subscribe Request Status

If a subscribe request frame cannot be processed successfully or a response cannot be formulated and sent, then the receiver responds with a status report, as previously discussed.

viii. Cancel Subscription Request Frame

Figure 53:
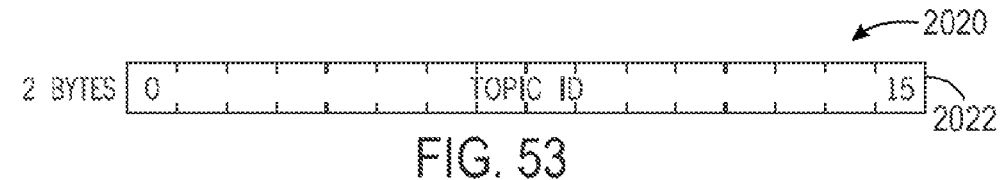
FIG. 53 illustrates a cancel subscription request frame of the WDM profile, in accordance with an embodiment.

As illustrated in FIG. 53, a cancel subscription request frame 2020 may be sent when the requestor wishes to cancel a previously established subscription and remove associated state. In some embodiments, the cancel subscription request frame 2020 includes a topic ID field 2022 of the cancel view request frame is 16 bits in length and may be the topic ID given in the subscribe request frame 2008 under which the subscription being canceled was established. On receipt of a cancel subscription request, the receiver attempts to cancel the subscription identified in the request and remove relevant state.

ix. Update Request Frame

Figure 54:
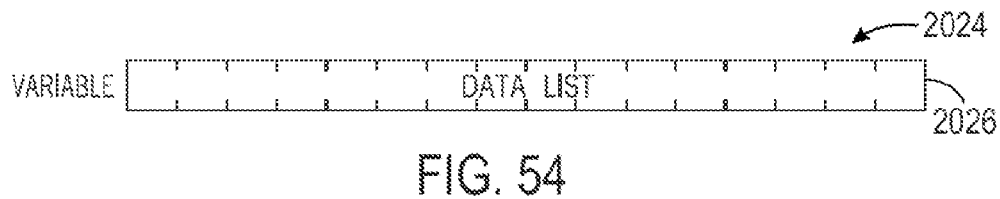
FIG. 54 illustrates an update request frame of the WDM profile, in accordance with an embodiment.

As illustrated in FIG. 54, a update request frame 2024 may be transmitted when a node wishes to make a change to data resident on another. The update request frame 2024 includes a data list field 2026 is variable in length and contains the most recent snapshot available of a data set which may be of interest to the receiver. On receipt of an update request, the receiver attempts to disseminate the data described in the frame. It then responds with a status report containing the status of the attempt.

x. Notify Frame

Figure 55:
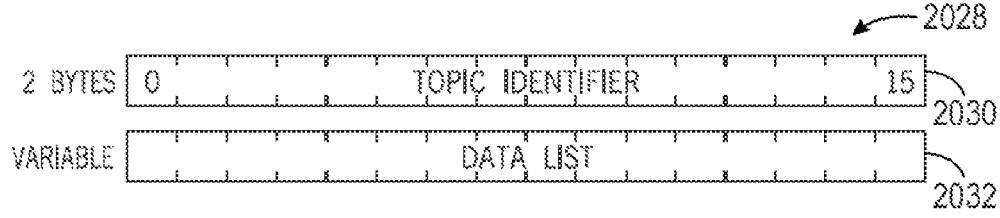
FIG. 55 illustrates a notify frame of the WDM profile, in accordance with an embodiment.

As illustrated in FIG. 55, a notify frame 2028 may be sent by a publisher, either by multicast or unicast, to inform subscribers of changes to profile data under management. The notify frame 2028 may include a topic identifier field 2030 and a data list field 2032.

1. The Topic Identifier Field

The topic identifier field 2030 is 16 bits in width. It may contain the 16-bit topic identifier for the subscription on the receiving device under which this notify request frame is being performed.

2. The Data List Field

The data list field 2032 of the notify frame is variable in width and may contain a data list describing changes to the data set of interest.

xi. Profile Schema

The WDM profile, as described above, specifies complex data structures encoded in TLV—specifically the path list and data list. For the following discussion, <type>:<tag>:<value> represents TLV elements.

1. Example Path List Format

Schematically, a TLV path list has the form: <array>:WDMPathList: {<path>::{ ... } ... }. That is, a path list is a named array of paths. A TLV path from the perspective of WDM has the form shown in Table 89.

TABLE 55

TLV path

```
<path>::
{
    {
        <unsigned int>:WDMPathProfileId:<integer value>
        | <TLV type>:WDMPathProfileInstance:<TLV value> |
    }
    | <path element> |
    ...
}
```

The data includes a collection of type <path> where the first element is an anonymous structure containing a profile ID and optional profile instance followed by 0 or more path elements. In some embodiments, the form of a path element is one of:

<NULL>:<tag>: in the case where the element specifies a structure member with a particular tag.

<integer type>:WDMPathArrayIndexSelector<integer value> in the case where the integer value is to be used as an array index.

<structure>:WDMPathArrayValueSelector:{<type>: <tag>:<value>} in the case where the contained element is to be used as a record selector.

2. Data List Format

A TLV data list has the form: <array>:WDMDataList: {<data list element> ... }. In some embodiments, each data list element may have a form, such as that produced in Table 56.

TABLE 56

Data list element format

```
<structure>::
{
    <path>:WDMDataListElementPath:{...}
    <unsigned 8-byte integer>:WDMDataListElementVersion:<integer value>
    <type>:WDMDataListElementData:<value>
}
```

The first element of the form is the path to the data element, the second is its 64-bit version as assigned by the sender and the third is the data element itself When the path component of a data list element is the "top level" path for the given profile (e.g., identifies the profile and optional instance but no following path elements naming specific data items), the following data component may be a structure containing elements of the profile schema. These elements may be identified by fully qualified tags containing a profile identifier.

A profile schema implementation over WDM may support data access (e.g. view or update) employing the top level path as just described as well as the complete set of "next level" paths (e.g., paths containing a single additional path element specifying an element of the top level structure).

3. Tag Dictionary

The list of tags used to encode data management frames within the data management profile is shown in Table 57.

TABLE 57

WDM tag values

| name | value | description |
|---|---|---|
| WDMPathList | 100 | The element is a path list. |
| WDMPathProfile | 101 | The element is a structure that is used to start a path and contains the profile information in light of which the tags in the path are to be interpreted. |
| WDMPathProfileId | 102 | The element is a profile ID that begins a TLV path. |
| WDMPathProfileInstance | 103 | The element is a profile instance, which may follow the profile ID in a TLV path. Note that a node may or may not have multiple instances of a particular profile and, in the case where there is only one, this element may be omitted. |
| WDMPathArrayIndexSelector | 104 | The path element corresponds to an array in the schema and the contained integer element is to be used as an index into that array. |
| WDMPathArrayValueSelector | 105 | The path element corresponds to an array in the schema and the contained TLV element is intended to match a contained array element. |
| WDMDataList | 200 | The element is a data list. |
| WDMDataListElementPath | 201 | The element is the path component of a data list element. |
| WDMDataListElementVersion | 202 | The element is the version component of a data list element. |
| WMDataListElementData | 203 | The element is a container for the data portion of a data list element. |

4. Profile Status Codes

The profile status codes for data management are shown in Table 58.

TABLE 58

Status codes for the data management profile

| name | value | description |
|---|---|---|
| CancelSuccess | 0x0001 | A subscription was successfully canceled. |
| BadPath | 0x0012 | A path for the path list or data list of a request was ill-formed. |
| InvalidPath | 0x0013 | A path from the path list of a view or update request frame did not match the node-resident schema of the responder. |
| UnknownTopic | 0x0014 | The topic ID given in a cancel subscription request did not match any view extant on the receiving node. |
| IllegalReadRequest | 0x0015 | The node making a request to read a particular data item does not have permission to do so. |
| IllegalWriteRequest | 0x0016 | The node making a request to write a particular data item does not have permission to do so. |
| InvalidVersion | 0x0017 | The version check on an update request failed. | d. Example Exchange Between Devices

Figure 56:
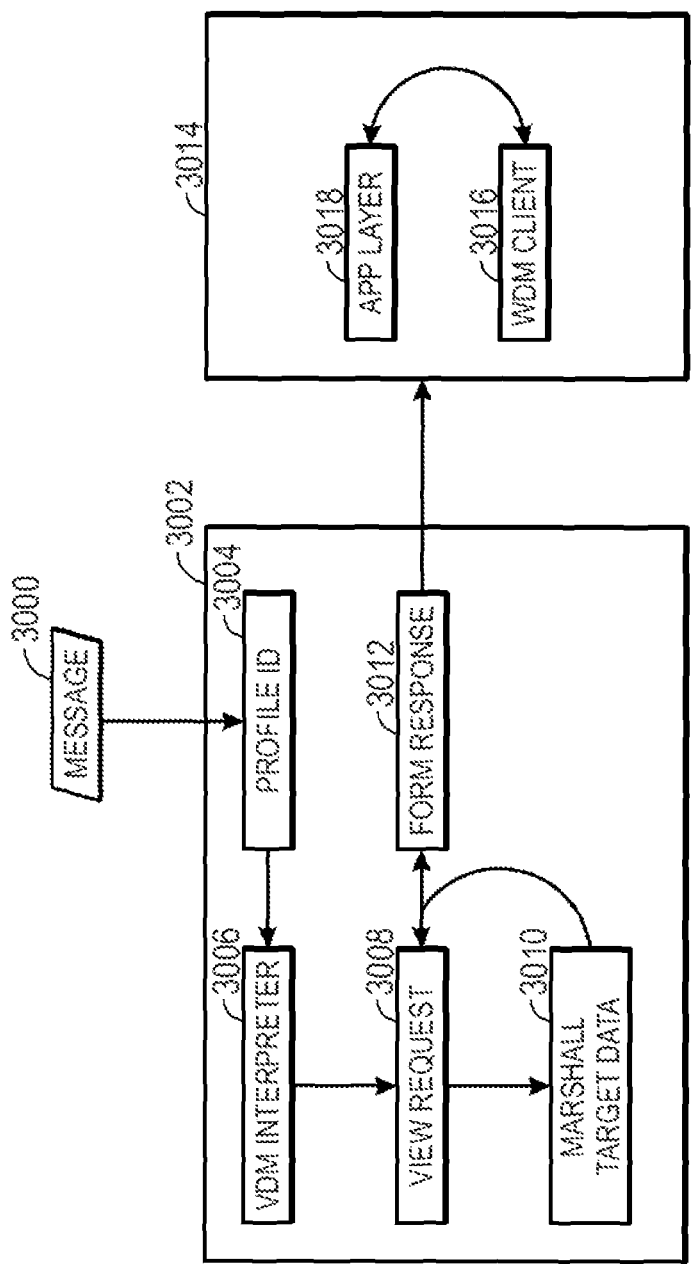
FIG. 56 illustrates an embodiment of WDM communications between devices, in accordance with an embodiment.

FIG. 56 illustrates an embodiment of data management communications between devices as further illustration of the foregoing discussion. A message 3000 (e.g., in general message format) is sent through a smart network and/or fabric to a receiving device 3002. The message 3000 is decoded by the device 3002 using profile ID code 3004 included in the message 3000. Wherein the device 3002 uses the profile ID code 3004 to determine that the message 3000 is a WDM message. The device 3002 sends the decoded payload of the message 3000 to its WDM interpreter 3006 to handle the WDM functions. The WDM interpreter 3006 interprets the code pertaining to various functions and submits the code to proper code functions for the device. For example, if the message contains a view request, the WDM interpreter 3006 determines that a view request is present and sends the view request to view request code 3008 which then sends a relevant request to marshalling code 3010 that marshals the target data to be viewed. The marshalling code 3010 returns the marshaled target data to the view request code 3008, which sends the marshaled data to form response code 3012. The form response code 3012 forms a response and sends the response to the requesting device 3014. In some embodiments, the requesting device 3014 receives the response via a WDM client 3016 that sends the response to the application layer 3018.

Figure 57:
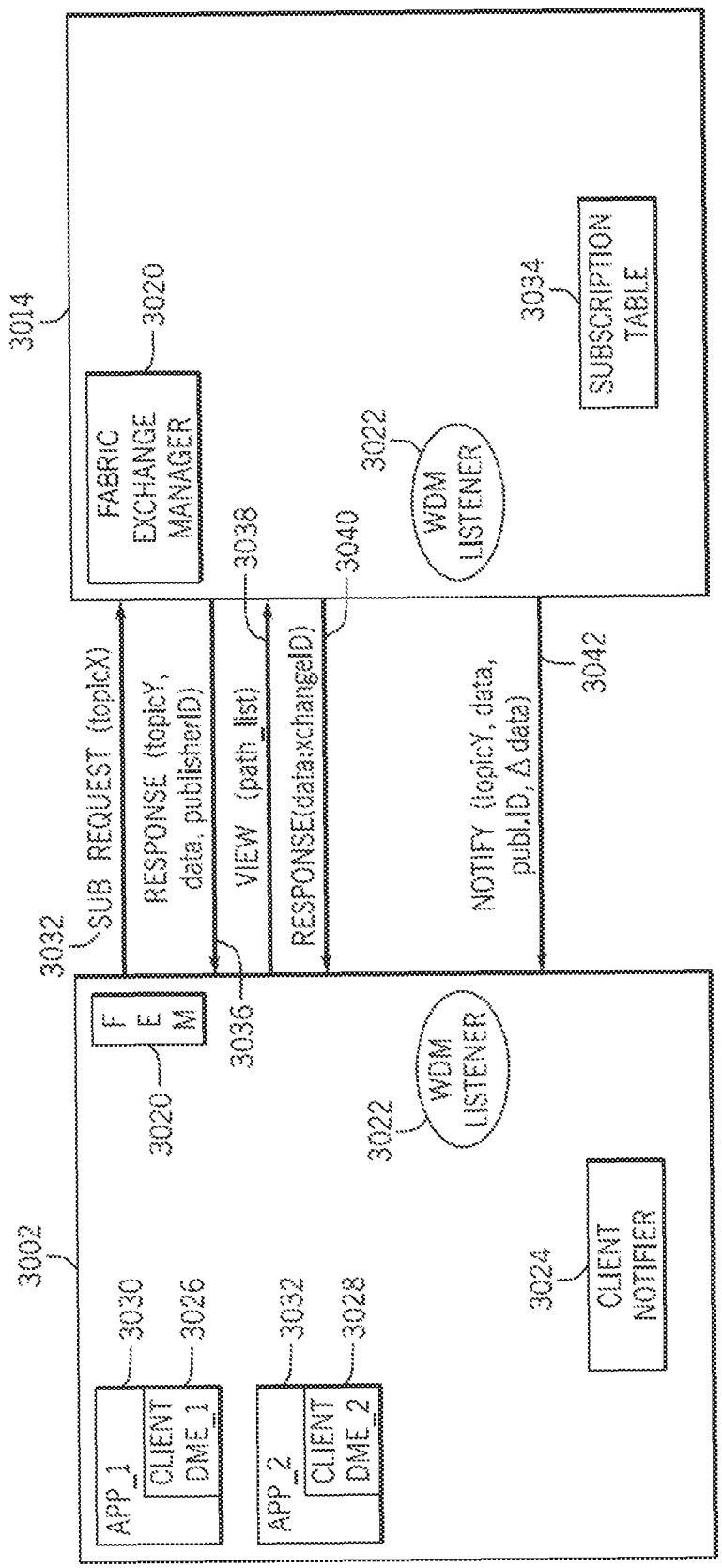
FIG. 57 illustrates a detailed view of WDM communications between devices, in accordance with an embodiment.

FIG. 57 illustrates a more detailed illustration of the devices 3002 and 3014 of FIG. 56. As illustrated, the devices 3002 and 3014 communicate using fabric encoded text via a fabric exchange communication that is managed by fabric exchange managers 3020. Furthermore, in some embodiments, the devices 3002 and 3014 have WDM listeners 3022 that listen for unexpected messages that are addressed to or relevant to their respective devices. For example, in some embodiments, any message not sent in response to a request may be an unexpected message. In some embodiments, one or more devices may also include a client notifier 3024 that may be used to notify clients of the detected unexpected messages, such as Client DME_1 3026 and Client DME_2 3028 each residing within respective client applications 3030 and 3032.

As discussed above, the device 3002 may request to subscribe to data from device 3014 using a subscribe request 3032 that indicates a topic (e.g., pathlist or profile field) to which the subscription applies. The device 3002 also stores a list of subscriptions in client notifier 3024. Upon receiving the subscription request 3032 via the WDM listener 3022, the device 3014 stores the device 3002 in its subscription table along with the topic to be subscribed. In addition to saving the device 3002 in the subscription table 3034, the device 3014 returns a response message 3036 that includes the current data described the topic requested. In some embodiments, the response message 3036 may include the publisherID to indicate that the device 3014 is the publishing device sending the data. Also, in certain embodiments, the response may include a topic that pertains to the subscription such that all messages sent by the client 3014 relating to the subscription will have a common topic.

Moreover, in some embodiments, the device 3002 may request and/or receive additional information, such as a view request 3038 and 3040 via the WEM 3020 or the WDM listener 3022. Even though additional communications have occurred, the device 3014 will update the device 3002 with changes to the subscribed-to data with a notify message 3042. In some embodiments, the notify message 3042 includes the topic, the data, the publisherID, and/or a change in the data.

e. Multiple Publishers

FIG. 58 illustrates a concept of multiple publishers in a fabric and "ownership" of the data that belongs to that publisher. FIG. 58 includes a fabric 4000 that contains a heatlink device 4002, two thermostats 4004 and 4006, a hazard detector 4008, and a mobile device 4010. Each device may be able to determine information that the device owns and shares with other devices using the publishing steps discussed above. For example, the heatlink device 4002 may include a manual override for a radiator valve. The heatlink device 4002 may "own" the data, and the thermostat 4004 may subscribe to this data. As previously discussed, the heatlink device 4002 may store the thermostat 4002 in its lists of subscribed devices, so that whenever the manual override value changes, the heatlink device 4002 may send an update to the thermostat 4004. Similarly, the thermostat 4004 may include data, such as a sensed temperature, a heat on/off value, and remote sensing data. The heatlink device 4002 may subscribe to the heat on/off value so that the heatlink device 4002 will be updated when thermostat 4004 determines that the heat should be switched on or off. The hazard detector 4008 may include data related to occupancy and/or temperature of a room in which it is installed. Moreover, the thermostat 4004 may subscribe to this information. Finally, the mobile device 4010 may subscribe to view any data on any node through the thermostat 4004. In other words, in the current embodiment, the mobile device 4010 may connect to the other devices through the thermostat 4004. Thus, in certain embodiments, a device that only directly connects to a single other device in the fabric may connect to other devices in the fabric through that device and perform the data management techniques discussed above. Moreover, in light of the foregoing discussion, multiple devices in a network may publish data as a publisher. Furthermore, multiple devices may subscribe to data from a single device, and each device may be a subscriber for some data and a publisher for other data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method for controlling data remotely comprising:
   connecting to a remote device within a fabric of smart devices from a local smart device within the fabric of smart devices, wherein the remote device stores data locally, wherein the remote device comprises a smart device having at least one sensor; and
   remotely controlling the data stored in the remote device from the local smart device connected to the fabric by transmitting a message to the remote device, wherein the transmitted message includes a profile identifier that causes a data management entity of the remote device to perform an indicated data management action, wherein the profile identifier identifies a data management profile, and the message includes a command tag that indicates the data management action to be performed, and wherein the data management action comprises:
      a subscribe action configured to cause the remote device to store an indicator of the local smart device as a subscriber to the data, and the indicator of the local smart device as the subscriber is configured to cause the remote device to send the data to the local smart device; wherein the subscribe action is configured to cause the remote device to send the data to the local smart device when:
         the remote device determines that the data has changed from a state last sent to the local smart device; and
         an interval for sending the data has expired;
      a view action configured to send the data to be viewed that is stored locally on the remote device to the local smart device; or
      an update action configured to update the data stored locally to a value sent by the local smart device.

2. The method of claim 1, wherein the data comprises a state of the remote device, wherein the remote device comprises a radiator control valve and the state of the remote device comprises a heat state of a radiator controlled by the radiator control valve, and wherein the view action is configured to send the heat state of the radiator to the local smart device, and the update action is configured to update the heat state of the radiator.

3. The method of claim 1, wherein the data stored locally on the remote device comprises data stored using a second profile for the fabric network that is different than the data management profile identified in the profile identifier of the message, wherein the second profile comprises a core profile, a software update profile, and a heating-ventilating-and-air-conditioning (HVAC) profile.

4. A non-transitory, computer-readable medium having instructions stored thereon, wherein the instructions when executed are configured to cause a processor to:
   connect to a remote device within a fabric of smart devices from a local smart device within the fabric of smart devices, wherein the remote device stores data locally, wherein the remote device comprises a smart device having at least one sensor; and
   remotely control the data stored in the remote device from the local smart device connected to the fabric by transmitting a message to the remote device, wherein the transmitted message includes a profile identifier that causes a data management entity of the remote device to perform an indicated data management action, wherein the profile identifier identifies a data management profile, and the message includes a command tag that indicates the data management action to be performed, and wherein the data management action comprises:
a subscribe action configured to cause the remote device to store an indicator of the local smart device as a subscriber to the data, and the indicator of the local smart device as the subscriber is configured to cause the remote device to send the data to the local smart device; wherein the subscribe action is configured to cause the remote device to send the data to the local smart device when:
the remote device determines that the data has changed from a state last sent to the local smart device; and
an interval for sending the data has expired;
a view action configured to send the data to be viewed that is stored locally on the remote device to the local smart device; or
an update action configured to update the data stored locally to a value sent by the local smart device, and the data comprises a state of the remote device.

5. The non-transitory, computer-readable medium of claim 4, wherein the instructions when executed are configured to cause the processor to peer publish the data to a subscribing device in the fabric by binding the data to the local smart device so that any requests to modify the data are sent to a node corresponding to a subscribing device such that the subscribing device receives information about the data that is stored locally on the remote device even when requests to modify the data do not include an encoded destination address for the local smart device when the local smart device is a subscribing device.

6. The non-transitory, computer-readably medium of claim 5, wherein the instructions are configured to cause the processor to:
receive the data based on the binding; and publish the data to connected devices in the fabric that are connected to the local smart device, wherein the instructions are configured to cause the processor to determine that the data pertains to the connected devices.

7. The non-transitory, computer-readable medium of claim 4, wherein the instructions are configured to cause the local smart device to receive a filtered version of the data after the remote device has determined whether the local smart device has a current version of a portion of the data, wherein the received filtered version of the data comprises the data with the portion of the data omitted.

8. The non-transitory, computer-readable medium of claim 4, wherein the instructions when executed are configured to cause the processor to broadcast publish the bind the data to be multicast when a bind request includes a multicast value that indicates that the data is to be multicast instead of unicast to a specific device so that any requests to modify the data are bound to connected nodes so that devices in the fabric receive information about the data that is stored locally on the remote device as a multicast.

9. The non-transitory, computer-readable medium of claim 4, wherein the transmitted message comprises:
a path list profile identifier that identifies a profile within which the data is located; a version for the data; and the path list that locates a location of the data within the profile.

10. An electronic device comprising:
one or more network interfaces configured to connect the electronic device to a fabric of smart devices;
memory;
a processor configured to:
connect to a remote device within the fabric of smart devices from a local smart device within the fabric of smart devices, wherein the remote device stores data locally, wherein the remote device comprises a smart device having at least one sensor; and
remotely control the data stored in the remote device from the local smart device connected to the fabric by transmitting a message to the remote device, wherein the transmitted message includes a profile identifier that causes a data management entity of the remote device to perform an indicated data management action, wherein the profile identifier identifies a data management profile, and the message includes a command tag that indicates the data management action to be performed, and wherein the data management action comprises;
a subscribe action configured to cause the remote device to store an indicator of the local smart device as a subscriber to the data, and the indicator of the local smart device as the subscriber is configured to cause the remote device to send the data to the local smart device; wherein the subscribe action is configured to cause the remote device to send the data to the local smart device when:
the remote device determines that the data has changed from a state last sent to the local smart device; and
an interval for sending the data has expired;
a view action configured to send the data to be viewed that is stored locally on the remote device to the local smart device; or
an update action configured to update the data stored locally to a value sent by the local smart device.

11. The electronic device of claim 10, wherein the electronic device comprises a data management entity that communicates with the data management entity of the remote device through the fabric, wherein the data management entity of the electronic device comprises: an upper sublayer data manager that manages and tracks data access; and a lower sublayer protocol engine that manages communication formats.

12. The electronic device of claim 11, wherein the upper sublayer data manager is configured to: maintain an internal model for the data; provide access to data based on a set of predefined paths established by a profile definition; track changes to the data; and resolve conflicts that may arise between multiple updaters of the data set.

13. The electronic device of claim 11, wherein the lower sublayer protocol engine is configured to: bind requests to a particular node or remote service endpoint; maintain transactions for the data management entity to local smart data management entities of connected devices in the fabric; encode communications a predefined format; and interact with a fabric exchange manager to facilitate communication with the local smart data management entities of the connected devices.

14. The electronic device of claim 10, wherein the processor is configured to: establish a connection to a indirect connection device, wherein the indirect connection device does not directly communicate to the remote device, wherein sending the transmitted message comprises receiving the transmitted message from the indirect connection device; send received data designating the indirect connection device as a destination to the indirect connection device.

15. The electronic device of claim 14, wherein the indirect connection device comprises:
  a non-fabric device that is not directly connected to the fabric; or
  a single connection device on the fabric that connects to the fabric or a local area network that corresponds to the fabric, wherein the single connection device connects only to the fabric or the local area network through the electronic device as a gateway to the fabric or the local area network.

16. The electronic device of claim 10 wherein the processor is configured to:
  receive, through the one or more network interfaces, a received message with the profile identifier that causes a data management entity of the electronic device to perform a received indicated data management action for local data stored in the memory; and performing the receiving indicated data management action on the local data.

17. The electronic device of claim 16, wherein the processor is configured to:
  receive a first request to update the local data from a first device in the fabric;
  update the local data as a first update using the first request;
  during the first update, receive a second request to update the local data from a second device in the fabric;
  update the local data as a second update after the first update has completed;
  merging the local data with the first and second updates after the first and second updates have completed; and
  sending the merged local data as an outgoing update to the first and second devices.

18. The electronic device of claim 10, wherein the locally stored data comprises sensor data from the at least one sensor.

* * * * *